(12) United States Patent
Park et al.

(10) Patent No.: US 8,988,536 B2
(45) Date of Patent: Mar. 24, 2015

(54) IMAGE PROCESSING CIRCUIT, METHOD OF OPERATION THEREOF, AND DIGITAL CAMERA INCLUDING SAME

(75) Inventors: SungSoo Park, Cupertino, CA (US); Matthias Braun, Mountain View, CA (US); Erwin Sai Ki Liu, San Carlos, CA (US)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 268 days.

(21) Appl. No.: 13/313,974

(22) Filed: Dec. 7, 2011

(65) Prior Publication Data

US 2012/0162454 A1    Jun. 28, 2012

Related U.S. Application Data

(60) Provisional application No. 61/426,970, filed on Dec. 23, 2010, provisional application No. 61/426,975, filed on Dec. 23, 2010.

(51) Int. Cl.
*H04N 5/228*  (2006.01)
*H04N 5/14*   (2006.01)
*H04N 5/232*  (2006.01)
*G06T 7/20*   (2006.01)

(52) U.S. Cl.
CPC .......... *H04N 5/145* (2013.01); *H04N 5/23254* (2013.01); *G06T 7/2026* (2013.01); *G06T 7/2033* (2013.01); *G06T 7/2073* (2013.01); *G06T 2207/10016* (2013.01); *G06T 2207/20016* (2013.01); *G06T 2207/20021* (2013.01)
USPC ...................................................... 348/208.6

(58) Field of Classification Search
USPC ........................................... 348/208.6, 208.4
See application file for complete search history.

(56) References Cited

U.S. PATENT DOCUMENTS

| 5,446,501 | A  | * | 8/1995  | Takemoto et al. ............ 348/620 |
| 6,424,676 | B1 | * | 7/2002  | Kono et al. ............... 375/240.16 |
| 2002/0044693 | A1 | * | 4/2002  | Ogawa ......................... 382/236 |
| 2002/0171759 | A1 | * | 11/2002 | Handjojo et al. ............. 348/452 |
| 2003/0235248 | A1 | * | 12/2003 | Kim et al. ................ 375/240.12 |
| 2004/0076333 | A1 | * | 4/2004  | Zhang et al. .................. 382/238 |
| 2005/0105627 | A1 | * | 5/2005  | Sun et al. ................ 375/240.29 |
| 2005/0163348 | A1 | * | 7/2005  | Chen ........................... 382/107 |
| 2006/0061658 | A1 | * | 3/2006  | Faulkner et al. ........... 348/207.1 |
| 2006/0153472 | A1 | * | 7/2006  | Sakata et al. ................. 382/255 |
| 2006/0228049 | A1 | * | 10/2006 | Gensolen et al. ............. 382/309 |
| 2006/0274834 | A1 |   | 12/2006 | Hahn et al. |
| 2008/0107307 | A1 |   | 5/2008  | Altherr |
| 2008/0165852 | A1 |   | 7/2008  | Zhang |
| 2008/0246848 | A1 | * | 10/2008 | Tsubaki et al. ............ 348/208.4 |

(Continued)

*Primary Examiner* — Kelly L Jerabek
*Assistant Examiner* — Abdelaaziz Tissire
(74) *Attorney, Agent, or Firm* — F. Chau & Associates, LLC

(57) ABSTRACT

A method of operating a video processor is provided. The method includes receiving a first image data representing a first frame of a scene, dividing at least a central portion of the first frame into a plurality of tiles, identifying feature point candidates in the first image data, selecting a set of feature points within each specific tile based on the luminance variance σ2 of the specific tile, receiving a second image data representing a second frame of the scene, deriving feature point motion vectors between the first and second frames corresponding to the identified feature, grouping the motion vectors into motion vector groups based on vector magnitude ratios and angular differences, and calculating the affine transform of each group of motion vectors.

14 Claims, 29 Drawing Sheets

Current Frame Ft (with motion vectors of feature points)

Current Frame Ft (with grouped motion vectors of feature points)

(56) References Cited

U.S. PATENT DOCUMENTS

| | | | |
|---|---|---|---|
| 2008/0273806 A1* | 11/2008 | Friedrichs et al. | 382/236 |
| 2008/0291285 A1* | 11/2008 | Shimizu | 348/208.6 |
| 2010/0118156 A1* | 5/2010 | Saito | 348/208.6 |
| 2010/0208087 A1* | 8/2010 | Ogawa | 348/208.4 |
| 2010/0220788 A1* | 9/2010 | Wittmann et al. | 375/240.16 |
| 2010/0271494 A1* | 10/2010 | Miyasako | 348/208.1 |
| 2012/0162449 A1* | 6/2012 | Braun et al. | 348/208.4 |
| 2012/0162450 A1* | 6/2012 | Park et al. | 348/208.4 |
| 2012/0162451 A1* | 6/2012 | Liu | 348/208.4 |
| 2012/0162452 A1* | 6/2012 | Liu | 348/208.4 |
| 2012/0162475 A1* | 6/2012 | Lin et al. | 348/231.99 |

* cited by examiner

Reference Frame Ft+1 (translated and rotated etc. to remove jitter)

Captured frame t+1

Reference Frame Ft+1 (in original position in Captured frame t+1)

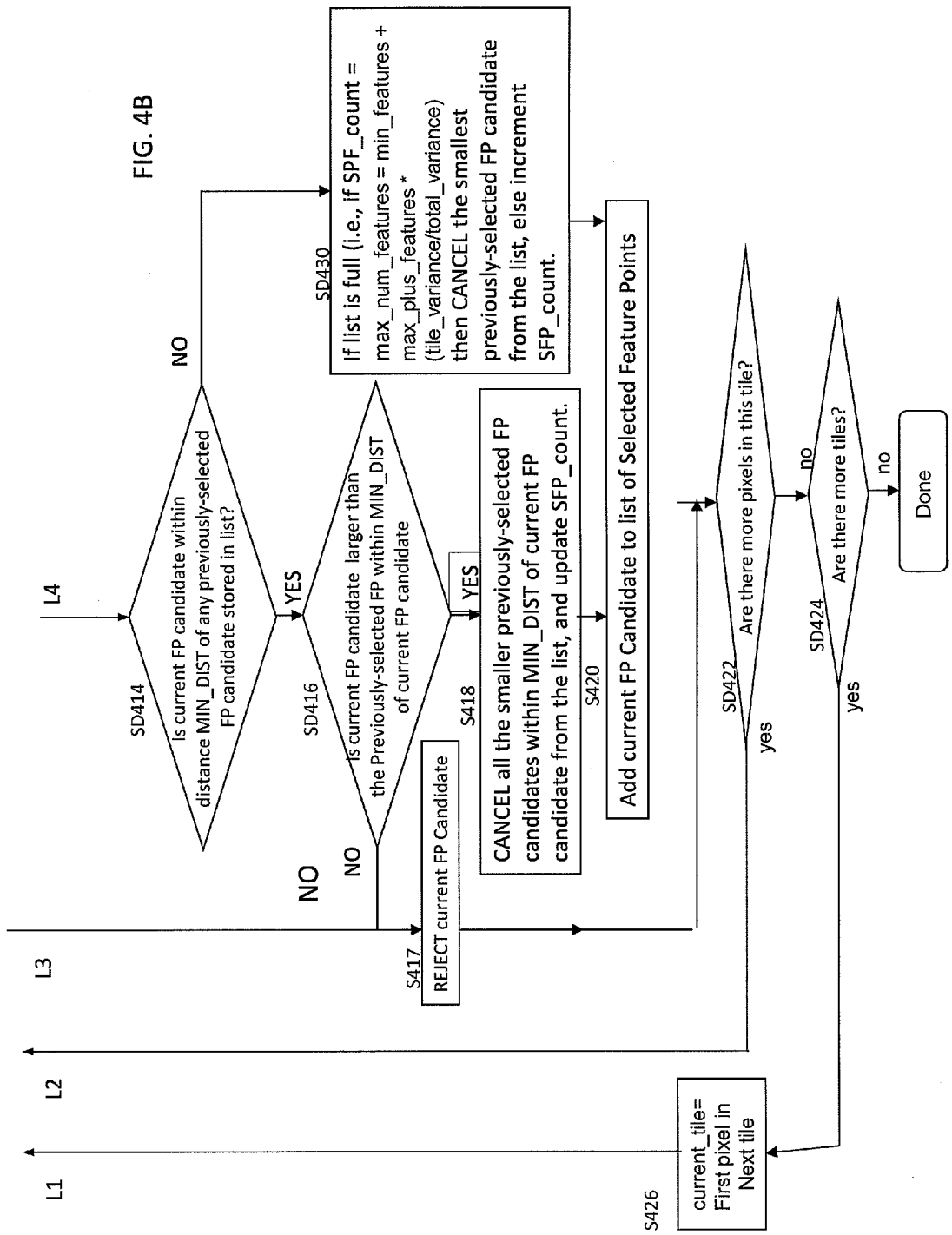

(a) Translational camera movement (b) Rotational camera movement (c) Translational camera movement

IMAGE PROCESSING CIRCUIT, METHOD OF OPERATION THEREOF, AND DIGITAL CAMERA INCLUDING SAME

CROSS-REFERENCE TO RELATED APPLICATION

This application claims priority under 35 U.S.C. §120 to U.S. Provisional Application Nos. 61/426,970, and 61/426,975, both filed in the U.S. Patent and Trademark Office on Dec. 23, 2010. The disclosures of both provisional applications are incorporated by reference herein.

1. TECHNICAL FIELD

The present inventive concept herein relates to digital image-stabilization (DIS), and more particularly, to a method of detecting, selecting and grouping feature points for digital image stabilization.

2. DISCUSSION OF THE ART

Digital cameras, digital video cameras and hand-held devices including such cameras capture are often employed to capture images or video while the camera is operated in the hand of a human operator. Thus, the video camera may be shaking or jittering in the operators hand while capturing the image or video. The jitter may include a horizontal component, a vertical component, and a rotational component. The rotation may be about an axis perpendicular to the focal plane of the image capturing circuit, or about an axis parallel to the focal plane of the image capturing circuit, or about an axis askew between a perpendicular axis and a parallel axis. The jitter may make the hand-captured video distracting or disorienting for the viewer, and thus it is desirable to use digital circuits to digitally estimate camera trajectory (i.e., the jitter as detected between each pair of consecutive frames) and to filter out the jitter from a sequence of video frames of the same scene. The circuits employed to estimate camera trajectory between consecutive video frames and to filter out the jitter caused by the camera's trajectory from a sequence of video frames may be contained within the video camera itself, and activated to remove in real time the jitter prior to storage of the captured video frames (e.g., prior to or during MEPG encoding if the video camera includes a real-time MPEG encoder). Alternatively the circuit employed to estimate camera trajectory between consecutive video frames and to filter out the jitter from a stored sequence of video frames may be a general purpose microcomputer controlled by software embodying a digital image stabilization (DIS) method, or may be a dedicated hardware, such as an MEPG video encoder embodied in an ASIC (application specific integrated circuit) optimized to perform a digital image stabilization (DIS) method.

The video produced by a steady, either stationary or moving video camera contains mainly smooth motions (translation, rotation) in the captured video. On the other hand, an unsteady video camera produces video with high frequency jitter (translational and/or rotational) throughout the video images.

Digital image sequences captured from physical imaging devices often display unwanted high frequency jittering motion. The amount of jittering motion present in an image sequence depends on the physics of the image capture device relative to objects in the captured sequence. The depth of the scene and the instability in the imager's mount, dependant on the mount's weight, inertia, balance, combine to create undesired jittery global motion.

A digital image stabilization (DIS) system first estimates unwanted (unintended) motion and then applies corrections to the image sequence. The visual effect of a stabilized video is highly dependent on the quality of camera trajectory estimation. Digital image stabilization (DIS) algorithms use well-tracked feature points to estimate the jittery motion between two consecutive frames. Digital video stabilization employs hardware and/or software methods for producing a spatially stabilized video from an otherwise unstable video containing unintended jerky motions caused by an unsteady video camera. In conventional DIS technology, camera movement is detected by analyzing motion vectors of various points in the scene. But the motion vectors can be caused by object movements as well as camera movement.

There are functions that provide a numerical score for each pixel of the frame, indicating how suitable this point is as a feature point detectable in timewise adjacent frames. One example of such a function is the Harris Corner Detector. However, the magnitude of the feature points are typically very different for different parts of the image. DIS methods may employ a global threshold, to be compared with each pixel's numerical score, that does not necessarily result in an optimal distribution of feature points. Thus, there may be too few feature points in regions of low contrast (e.g., blue sky without any clouds causing sparse or no feature points), while in regions with a lot of structure, the feature points may be too close to one another. The misdistribution of feature points can then increase the computational burden of calculating redundant motion vectors of the feature points that are too close, and can fail to provide accurate motion vectors.

In an implementation of a digital image stabilization (DIS) method, it is desirable to minimize the computational overhead in order to reduce power consumption of the circuit and to reduce the time required to perform the DIS method. It is also desirable to detect and measure the camera's trajectory and characterize the jitter accurately so that the jitter may be correctly compensated for and correctly removed from the stored/displayed video.

In mathematics, affine geometry is the study of geometric properties which remain unchanged by affine transformations, i.e. non-singular linear transformations and translations. A mathematical system of equations defined by numerical coefficients, called an Affine matrix, has been developed to characterize the lateral (up/down), rotational, and scalar (e.g., zoom in or zoom out) of movement detected between each pair of consecutive frames or between portions thereof (e.g., moving objects in the frames).

Thus, the jitter may be characterized by a first Affine transform matrix related to any actually-stationary objects (e.g., rocks, tables, parked cars, mountains, the sun) in the scene, called a Principal Transform, or Global Transform, while any moving objects (e.g., birds, people, balls, moving cars) in the frame may be characterized by additional Affine matrices.

The Principal Transform (principle inter-frame transform) indicating camera motion that may be caused by the user's hand jitter may be computed by detecting one or more points of interest (called "Feature Points") associated with the actually-stationary objects in each frame captured at time t, and then searching for the same Feature Points in a timewise adjacent frame (t+1), and computing a motion vector for each of the Feature Points. A plurality of motion vectors associated (grouped) with a particular object are then used to compute the Affine Transform of that object, which defines its detected motion according to the Affine equation:

$$x' = sx*x + ry*y + tx$$

$$y' = rx*x + sy*y + ty$$

Motion vectors of feature points between consecutive frames can be computed using various search methods employed in the field of video compression. Such search methods may employ a mathematical comparison of macroblocks, such as the sum of absolute differences (SAD), the mean absolute difference (MAD), or the mean square error (MSE), in two timewise adjacent frames (e.g., searching for the location of the feature point in a reference frame (t+1) by comparing the 8×8 pixel macroblock containing the feature point in the current frame with a plurality of 8×8 pixel macroblocks in a search area in the reference frame (t+1) centered about the location of the feature point). The measured amount and direction of the displacement of a macroblock centered about a feature point, between timewise adjacent frames (t and t+1), is called the "motion vector" of the feature point. Motion vector estimation methods of the related art using block matching algorithms (BMA) within various selected ranges are described in U.S. Pat. No. 6,895,361 by Yang, and in U.S. Pat. No. 7,680,186 by Lee, which are incorporated by reference herein.

Video stabilization algorithm can eliminate the jitter motion while keeping the user-intended camera motion. In general, jitter is caused by handshake and platform vibrations which will be faster (i.e., higher frequency) and nonlinear while camera motion will be slower and linear or monotonic. The global motion (cameral trajectory) vector is included in the affine transformation parameters of the compensation transform P(n) which are estimated between adjacent frames using matched feature point pairs.

A compensation transform P(n) for compensating camera jitter may be characterized as the first Affine transform matrix related to any actually-stationary objects (e.g., rocks, tables, parked cars, mountains, the sun) in the scene. In almost all cases the handshake and platform vibrations may result in translation, rotation and scaling of video frames. To model all these, a six parameter affine transform is required.

Even if the compensation transform P(n) is generated correctly to compensate for the unintended jittery motion, the resulting compensation frame may have a significant oscillating movement relative to the captured input video frames, and may extend beyond the image data available in some of the captured input video frames. This results in over-excursion of the compensation window.

To remove jerky motion in the video, the Compensation Unit crops out some boundary regions of each input video frame. The amount of removed boundary regions can be quantified as a cropping ratio. A large cropping ratio means more area at the boundaries is removed. An output video frame can be modeled as a compensation window superimposed over the input video frame. (see, e.g., FIG. 1) The compensation window can be rotated, shifted, scaled, etc. with respected to the input video frame.

For a given cropping ratio, the amount of movement of the compensation window is called compensation window excursion. Movement of the compensation window beyond the input video frame boundary is called compensation window over-excursion.

If there is no jitter (no unintended camera trajectory) then the compensation transform P(n) (based on feature points of actually-stationary objects) will be expected to be the same location in each of two or more consecutive frames (e.g., UNITY). If there is high frequency jitter, it is desirable to produce a spatially stabilized video having a reduced degree or reduced frequency of compensation window over-excursions.

A need therefore exists for a filtering method that adaptively balances between insufficient video stabilization and over-excursion.

SUMMARY

An aspect of the inventive concept provides a highly efficient process of identifying feature points, and of deriving motion vectors for the feature points that move in a coherent way because of global movement or camera movement, while at the same time being accurate for DIS purposes.

Good feature points for the DIS algorithm are points that yield non-ambiguous motion vectors when a suitable motion estimation algorithm is applied. To identify feature points in an image, a Harris Corner Detector applied to pixels of a video frame estimates how well suited each pixel is as a feature point. Different regions of the image have a different density of identified feature point candidates. A disclosed method of raster scan order selection and sorting provides a final feature point distribution based on small regions of the video frame, called tiles, where the maximum number of feature points grows linearly with the variance $\sigma^2$ of the luminance image data of the tile.

Each video frame is divided into a small number j×k of tiles. The number j×k of tiles can range from 4×4 for SD video to 6×6 or larger for HD video; other numbers in the range from (4 . . . 8)×(4 . . . 8) are also possible and may be beneficial. The tile size is chosen such that sufficiently large objects that move independently cover the majority of at least one tile, so that their motion can be captured for DIS purposes, while the motion of small objects is ignored.

Tiles having more interesting image data and therefore the need for more feature points are expected to have a higher variance $\sigma^2$. The feature point sorting algorithm finds a programmable minimum distance between feature points but requires minimal hardware memory.

A hierarchical motion estimation algorithm may be used to estimate the feature point movement from frame to frame, where the programmable motion range for the later search levels is intentionally small, thereby preferring large-object or global movement over local movement. Consequently, the required number of operations is minimized, while the results are sufficiently accurate for digital image stabilization applications.

For each of the feature points that have been selected, e.g., by a sorting algorithm, its motion vector is determined by block matching within a small range of start vectors that are used. The start vectors are the tile motion vectors of the tile containing the current feature point and of the surrounding tiles (e.g., Up, Down, Left, Right). The tile motion estimation is the first step in the process of deriving motion vectors of the feature points. Tile motion estimation is done on the basis of non-overlapping tiles that cover the central portion of the input image (e.g., the same tiles used in the feature point sorting algorithm). For tile motion estimation of each of the tiles, a full blockmatching search is performed on a down-sampled image.

The current frame is subsampled by a second subsampling factor $f_{s2}$ of four to eight for standard definition (SD) video or eight to sixteen for high definition (HD) video. In this subsampled domain, a full-search block matching is done for every tile and the tile vector is stored for later use (e.g., as a start vector for deriving the motion vectors of the feature points). One motion vector will be estimated for every tile, doing a full search with the lowest-resolution, subsampled by second subsampling factor $f_{s2}$, of subsampled luminance data, and the motion vector candidate that yields the lowest SAD is assigned to each tile. According to an embodiment, for the border tiles, the search may be restricted to the available search area, thus no motion vector that causes the reference block to be (partially) outside the search area will be generated. Relative to the resolution used, the tile motion search will generate half-pel accurate vectors: The search area will be upsampled by simple bilinear interpolation. This uses only very little local memory, thus saving memory and logic area in a VLSI implementation.

An aspect of the inventive concept provides a Digital Image Stabilization (DIS) method including a feature point motion vector grouping process for grouping pairs of feature points based on their motion vector magnitude ratio and the angular difference between their motion vectors. A method of processing video data is provided, comprising: receiving first image data representing a first frame; identifying a plurality of feature points in the first frame; receiving a second image data representing a second frame; deriving a motion vector corresponding to each of the feature points; selecting a first one of the motion vectors as the current vector A and selecting a second one of the motion vectors as the current vector B; and comparing vector A with vector B based on their vector magnitude ratio and their angular difference.

The method may further comprise: setting a magnitude ratio threshold and an angular difference threshold; and grouping vector A and vector B together if their vector magnitude ratio falls within the magnitude ratio threshold and their angular difference falls within the angular difference threshold. According to a further aspect, comprising: NOT grouping vector A and vector B together if their vector magnitude ratio falls outside the magnitude ratio threshold or if their angular difference falls outside the angular difference threshold.

According to an embodiment of the present inventive concept, a video processing circuit is provided, comprising: a feature point circuit configured to identify a plurality of feature points in a first frame and deriving a motion vector between the first frame and a second frame for each feature point; a paring controller configured to select one of the motion vectors as the current vector A (xa, ya) and to select a different one of the motion vectors as the current vector B (xb, yb); a magnitude ratio comparator configured to compare vector A with vector B based on their vector magnitude ratio; and a vector angle comparator configured to compare vector A with vector B based on their vector angular difference.

According to an exemplary embodiment, a method of processing video data is provided, comprising: estimating a motion vector for each feature point in a first frame of the video data; grouping motion vectors into motion vector groups based on vector magnitude ratios and angular differences; and selecting a group containing motion vectors representing the movement of a stationary object within a scene of the first frame. The method may further comprise: estimating a motion vector for each of a plurality of tiles divided from a portion of the first frame, using subsampled luminance data, and selecting the tile motion vector candidate having the lowest sum-of-absolute-difference (SAD); and grouping tile motion vectors into tile motion vector groups based on vector magnitude ratios and angular differences.

According to an embodiment of the present inventive concept, a camera is provided, comprising: an image capture circuit configured to capture images and convert a plurality of images to first frame and second frames of image data; and a video processing circuit chip comprising: a feature point circuit configured to identify a plurality of feature points in the first frame and deriving a motion vector between the first frame and the second frame for each feature point; a paring controller configured to select each pair of motion vectors among the motion vectors of the feature points; a magnitude ratio comparator configured to compare each pair of motion vectors based on their vector magnitude ratio; and a vector angle comparator configured to compare each pair of motion vectors based on their vector angle difference.

An aspect of the inventive concept provides a Digital Image Stabilization method including adaptively filtering a Principal/compensation transform P(n) representing a stationary/background object in the scene of a video frame, based on a history of compensation window over-excursions.

An aspect of the inventive concept provides a highly effective and predictable jitter removal method using a strong compensation (SC) filter. The SC filter is a highly frequency-selective high-order linear time-invariant digital filter. Effective filtering of very jerky input video using the SC filter implies significant movement of the compensation window through the captured input video frame. For a given cropping ratio, the amount of movement of the compensation window is called compensation window excursion. Movement of the compensation window beyond the captured input video frame boundary is called compensation window over-excursion. A strict application of the SC filter to a large-movement input video with will produce a very stable output video at the expanse of much compensation window over-excursion. On the other hand, a weak compensation (WC) filter having a lower frequency-selective characteristic will produce less compensation window over-excursions at the expanse of less stable output video.

An aspect of the inventive concept provides an adaptive compensation (AC) filter configured to prevent excessive over-excursion with large-movement input video while maintaining excellent video stabilization characteristics.

In an exemplary embodiment of the inventive concept, a caused linear time-variant filter, comprising a WC filter complements a SC filter, to product predictable characteristics. The combination WC/SC filter may be controlled based on the history of compensation window excursions over a plurality of K frames. Small excursions in the history permit a larger influence of the SC filter for the current frame n, whereas large excursions in the history warrants a larger influence of the WC filter for the current frame n. Medium excursions in the history assign proportional influences of the SC filter and the WC filter.

Another aspect of the invention provides a Digital Image Stabilization circuit adapted to perform the herein disclosed DIS methods. The circuit may be contained within a video camera itself, and activated to remove in real time the jitter prior to storage of the captured video frames (e.g., prior to or during MEPG encoding if the video camera includes a real-time MPEG encoder). Alternatively the DIS circuit employed to estimate camera trajectory between consecutive video frames and to filter out the jitter from a stored sequence of video frames may be a general purpose microcomputer controlled by software embodying a digital image stabilization (DIS) method, or may be a dedicated hardware, such as an MEPG video encoder embodied in an ASIC (application specific integrated circuit) optimized to perform a digital image stabilization (DIS) method.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the figures:

FIGS. 4A and 4B are flow charts of a method of identifying and selecting a plurality of Feature Points in each tile of the image frame of FIGS. 1A and 2A, for performing steps in the DIS method illustrated in FIGS. 1A through 1F;

DETAILED DESCRIPTION OF EXEMPLARY EMBODIMENTS

FIGS. 1A through 1F are views of a current frame and a reference frame, and selected Feature Points and motion vectors thereof, for illustrating the steps in a method of Digital Image Stabilization in accordance with an exemplary embodiment of the inventive concept.

Figure 1B:
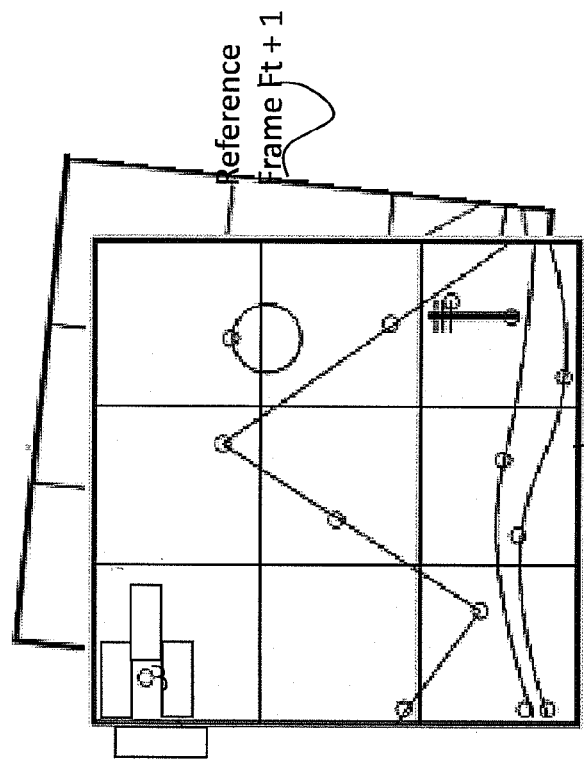
FIGS. 1A through 1F are views of a current frame and a reference frame, and selected Feature Points and motion vectors thereof, for illustrating in a method of Digital Image Stabilization in accordance with an exemplary embodiment of the inventive concept.
Figure 1A:
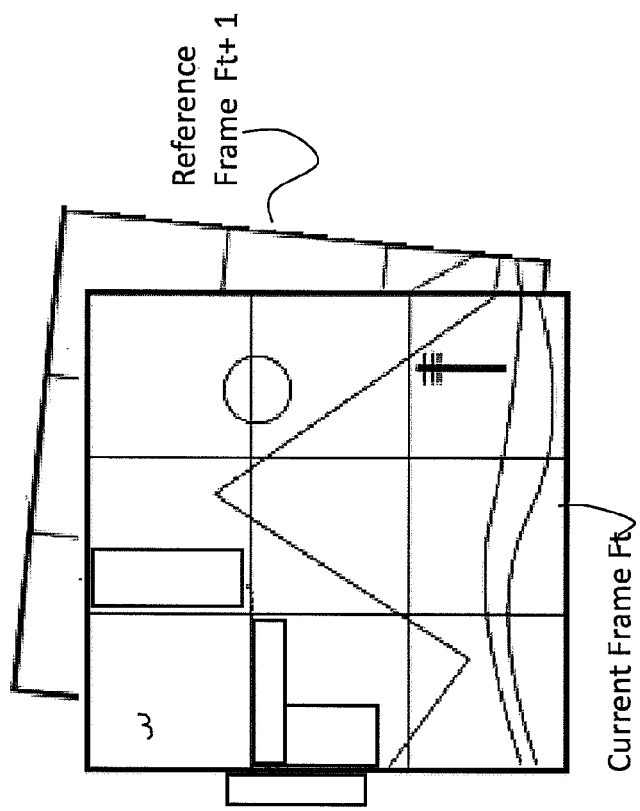
Figure 1D:
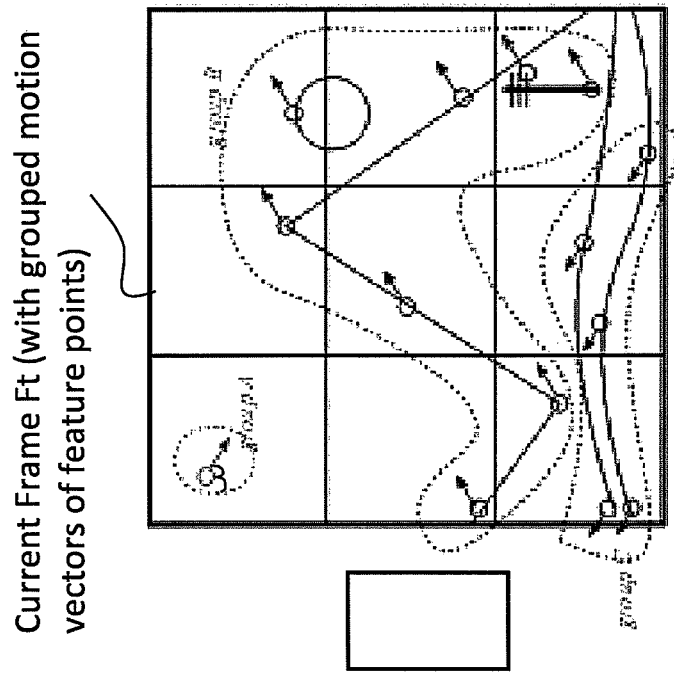

FIG. 1A shows two consecutive video frames, a current frame $F_t$ and a reference frame $F_{t+1}$, of a scene. The scene includes stationary objects, e.g., hills in the foreground, a pole, and mountains, and the sun, and a moving object, e.g., a bird in the top left. The current frame $F_t$ and the reference frame $F_{t+1}$ are portions of respective consecutive captured frames having a larger area (as shown in FIG. 1E). The larger captured frames are the raw images captured by an image sensor, before Digital Image Stabilization (DIS). The reference frame $F_{t+1}$ is rotated and translated relative to current frame $F_t$, due to a camera trajectory caused by jittery motion. The dimensions of the captured frame (see FIG. 1E) is typically predetermined by the hardware dimensions of the physical image sensor (not shown) of the video camera. The dimensions of the current frame $F_t$ and the reference frame $F_{t+1}$ may be selected dynamically to avoid or minimize the occurrence of "overexcursions" of the current frame $F_t$ beyond the bounds of the captured frame due to jittery motion of the camera.

FIG. 1B shows a plurality of selected feature points (circles) in the current frame $F_t$ associated with the actually-stationary objects and the moving object in the scene. The current frame $F_t$ is divided into a plurality of rectangular tiles, and each tile comprises at least one selected feature point. The selected feature points shown in FIG. 1B may be identified and selected by performing the steps of a method illustrated in FIGS. 2A, 2B, and 4A and 4B, and/or by the circuit of FIG. 3. The current frame and the reference frame are stored in the memory 350 of the circuit of FIG. 3 while the selected feature points shown in FIG. 1B are being identified and selected by performing the steps of the method illustrated in FIGS. 2A, 2B, and 4A and 4B.

Figure 1C:
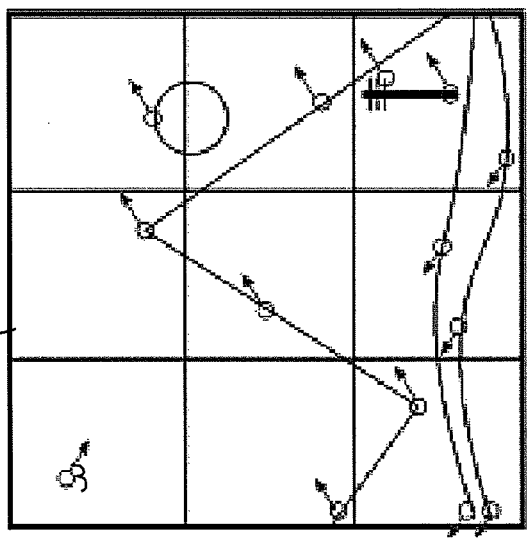

FIG. 1C shows each selected feature point of the current frame $F_t$ having a motion vector (arrows). The motion vectors of the selected feature points shown in FIG. 1C may be calculated by performing the steps of a method illustrated in FIGS. 6 and 7.

FIG. 1D shows that motion vectors in the scene have been grouped (e.g., group A, group B, group C). The motion vectors of actually-stationary objects in the scene (group B, and group C) were caused by camera-movement (e.g., jitter). The grouping of the motion vectors of the selected feature points as shown in FIG. 1D may be performed by the steps of the method illustrated in FIGS. 10A, 10 B and 10 C and FIG. 11 in which motion vectors are paired/grouped (included or excluded) based on a pairing algorithm using the magnitude ratio and normalized vector difference.

FIG. 1E shows the reference frame $F_{t+1}$ in the greater context of larger captured frame output by an image sensor (not shown). The position of the reference frame $F_{t+1}$ is determined by using the group B and group C motion vectors of actually-stationary objects as shown in FIG. 1D to define the affine coefficients of the reference frame $F_{t+1}$. The image data of the captured frame beyond the bounds of the reference frame may be made available to the circuits that performed the steps of a method illustrated in FIGS. 6 and 7 by which motion vectors of groups B and group C are calculated.

Figure 1F:
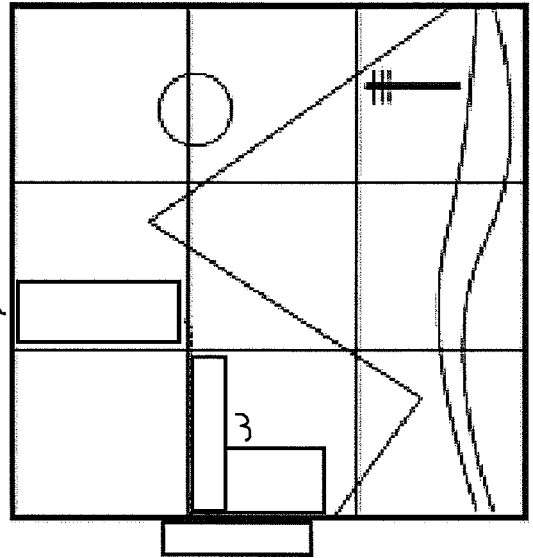
Figure 1E:
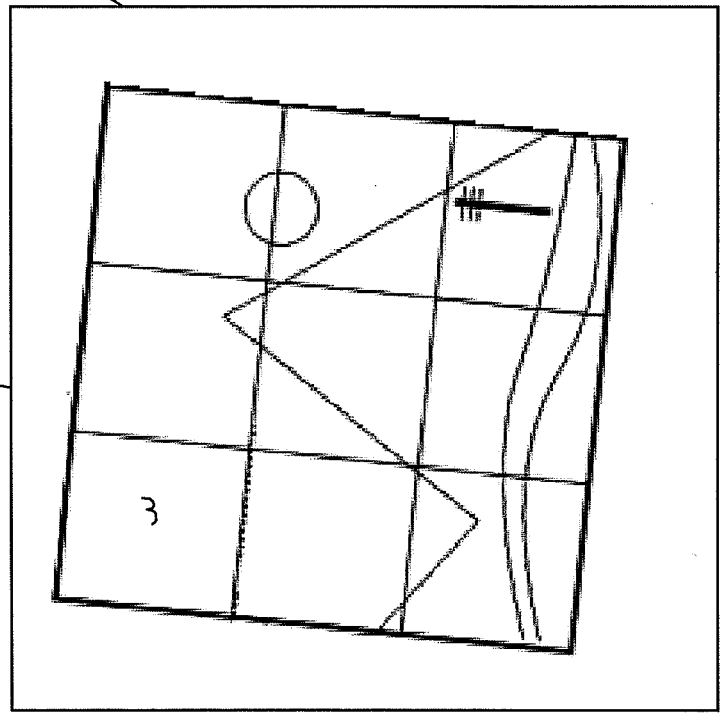

FIG. 1F shows the reference frame $F_{t+1}$ in the position it would have been received by the image sensor (not shown) but for the jittery camera motion indicated by the motion vectors of actually-stationary objects as shown in FIG. 1D. The affine coefficients of the reference frame $F_{t+1}$ have been applied by a compensation circuit (not shown) to rotate and translate the reference frame $F_{t+1}$ to correct for the jittery motion of the camera.

Feature Point Identification, Sorting and Distribution

Figures 2A, 2B:
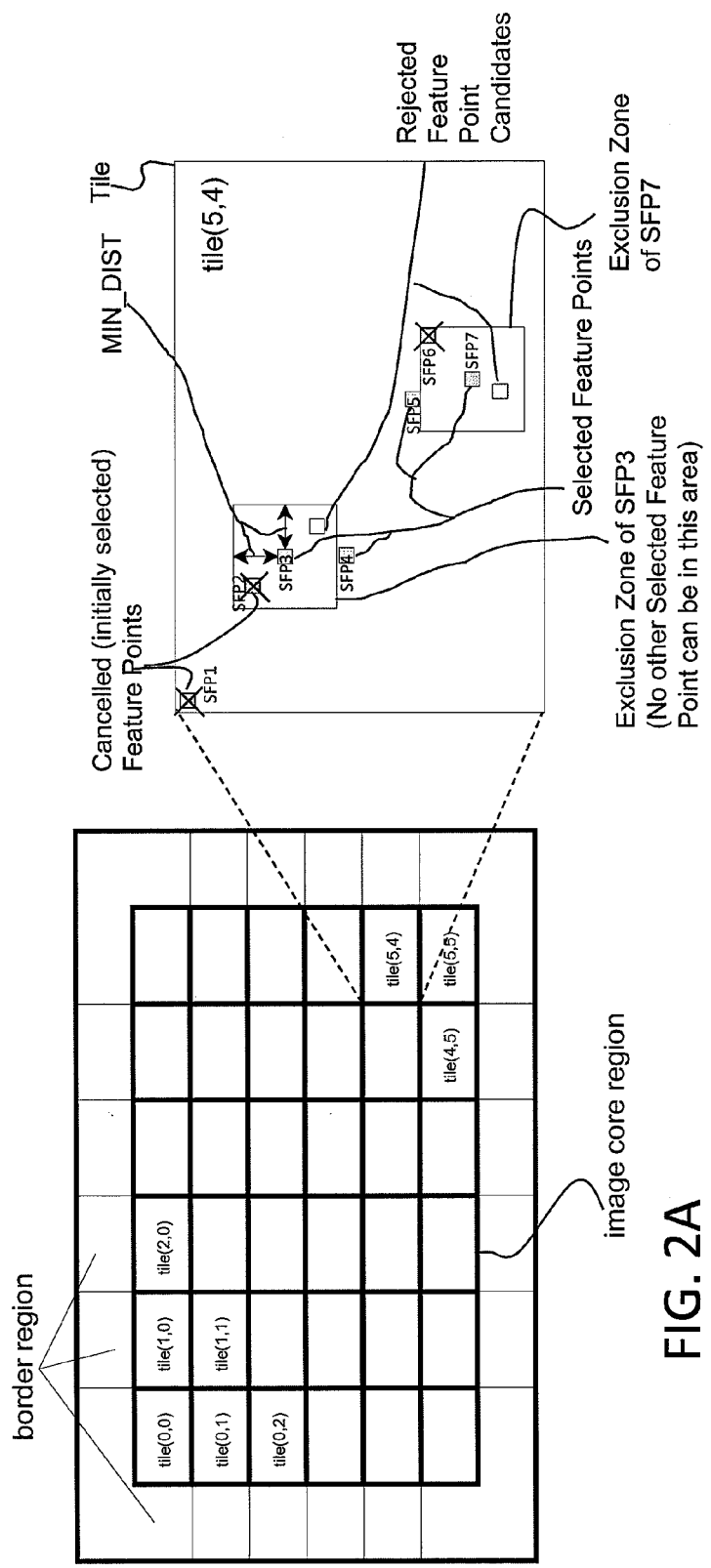
FIG. 2A is a diagram of the captured frame of FIG. 1E containing the current frame $F_t$ of FIG. 1A, and divided into a border region and a plurality j×k of tiles in a core region, in accordance with a step in the DIS method illustrated in FIGS. 1A through 1F.
FIG. 2B is a diagram of one tile in the core region of the image frame of FIG. 2A illustrating selected, rejected, and cancelled Feature Points, in accordance with steps in the DIS method illustrated in FIGS. 1A through 1F.

FIG. 2A is a diagram of the captured frame of the current frame $F_t$ (see FIG. 1E) divided into a border region and a plurality of j×k of tiles in a core region, to facilitate feature point identification and sorting in accordance with a step in the DIS method illustrated in FIGS. 1A through 1F. The boundary lines between the border region and the core region may be predetermined by hardware or by software independently of received image data content, while the bounds of the current frame $F_t$ may be dynamically selected based on the degree of jittery camera motion indicated by received image data content, for example, so as to prevent or reduce overexcursions of the current frame. Thus, the core region may or may not correspond to the dimensions and position of the current image frame $F_t$ shown in FIG. 1A.

Each captured video frame is divided into a small number of non-overlapping tiles (e.g., 4×4 tiles for Standard Definition and 6×6 or longer tiles for High Definition), for the purpose of algorithmically selecting feature points providing a good feature point distribution suitable for digital image stabilization. Different regions of the image may have a different density of suitable feature points. In extreme cases, a region of the frame may not have any suitable feature points, for example in the case of a blue sky without any clouds. In other regions, the potential feature points might be very dense. When a global-based threshold is used to identify and select all feature points, the feature points tend to be concentrated in small regions of the image, resulting in poor DIS results. It is still desirable to have more feature points in regions of the image where there is more structure, because there is potentially more interesting motion. In these dense regions another issue is how to ensure that not all feature points are lumped together. Thus an aspect of the present inventive concept provides an efficient method to ensure a minimum distance (MIN_DIST) between feature points to be used for DIS.

For the stability of the DIS algorithm, feature points are distributed as widely as possible, while at the same time limiting the total number of feature points. A "good distribution" of feature points can be expressed as follows: It has a large convex hull; feature points are not too close (MIN_DIST) to one another; in tiles with fewer suitable feature points, at least a minimum number (min_features) of feature points are chosen, if possible; and, in tiles having more of suitable feature points, more feature points (max_num_features=min_features+max_plus_features* (tile_variance $\sigma_2$/total_variance)) are selected.

The maximum number of feature points in each tile (max_num_features) is determined based on the tile's luminance variance $\sigma^2$.

In one embodiment, the maximum number of feature points in each tile (max_num_features) is the sum of a programmable minimum number of feature points per tile (min_features), plus the programmable maximum number of additional feature points (max_plus_features), multiplied by the ratio of the variance $\sigma^2$ of the specific tile over the sum of the tile variances. A correction factor can be applied if the tiles have different sizes. Thus, the maximum number of finally selected feature points per tile may alternatively be min_features plus the part of var_features that is proportional to the tile variance $\sigma^2$, normalized by the corresponding tile weight. Border tiles may be given a higher weight because they include the border region and are therefore larger. In this alternative case, the maximum number of feature points for a given tile is calculated as follows:

$$\text{max\_num\_features} = \text{MIN\_FEATURES} + \left[ \text{VAR\_FEATURES} \frac{\text{WEIGHT(tile)} \sigma^2_{256}(\text{tile})}{\sum_{t \in tiles} \text{WEIGHT}(t) \sigma^2_{256}(t)} \right]$$

Thus, the maximum number of selected feature points (max_num_features) is not kept constant in all tiles, nor kept constant between frames $F_t$ to frame $F_{t+1}$.

In one embodiment, the maximum number of feature points (max_num_features) in each tile is a function of the variance $\sigma^2$ of the luminance data in each tile divided by the overall luminance variance, requiring a prior calculation of the luminance variance $\sigma^2$ of each tile and the total variance of the frame. One ordinarily skilled in the art can readily appreciate that other functions are possible as well; for example, functions involving the average luminance value as well as the tile variance $\sigma^2$.

To identify feature points a corner detector such as a Harris Corner Detector or the like may be used. The Harris Corner Detector evaluates every pixel of the image as a possible feature point candidate. Preferred feature point candidates are points where the feature quality estimation function has a local maximum. The disclosed method of feature point selection optimizes the selection of feature points identified by the Harris Corner Detector by comparing the resulting value of each identified feature point (estimating how well suited this pixel is as a feature point) to a LOCAL rather than a GLOBAL (full-frame) threshold. Thus, the disclosed method takes into account feature point density at each local area and also differences in contrast in different parts of the frame.

The obtained feature point distribution is based on small regions of the video frame, (e.g. non-overlapping tiles), where the number of feature points in each tile increases linearly with the variance $\sigma^2$ of the luminance image data of the tile. Tiles with more interesting image data and therefore the need for more feature points are expected to have a higher variance $\sigma^2$.

Figure 4A:
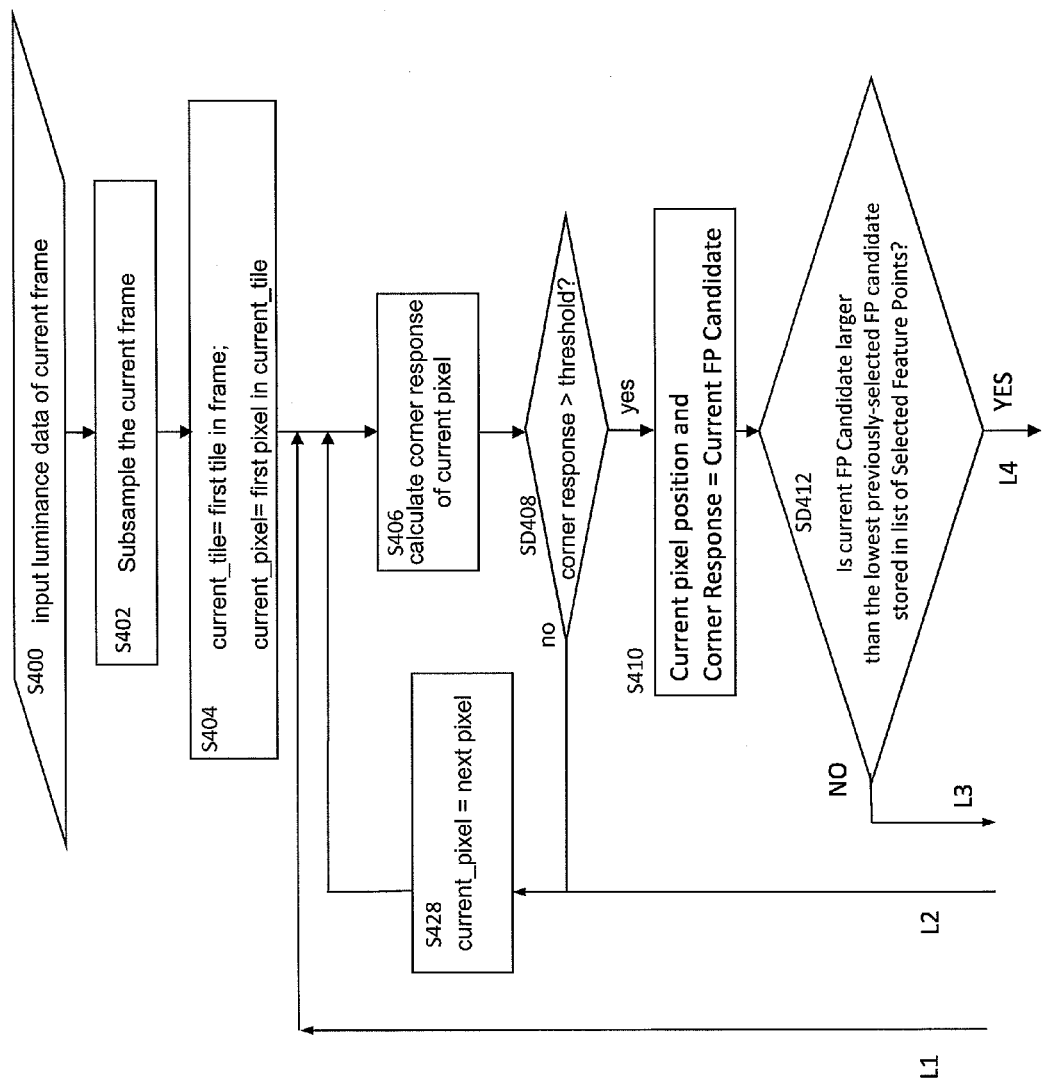

FIGS. 4A and 4B are flow diagrams that illustrates a method of determining a minimum distance (MIN_DIST) between feature points in each tile, while at the same time requiring only little local state information, thereby reducing the hardware implementation costs.

FIG. 2B is a diagram of one tile in the core region of the image frame of FIG. 2A, illustrating Selected (grey), Rejected (white), and previously-selected-but-Cancelled (grey but X'ed) feature points. The feature points shown as small squares in FIG. 2B have been identified as feature point candidates using the Harris Corner Detector algorithm and then sequentially selected, rejected or cancelled in raster scan order, in accordance with steps in the method illustrated in FIGS. 4A and 4B.

For each tile a maximum number (max_num_features) of identified feature point candidates are selected. According to an embodiment of the present inventive concept, each identified feature point candidate can be selected, e.g., in raster scan order by:

i. Identified feature point candidates are pixels where the Harris Corner estimation function exceeds a programmable threshold and where this estimation has a local maximum. To qualify as a local maximum, the value at the location in question must be greater than the value of all direct and diagonal neighbors that precede this pixel in scan order, but only greater than or equal to the value of the direct and diagonal neighbors that follow this location in scan order. This is done to accommodate the fact that identical values are quite likely.

ii. Once a feature point candidate has been identified, it will be entered into a data storage structure (e.g., a sorted list, but other implementations are possible) that can hold a predetermined maximum number of feature point candidates for each tile, e.g., a maximum of 32, 48, 64, or higher finally-selected feature points, provided there is no feature point candidate with a higher estimation function value that is within the programmable lockout range (MIN_DIST). For purposes of illustration, a maximum of 32 is selected to describe the present embodiment.

iii. If a later-identified feature point candidate has been stored in the data structure, all other feature point candidates having a smaller estimation function value that are closer to this point than the lockout range (MIN_DIST) are removed from the data storage structure.

For purposes of illustration, suppose the predetermined maximum number of feature point candidates of tile (5,4) is four (i.e., max_num_features=four). As shown in FIG. 2A, tile (5,4) contains four finally-selected feature points (grey) SFP3, SFP4, SFP5 and SFP7 in raster scan order, and three previously-selected-but-Cancelled feature points (grey but X'ed) SFP1, SFP2, and SFP6, plus two rejected (never-selected) feature points (white). The cancelled previously-selected feature points (grey but X'ed) SFP1, SFP2, and SFP6 were feature point candidates that were selected as feature points in raster scan order during the progress of the method illustrated in FIGS. 4A and 4B, but were subsequently cancelled as selected feature points either because they were within the exclusionary zone (MIN_DIST) of a larger feature point candidate that was later identified as a feature point candidate and selected, or because the list of selected feature points became full (i.e., the number of selected feature point candidates SFP_count=max_num_features) and the earlier-selected feature point was the smallest among the list of selected feature points and was smaller than a feature point candidate that was later identified and selected.

The cancelled previously-selected feature point SFP1 was the first feature point to be identified and selected in raster scan order in accordance with steps in the method illustrated in FIGS. 4A and 4B. Later, cancelled previously-selected feature point SFP2 was identified and selected, but after SFP2 was selected, selected feature point SFP3 was identified and was larger than SFP2. Since SFP2 is within the exclusionary zone (MIN_DIST) of larger, selected feature point SFP3, SFP2 was immediately cancelled when SFP3 was selected. After SFP3 was selected, a feature point candidate was identified in the lower right corner of the exclusionary zone (MIN_DIST) of SFP3, and because that feature point candidate was smaller than SFP3 and within its exclusionary zone, it was immediately rejected (i.e., not selected). Then, a feature point candidate was identified below and just outside of the exclusionary zone (MIN_DIST) of SFP3, and it became selected as SFP4 (and was not afterwards cancelled). Then, a feature point candidate was identified further below and to the right of the exclusionary zone (MIN_DIST) of SFP3, and it became selected as SFP5 (and was not afterwards cancelled as it was close to but not within the exclusionary zone of SFP7). Then, a feature point candidate was identified below and to the right of the exclusionary zone (MIN_DIST) of SFP5, and it became selected as SFP6 (but was afterwards cancelled as it was within the exclusionary zone of larger later-selected feature point SFP7). When SFP6 became selected, the list of selected feature points was already "full" (e.g., the maximum number of feature points for this tile was four), and because SFP1 was the smallest among the list of then-selected feature points SFP1, SFP3, SFP4, and SFP5, and because SFP6 was larger than SFP1, SFP1 was cancelled. Then, a feature point candidate was identified below and within the exclusionary zone (MIN_DIST) of SFP6, and it became selected as SFP7 (because SFP6 was immediately cancelled because selected feature point SFP7 is larger than SPF6 and/or because the list was full etc.). Then, a feature point candidate was identified below and within the exclusionary zone (MIN_DIST) of SFP7, and it was rejected (not selected) because that last feature point candidate is smaller than SFP7. It is possible that SFP7 is actually smaller than cancelled SFP2 (if SFP3 is much larger than SFP7) but a good distribution of feature points has been obtained. The programmable lockout range (MIN_DIST) ensures that finally-selected feature points are not clustered too close together.

The pixel luminance variance $\sigma^2$ of each tile may be determined during the downscaling process in which each tile is downsampled. The maximum number feature points in each tile is determined as the sum of a programmable constant minimum number of feature points per tile plus the number of total variable feature points multiplied by the ratio of the variance $\sigma^2$ of the specific tile over the sum of the tile variances. A correction factor may be added for the area of the edge and corner tile regions, as the feature points can also be in the border region. For each tile, up to the maximum number of feature candidates are collected and stored using a sorting process, i.e., selecting, rejecting, canceling described above, for each feature point candidate identified in raster scan order. Last, the final-selected feature point candidates for each tile are simply the feature point candidates with the highest estimation function response, the maximum number of which has been predetermined. There may be instances where there are not enough feature point candidates available in a given tile, such as a tile of low contrast image data, in which case the resulting number of feature points finally used will be smaller than the programmed minimum number (e.g. a smaller number than min_features).

Thus, a method of processing feature point candidates in raster scan order is provided wherein a list comprising at most the calculated maximum number of selected feature points not clustered too close together is maintained even while more new feature point candidates may be later identified and selected. This raster scan order method of sorting feature points has the advantage of reducing the amount of memory and computation compared to various other methods of prioritizing and selecting from among identified feature point candidates. For example, in an alternative embodiment, all feature point candidates of a tile might be identified and stored in a large list stored in a memory, and then only after all the feature point candidates of a tile have been identified, a mathematical sorting algorithm might be applied to find the optimal set (of a predetermined maximum size) of the largest feature point candidates that are not within the exclusion zone (MIN_DIST) of any other member of the set. However, such a sorting algorithm requires more physical memory (to store the entire list of identified feature point candidates of a tile) and potentially requires more total computation than the raster-order sorting (selecting, rejecting, canceling) method of FIGS. 4A and 4B, exemplary results of which are shown in FIG. 2B. The raster scan order sorting algorithm of FIGS. 4A and 4B does not necessarily provide a set of selected feature points that is a global optimum, since a feature point candidate can be canceled from the list by a feature point candidate that is later selected but later cancelled itself, but rather provides an algorithm that can be implemented in hardware with limited local storage. Although the method of FIGS. 4A and 4B are described as processing identified feature point candidates in "raster scan order" (i.e., from left to right and from top to bottom) which is the pixel order that Harris Corner Detector ordinarily proceeds, any sequence of selection of feature point candidates can be employed by the method, such as discontinuous sequences of non-adjacent feature point candidates, as long as all feature points are identified and are ultimately sorted sequentially.

Figure 3:
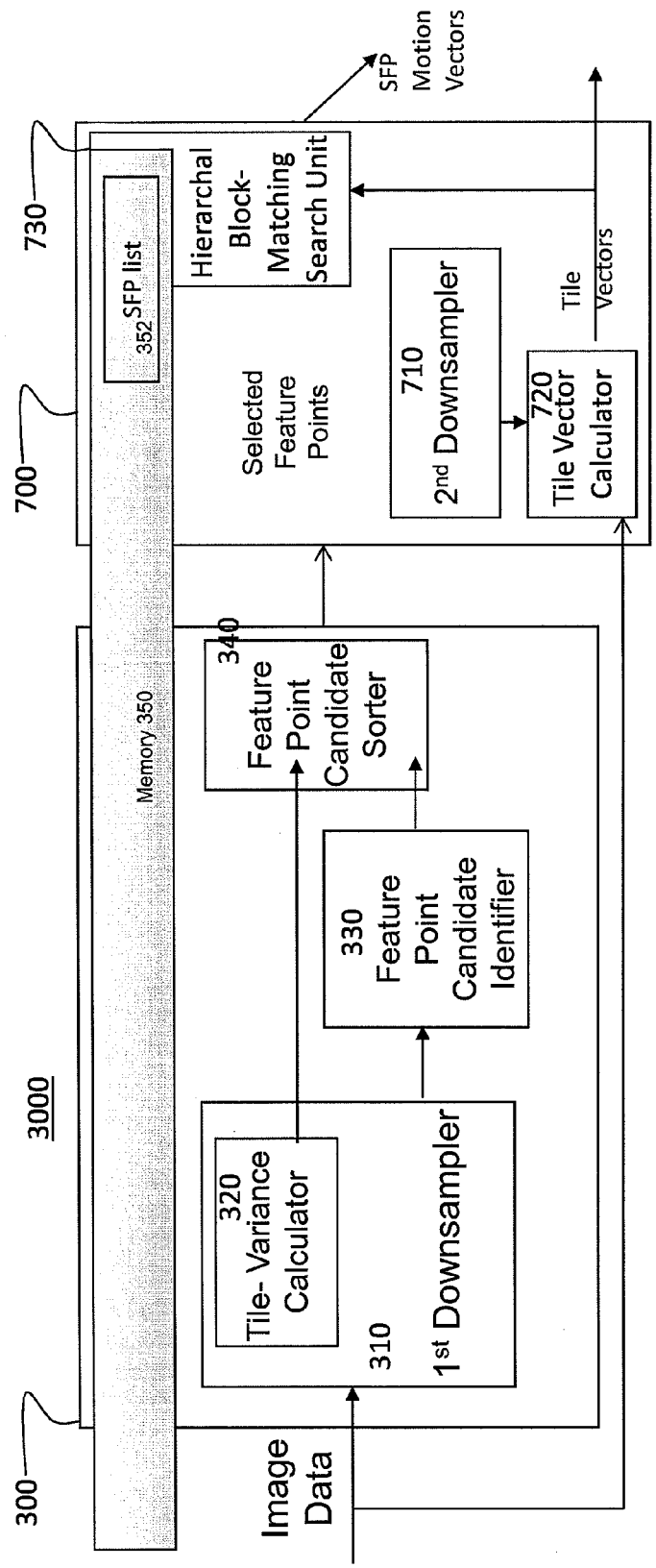
FIG. 3 is a diagram of circuit blocks configured to perform DIS processes according to embodiments of the present inventive concept.

FIG. 3 is a block diagram of Feature Point Circuit according to an embodiment of the present inventive concept. Feature Point Circuit 3000 comprising a Feature Point Selector 300 and a selected feature point (SFP) Motion-Vector Calculator 700 and a shared RAM Memory 350. The Feature Point Selector 300 comprises a Downsampler 310, a Feature Point Candidate Identifier 330, and a Feature Point Candidate Sorter 340.

The Feature Point Candidate Identifier 330 identifies feature point candidates using a Harris Corner Detector algorithm and outputs the identified feature points, e.g., in pixel locations and Harris Corner responses, in raster scan order one tile at a time, to the Feature Point Candidate Sorter 340. The Feature Point Candidate Sorter 340 is configured to perform the method of seriatim sorting of identified feature points of each tile of FIGS. 4A and 4B as further illustrated in FIGS. 1B and 2B. The Downsampler 310 includes a Tile-Variance $\sigma^2$ Calculator 320 functional block that calculates the tile-variance $\sigma^2$ of each tile of the image frame, according to the equation:

$$\sigma^2 = \frac{\sum y^2}{N} - \left(\frac{\sum y}{N}\right)^2$$

where the y values are the luminance values within the tile and N is the number of pixels in the tile.

The circuit as shown in FIG. 3 may be implemented in a semiconductor chip, having input/output pins configured to receive image data from a camera having sensors that capture images and circuitry to convert the captured image into image data. Data processed by the circuit of FIG. 3 are output via the input/output pins to other components of the camera. As will be further described below, the memory 350 resides within the semiconductor chip and to minimize the size of the chip, the memory need to be small in physical size and therefore storage capacity is limited. To save computational power and to reduce the number of required operations, the Feature Point Selector 300 may operate only on luma data, which will be horizontally and vertically subsampled by the Downsampler 310 by a factor $f_{s1}$ of 2, 4, or 8 (a factor $f_{s1}$ of 4 is chosen from the present embodiment). The $f_{s1}$ downsampled luma data is used for feature point identification by the Feature Point Candidate Identifier 330, and in alternative embodiments may be later used for the feature point motion-vector estimation by the Hierarchical Block-Matching Search Unit 730 of the SFP Motion-Vector Calculator 700. While the smaller downsampled image is calculated by the Downsampler 310, the luminance variance (tile-variance) $\sigma^2$ of each tile is calculated, and global maxima of the smaller eigen-value of the 3×3 Harris corner matrix are identified. Both the tile offset, which is the coordinate of the upper left pixel of the upper left tile, and the tile pixel dimensions are preferably multiples of the largest subsampling factor ($f_{s2}$) used. It is also preferred that the image core region is centered in the overall image. Therefore, the width of the left border region is identical to the width of the right border region and the height of the upper border region is the same as the height of the lower border region. (see FIG. 2A)

Once the input frame luminance data has been subsampled and stored in the RAM memory 350, the Feature Point Candidate Identifier 330 reads it back in tile order and sequentially feeds identified feature point candidates into the Feature Point Candidate Sorter 340. For the feature point identification process of block 330, the statistics area of potential feature points in the tiles adjacent to the border area extends into the border area, and thus the pixels of each border region tile are processed together with the pixels of the adjacent tile.

The pixel data is read within each tile in raster scan order: Lines from top to bottom, pixels within each line from left to right.

To process each tile, the Feature Point Candidate Identifier 330 needs three additional pixels on each internal tile border for feature point identification, using the Harris corner detector. Consequently, these pixels will be read more than once. Identified feature point candidates are pixels in each tile where the lower eigenvalue λ1 of the Harris matrix has a local maximum. To qualify as a local maximum, the corner response of the pixel in question must be greater than the corner response of the upper left, upper, upper right, and left neighbors and greater than or equal to the corner response of the right, lower left, lower, and lower right neighbors. With this definition, at least one point of a larger region with the same constant corner response will be identified as potential feature candidate. The detection logic for the local maxima will require two line buffers of corner responses. Points with a local corner response maximum are first compared with a programmable corner response threshold. If the corner response of the point in question is smaller than this threshold, it is ignored. Otherwise, the feature point's coordinates and its corner response are presented to the Feature Point Candidate Sorter 340.

The Feature Point Candidate Sorter 340 keeps track of up to max_num_features (e.g., 32) feature point candidates having the highest corner response in each tile, while simultaneously ensuring that all feature points have a minimum programmable distance (MIN_DIST) from one another. The distance used in the above algorithm between two points is defined as follows:

$$dist\left(\begin{pmatrix} x_1 \\ y_1 \end{pmatrix}, \begin{pmatrix} x_2 \\ y_2 \end{pmatrix}\right) = \max(|x_1 - x_2| \cdot |y_1 - y_2|)$$

The sorting in the method of FIGS. 4A and 4B are done with operations taking into account only the current contents of the sorter's list of selected feature points and of the incoming feature point candidate and making a decision right away. Therefore, the Feature Point Candidate Sorter 340 adapted to perform the method of FIGS. 4A and 4B will not inherently calculate the global optimum, and the results will depend on the order in which the incoming feature point candidates are presented.

Feature Point Candidate Sorter 340 outputs the selected feature points seriatim and they are stored in a SPF list in a portion of the memory 350 of the circuit of FIG. 3

FIGS. 4A and 4B are flow charts of a method of identifying and selecting a plurality of Feature Points in each tile of the image frame of FIGS. 1A and 2A, for performing steps in the DIS method illustrated in FIGS. 1A through 1F. The method begins with data input step S400 in which luminance data of a current frame $F_t$ are received, followed by downsampling step S402. Initialization step S404 resets the tile counter value current_tile and the pixel counter current_pixel.

Next, Harris Corner Detector is performed (steps S406, SD408, and S410) in raster scan order upon each pixel of the downsampled luminance data of the current_tile as current_pixel as the incremented (step S428). Each time the current_pixel's corner response exceeds a local maxima or threshold, (i.e., the "yes" branch of decision step SD408) the current_pixel is identified as the current FP (feature point) candidate (step S410) and is then immediately subjected to the feature point sorting algorithm (SD412, SD414, SD416, S417, SD430, S418, S420).

The feature point sorting algorithm SELECTS (S420) the current FP candidate only if it is larger than lowest previously-selected FP candidate already stored in list of Selected Feature Points. (Yes branch of decision step SD412), else the current FP candidate is REJECTED (Rejection step S417) without ever being selected (No branch of decision step SD412]. If the list of selected feature points is already full, as indicated by the selected feature point count SFP_count, (i.e., SFP_count=max_num_features=min_features+max_plus_features*(tile_variance/total_variance)) when the current FP candidate is SELECTED, then CANCEL the smallest previously-selected FP candidate from the list (SD430), elsewise increment the SFP_count value (SD430).

The feature point sorting algorithm SELECTS (S420) the current FP candidate only if it is not within the exclusionary zone (MIN_DIST) of any larger (SD416) previously-selected feature point already on the list (SD414). Thus, if the current FP candidate is within MIN_DIST of any larger (SD416) previously-selected feature point already on the list (SD414), it is REJECTED (No branch of decision step SD416, and Rejection step S417) without being selected. On the other hand, if the current FP candidate is within MIN_DIST of any smaller (SD416) previously-selected feature points already on the list (SD414), all the smaller (SD416) previously-selected feature points are CANCELLED (Yes branch of decision step SD416, and Cancellation step S418), and the current FP candidate is SELECTED (S420), and the SFP_count is updated (e.g., decremented or left the same) accordingly (418).

Once the current FP candidate has been SELECTED (S420) or REJECTED (S417), the Harris Corner Detector outputs the value of the next (S428) current_pixel (S410) of the current_tile (SD422) and the next identified PF candidate is immediately subjected to the feature point sorting algorithm (SD412, SD414, SD416, S417, SD430, S418, S420), etc. If the last pixel of the current_tile has been processed (SD422), then the next tile (SD424, S426) is processed. If the last tile has been processed, then the process is DONE until the next image frame is to be processed.

Feature Point Motion Vector Calculation

After the feature points of each tile in the current frame $F_t$ have been identified and sorted, the next step in the DIS method of FIGS. 1A through 1F is to obtain motion vectors for each of the selected feature points.

Block matching algorithms (BMA) used for calculating the motion vectors of feature points are well known. In block matching, an error function (e.g. SAD, MAD, MSE) is calculated for all possible positions of a block in a target area of the reference frame. The position with the lowest result of this function is used to calculate the estimated motion vector. Block matching is computationally expensive. There are several known ways to reduce the computational cost. Hierarchical or multi-resolution block matching is one of these ways in which the global movement is calculated first at lower resolutions. The resulting vectors will be used to search a smaller range at higher resolutions, thereby reducing the total number of arithmetic operation needed.

For most applications and for video encoding in particular, accurate motion vectors are needed for all blocks of a frame. Consequently, the search range in the later stages is usually relatively large. In the digital image stabilization (DIS) method illustrated in FIGS. 1A through 1F, it is only necessary to estimate the relative movement of feature points (e.g., of actually-stationary objects) from one frame to the next. For purposes of image stabilization, accurate motion vectors representing the movement of the background and large objects are needed, whereas smaller objects do not need to have an accurate motion vector associated with them. Any inaccurate vectors for smaller objects can be filtered at a later stage of the DIS algorithm.

It is expected that feature points of the large stationary objects of significance in the DIS method will move in a coherent way because of global movement or camera movement. We recognize that sufficiently large objects that move independently cover the majority of at least one tile, so that their motion can be estimated as the predominate motion of the tile itself, while the motion of small objects has little affect on the motion vector of the tile itself. Thus, the process of calculating motion vectors may be modified to reduce computations, by using a hierarchical motion estimation algorithm and by preferring tile movement over local movement, using the motion vector of the tile. Thus, a first step is to divide the current image frame into a plurality j×k of tiles. (This first step shall have already been performed for the purpose of feature point selection as above described in regards to FIGS. 1B and 2A).

A second step of calculating the motion vectors of the feature points accurate enough for DIS would be to derive one motion vector per tile, using block matching on the lowest resolution. In this step, the SAD (sum of absolute differences) for a given tile is calculated. The motion vector for a given tile is the one that minimizes the SAD. The SAD (sum of absolute differences) for a given motion vector candidate v=(vx, vy) is defined:

$$SAD(v_x, v_y) = \sum_{(x,y) \in tile} |ref(x, y) - search(x + v_x, y + v_y)|$$

By using a low resolution downsampled image, computation is reduced and the effect of small objects in the scene is further reduced.

In the third step, the motion vectors of the tiles will be used in a block matching algorithm as start vectors for the local search for the motion vector of the feature points in each tile. Because a sufficiently large object that covers the majority of at least one tile may extend into adjacent tiles, it is probable that some feature points in each tile may be associated more strongly with the motion vector of an adjacent tile rather than the motion vector of the tile they are found within. Thus, it would be effective to use the motion vectors of all the adjacent tiles as multiple start vectors in the block matching search for the motion vector of the feature points of any given tile. The tiles used here are centered in the frame with a border region of a size of at least the maximum supported motion vector, such that the motion search for all feature points in all tiles can be done without referring to pixels outside the frame.

Figure 5:
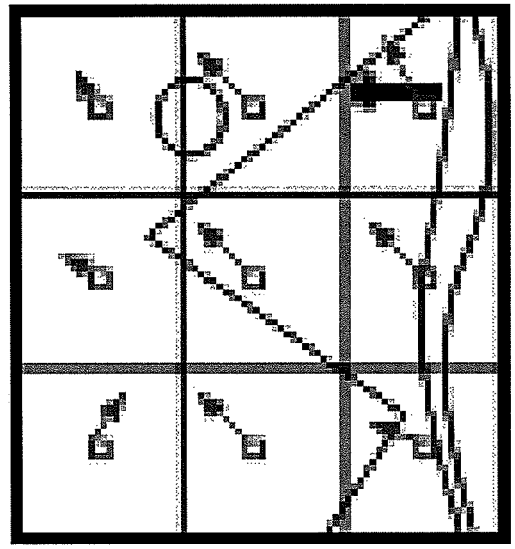
FIG. 5 is a view of the current frame $F_t$ of FIG. 1A downsampled with tile motion vectors superimposed thereon, for illustrating motion vector calculation steps in the DIS method illustrated in FIGS. 1A through 1F.

FIG. 5 is a view of the current frame $F_t$ of FIG. 1A downsampled with calculated tile motion vectors superimposed thereon, for illustrating motion vector calculation steps in the DIS method illustrated in FIGS. 1A through 1F. The smaller (less pixels, less data) image in FIG. 5 is derived from the original current captured frame or from the previously subsampled image thereof (step S402 of FIGS. 4A and 4B) by subsampling both horizontally and vertically. Subsampling by a subsampling factor $f_{s2}$, e.g., 4, is used for global (tile) motion estimation. The 4×4 downsampling just averages 16 pixels (with rounding), without any overlap on the input side. Then, a block matching search using each entire subsampled tile is performed to determine each tile's motion vector.

The motion vector for a given tile is the one that minimizes the SAD. In case of a tie, the first one found is taken. The motion vectors will be used as start vectors for the local search for the motion vectors of the nearby feature points. The motion range about each start vector is programmable.

Since the number of operations needed for the tile motion estimation are only about 12% of the operations needed for the local motion estimation, it is sufficient to calculate the sum of about 8 absolute differences per cycle. Therefore, no systolic array is needed.

Figure 6:
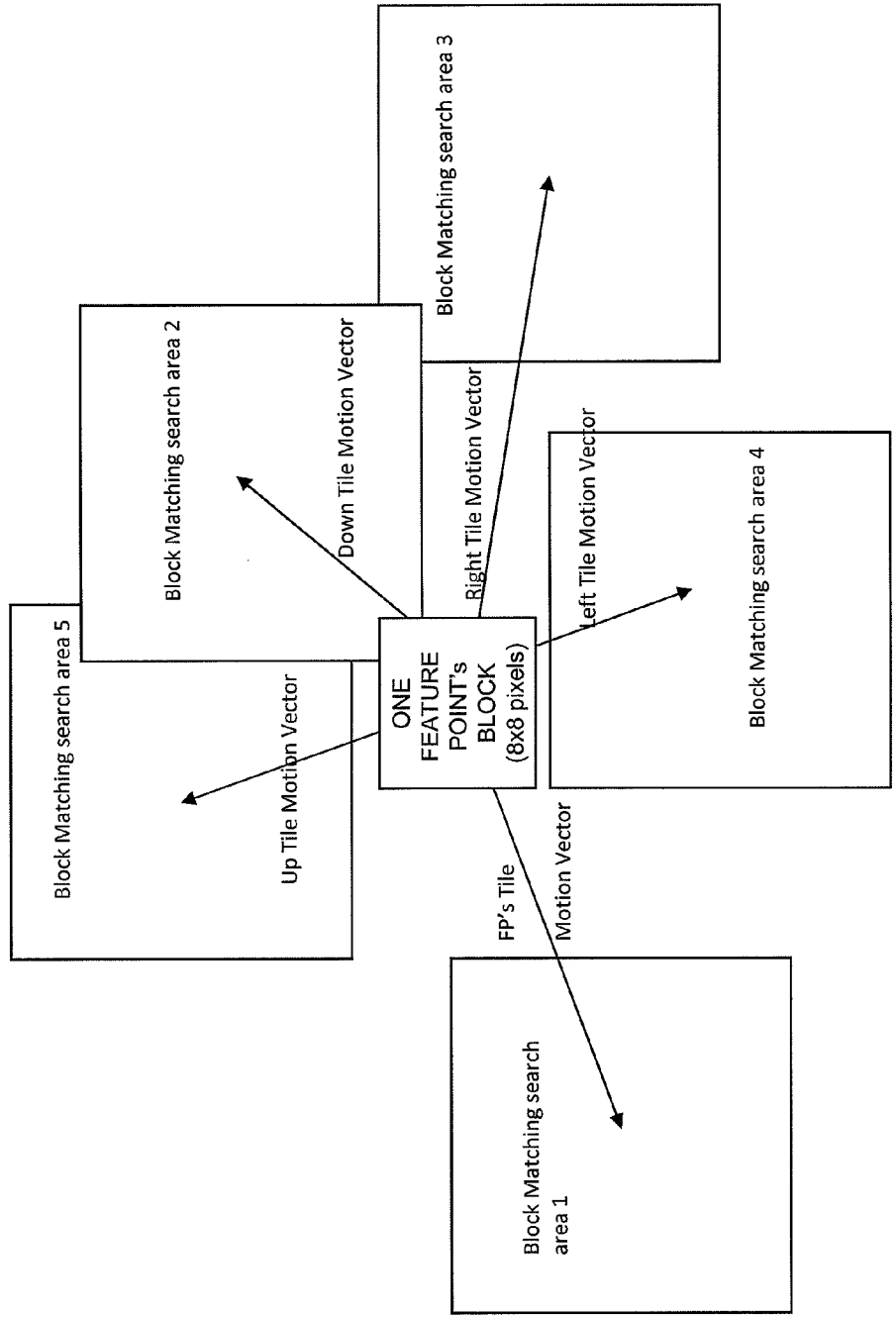
FIG. 6 is a view of a portion of a tile in the downsampled frame of FIG. 5 illustrating using the tile motion vectors of FIG. 5 as start vectors for a block matching search to calculate the motion vector of a selected feature point used in the DIS method illustrated in FIGS. 1A through 1F.

FIG. 6 is a view of a portion of one tile in the downsampled frame of FIG. 5 illustrating using the tile motion vectors of FIG. 5 as start vectors for a block matching search to calculate the motion vector of one selected feature point used in the DIS method illustrated in FIGS. 1A through 1F.

A small local block matching search is performed in a higher-resolution domain around each of a set of start vectors for every feature point in the tile. This step could be performed at the original video resolution, or subsampled by a factor $f_{s3}$ of 2 or 4. The start vectors used are the tile motion vectors that have been determined above. The start vectors used are those of the tile the feature point belongs to as well as those belonging to the four direct neighbors (Upper tile, Left tile, Right tile, Lower tile), provided it exists. Thus, in FIG. 6: the start vector corresponding to Block Matching search area 1 is the feature point's (FP's) own tile's motion vector; the start vector corresponding to Block Matching search area 2 is the block Down below the FP's tile's motion vector; the start vector corresponding to Block Matching search area 3 is the block Right of the FP's tile's motion vector; the start vector corresponding to Block Matching search area 4 is the block Left of the FP's tile's motion vector; and the start vector corresponding to Block Matching search area 5 is the block Up above the FP's tile's motion vector. According to another embodiment, the start vectors of the four diagonal neighbors, are used. Other steps for selecting among start vectors (e.g., to reduce the number of block matching computations) can be performed, particularly if a first group of tile vectors have magnitudes and direction similar to each other suggestive of one large object (see discussion of motion vector grouping regarding FIGS. 8A, 8B, 9, 10A, 10B, 10C). Alternatively, block matching can be performed with priority given or only where the two or more Block Matching search areas overlap, or between those nearest to each other, etc.

Generally, assignment of motion vectors to feature points will proceed tile by tile, and every feature point of a given tile will use the same start vectors (e.g., the same selection of tile motion vectors). However, in various other embodiments, feature points in different parts of a given tile may use a different selection of start vectors, on the premise that a feature point adjacent to tiles in a detected grouping of tile motion vectors may more likely be a visible point on the same object that is commonly found in each member of that group. Thus, a block matching search might first be performed on those feature points near the perimeter of each tile, to detect if they are all or mostly all similar to their own tile's motion vector and/or to the tile motion vector of adjacent grouping of tile motion vectors. If, for example, the motion vectors of all the initially selected feature points (e.g., all those near the perimeter of a given tile, or farthest from its center point) are in the same or similar to their own tile's motion vector, then the set of selected start vectors for the remaining feature points may be reduced.

For each start vector used, we use a very small range for the local search. The goal here is not so much to determine accurate vectors for each and every feature point. Rather, the feature points of interest are those that belong to the background or large objects. For those feature points, one of the tile motion vectors should be good, or close to the motion vector of the feature points of interest, and therefore, a small local search about each selected tile motion vectors is sufficient.

Referring again to FIG. 3, the SFP (selected feature point) Motion-Vector Calculator 700 of the Feature Point Circuit 3000 comprises a second Downsampler 710 for outputting more-downsampled luma data than the first Downsampler 310 for tile vector calculation, a Tile-Vector Calculator 720 for calculating each tile's motion vector, and a Hierarchical Block-Matching Search Unit 730 to determine and output the motion vector of each Selected Feature Point (SFP) received from the Feature Point Candidate Sorter 340 of the Feature Point Selector 300. The second Downsampler 710 outputs the deeply downsampled current frame $F_t$ shown in FIG. 5. The second Downsampler 710 outputs the deeply downsampled luma data of the current frame $F_t$ shown in FIG. 5. Tile-Vector Calculator 720 calculates the motion vector of each tile using the deeply downsampled luma data of the current frame $F_t$ output by the second Downsampler 710. Hierarchical Block-Matching Search Unit 730 determines the motion vector of each of the selected feature points output by the Feature Point Candidate Sorter 340 of the Feature Point Selector 300, using the full-resolution luma data (or the output of the first downsampler 310) of two consecutive frames, and using the Tile Vectors as start vectors as described above.

Figure 7:
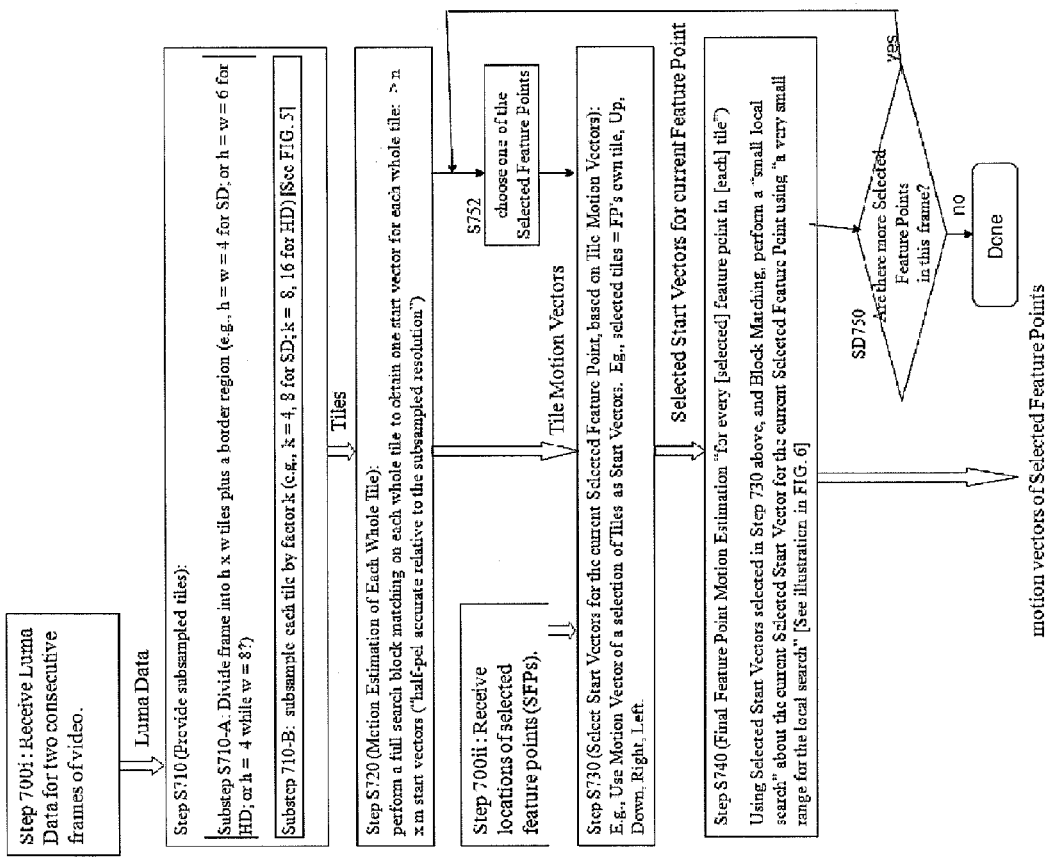
FIG. 7 is flow chart of a method of calculating the motion vectors of the selected feature points in the image frame of FIGS. 1A and 2A, for performing steps in the DIS method illustrated in FIGS. 1A through 1F.

FIG. 7 is a flow chart illustrating a method of calculating the motion vectors of the selected feature points (SFP) in the current frame $F_t$ of FIGS. 1A and 2A, for performing steps in the DIS method illustrated in FIGS. 1A through 1F.

In initial steps, the Hierarchical Block Matching Search circuit 730 shown in FIG. 3 receives luma data of two consecutive frames of video, the current frame and the reference frame (step S700i) and the pixel locations of the Selected Feature Points (S700ii). The current frame $F_t$ is divided into a plurality of subsampled tiles (S710) which can be preferably the same as the tiles previously used in the feature point sorting method of FIGS. 4A and 4B. In substep S710-A the current frame $F_t$ is divided into a plurality j×k of tiles plus a border region as illustrated in FIG. 2A. In substep S710-B the luma data associated with every tile is subsampled by factor $f_{s2}$ (e.g., $f_{s2}$=4, 8 for SD; $f_{s2}$=8, 16 for HD), as illustrated in FIG. 5.

Next, in step S720 the motion vector of each tile is calculated using full-search block matching with the deeply subsampled luma data, as illustrated in FIG. 5, achieving half-pel precision relative to the subsampled resolution. The calculated minimum-SAD values corresponding to calculated motion vectors may be saved for use in other features of the DIS (e.g., to filter out feature points of small objects). In step S730, start vectors are selected for the current Selected Feature Point (SFP) based on the calculated tile motion vectors from step S720, as described herein above. In step S740, a Hierarchical block-matching algorithm is carried out with full resolution luma data and using the selected start vectors based on the tile vectors to determine the motion vector of the current SFP. Steps S730 and S740 are repeated until the motion vector of every SFP in every tile has been calculated (through loop SD 750 and S752).

Feature Point Grouping by Motion Vector Magnitude and Direction

Motion between video frames is detected by calculating motion vectors of identifiable "feature points" in adjacent frames. Motion vectors of feature points may then be "grouped" for the purpose of identifying moving-objects within the scene, as distinguished from global motion of the camera/scene. The global motion of the camera/scene is analyzed to distinguish between intended (e.g., panning) and unintended (jittery) global motion.

If there is no camera motion (no camera trajectory) then each detected Feature Points of actually-stationary objects (e.g., the corners of rocks, the peaks of mountains) will be expected to be found in the same location in each of two or more consecutive frames, and the motion vector of all those detected Feature Points will be measured as null. However, if there is camera motion, then the vectors of the many Feature Points of any given actually-stationary object may have different magnitudes and direction. A Digital Image Stabilization circuit may be used to correctly "group" a plurality of motion vectors (of Feature Points) so that they are attributed to the same actually-stationary object.

Usually camera movements are the mixture of translational and rotational movements, and the distance from camera to the objects in the scene varies. While translational camera motion contributes the magnitude differences of motion vectors based on the object distance from camera, the rotational camera motion contributes both of magnitude and direction of motion vectors.

Figure 8A:
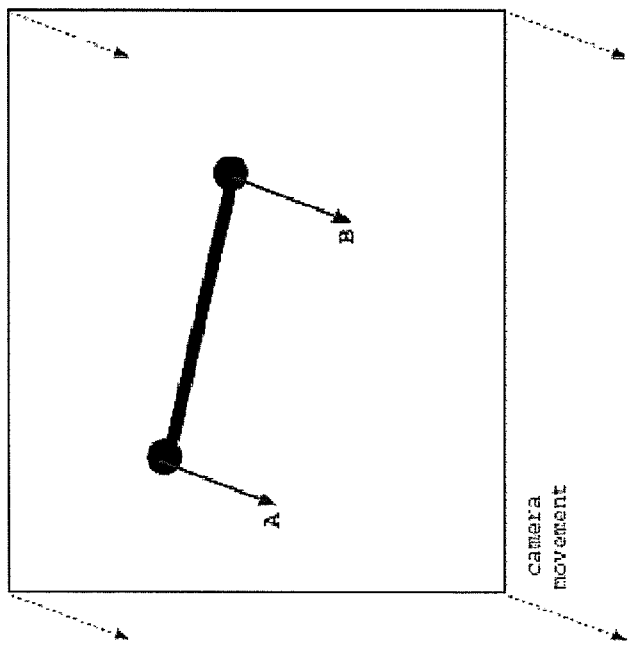
FIG. 8A is a diagram of motion vectors of two feature points of the same actually-stationary object in a video scene at the same distance from the camera when the camera has only translational movement and no rotational component.
Figure 8B:
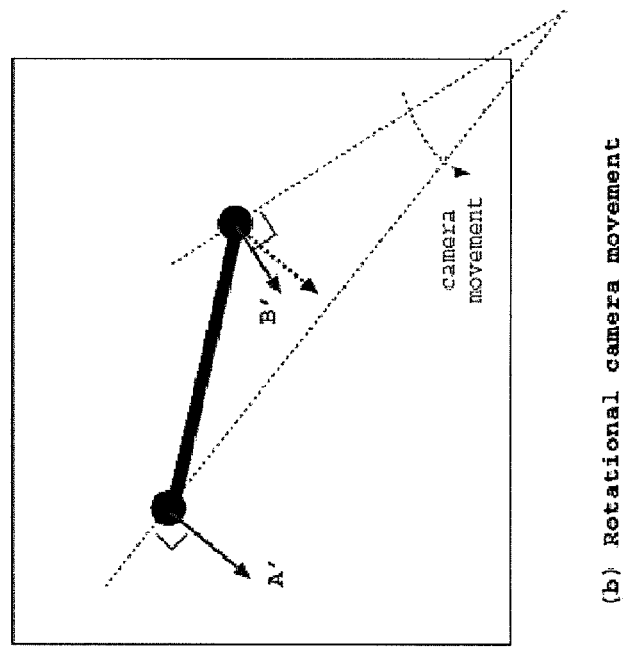
FIG. 8B is a diagram of motion vectors of two feature points of actually-stationary objects at the same distance from the camera when the camera has a rotational component.

FIGS. 8A & 8B illustrate the different vectors that result from rotational camera motion as compared with purely translational vector motion. In the figure, assume two selected feature points SFP4 & SFP5 of the same stationary physical object are physically the same distance from camera, and vector A is the motion vector of SFP4 and B is the motion vector of SFP5 in the case of purely translational camera motion, and vector A' is the motion vector of SFP4 and B' is the motion vector of SFP5 in the case including rotational camera motion.

With purely translational camera motion vectors A & B will have exactly the same motion vectors, but vectors A' & B' have different magnitude and different direction due to the rotational camera motion, even though they are in the same distance from the camera.

Figure 8C:
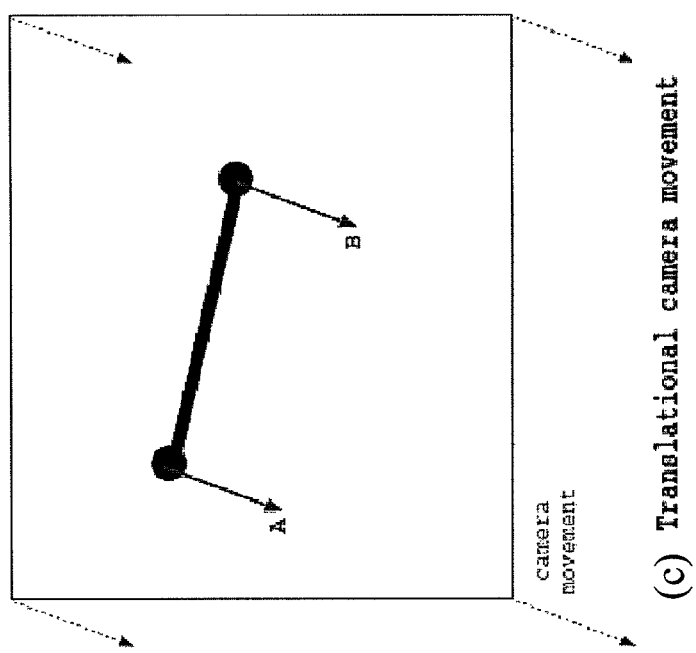
FIG. 8C is a diagram of motion vectors of two feature points of the same actually-stationary object at different distances from the camera when the camera has only translational movement and no rotational component.

FIG. 8C illustrates the different vectors that result from purely translational vector motion in the case where two feature points of the same stationary object are different distances from the camera. Assume two selected feature points SFP4 & SFP7 of the same stationary physical object are different physical distances from the camera, and vector A is still the motion vector of SFP4 and vector C'' is the motion vector of SFP7 in the case of purely translational camera motion. Because SFP7 is closer to the camera than SFP4, while they are points on the same stationary object, the magnitude of their motion vectors are different (vector C'' is bigger than vector A)

Thus, while grouping motion vectors, a margin of vector difference is needed to account for the vector magnitude and vector direction (angle) differences caused by these factors so that the motion vectors of all the feature points of the same stationary object can be grouped together. The usual way of detection of motion vector groups, with an error margin and use of simple motion vector differences, is to define an error threshold.

The magnitude of motion vector difference $\Delta M$ is the measurement that may be used as the basis for grouping decisions, and the error margin $Th_{\Delta M}$ may be defined as:

$\Delta M = \text{SQRT}((xa-xb)^2 + (ya-yb)^2) < Th_{\Delta M}$, where

A=(xa, ya);

B=(xb, yb); and

Th$_{ΔM}$ is an error threshold for the magnitude of vector difference ΔM. (a positive number)

The magnitude of motion vector difference method is adequate when the camera movement is purely translational (up, down, and/or side to side) because the motion vectors of all stationary objects' feature points will have the same direction, because they are all defined by the same translational camera movement. As illustrated by comparing FIGS. 8A and 8C the motion vectors of different stationary feature points can also be different due to being different distances from the object(s) to the camera, even in the case of purely translational camera movement. The magnitude differences of motion vectors of feature points of the same stationary object are typically relatively small in the usual video scene, and the magnitude difference can also be tolerated by allowing some margin of vector magnitude difference (|A|−|B|), and the magnitude of motion vector difference ΔM method is adequate in this case.

Figure 9B:
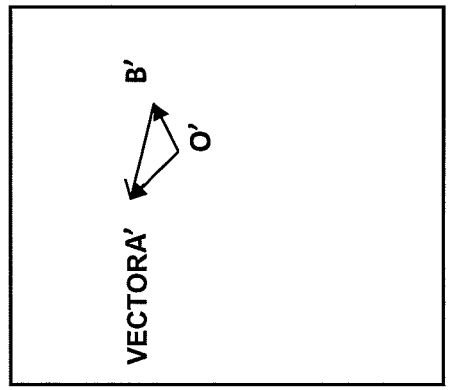
FIGS. 9A and 9B are diagrams of two pairs of motion vectors of feature points of actually-stationary objects in a video scene, for illustrating that each pair may have the same magnitude of vector difference even while the four motion vectors' directions and magnitudes are all different.
Figure 9A:
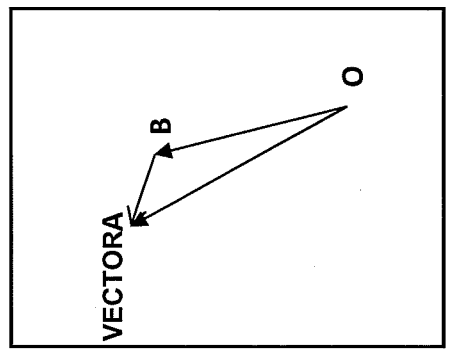

FIG. 9A illustrates a case of two motion vectors A and B in which the magnitude of vector difference ΔM is a good basis for grouping two feature points together.

The magnitude of vector difference ΔM alone may not be good basis for grouping vectors in some cases.

FIG. 9B illustrates a case of two motion vectors A' and B' in which the magnitude of vector difference ΔM' cannot be a good basis for grouping two feature points together.

In FIGS. 9A and 9B, pairs of vectors (A,B) and (A',B') have exactly the same magnitude of vector difference (ΔM=ΔM') as shown. Each of pairs (A,B) and (A',B') can also have its respective magnitude of vector difference ΔM, ΔM' within the error margin Th$_{ΔM}$. Vector pair A and B can be appropriately grouped together on the basis of the magnitude of their vector difference ΔM. But vector pair A' and B' has too much angular (directional) difference (e.g., compare with the pair A and B), for it to be appropriate to group vector A' and vector B' together in the same group.

The magnitude of vector difference ΔM method by itself may in instances be not suitable for motion vector grouping where two feature points have their magnitude of vector difference within the margin Th$_{ΔM}$ while they have too much angular (directional) difference. A rotational component of the camera's trajectory can cause one or more feature points of stationary objects to have the same or a similar magnitude, but different directions, which is not detected by the magnitude of vector difference method. Thus, the magnitude of vector difference method may cause incorrect jitter compensation and/or less than optimal video compression, and/or excessive computational power or time consumption, and/or video artifacts due to incorrect video compression of stationary or of moving objects.

The motion vectors of the selected feature points (SFP) output by the Hierarchical Block-Matching Search Unit 730 of the Feature Point Circuit 3000 are next grouped according to their magnitude and direction to associate the motion vectors of selected feature points (SFPs) with objects in the scene based on the object's perceived relative movement between consecutive video frames.

When camera movement has rotational component, such as about an axis orthogonal to the plane of the image sensor/photodiode array, the direction of motion vectors of one object (e.g., the background) cannot be the same. Both of the magnitude and direction of the vectors are different for different feature points of the background, even if they are actually stationary and are the same distance from the camera.

Instead of using only the magnitude of motion vector difference ΔM and the error margin Th$_{ΔM}$ for the grouping decision, we use the magnitude ratio of motion vectors and normalized vector difference to detect and tolerate some amount of motion vector differences caused by rotational camera motion.

Where vector A=(xa, ya) and vector B=(xb, yb),

A first grouping decision criteria is based on the Magnitude ratio |b| where $$|b|^2=(|B|/|A|)^2=(|B|^2)/(|A|^2)=(xb^2+yb^2)/(xa^2+ya^2)$$

A second grouping decision criteria is based on normalized vector difference (used for the evaluation of angle difference)=|a−b|, where $$|a-b|^2=[\{(xa-xb)^2+(ya-yb)^2\}/(xa^2+ya^2)].$$

Because the first grouping decision is based on magnitude ratio (|B|/|A|) rather than absolute difference (A−B), we use magnitude ratio threshold $r_{th}$ instead of absolute error margin Th$_{ΔM}$. For grouping decisions, we define lower bound of magnitude ratio threshold and upper bound of magnitude ratio threshold as Mr$_{Lth}$ and Mr$_{Uth}$ respectively.

$$Mr_{Lth}^2<|b|^2<Mr_{Uth}^2,$$

where $$Mr_{Lth}=(1-r_{th}); \text{ and}$$

$$Mr_{Uth}=(1+r_{th}); \text{ and}$$

$$0<r_{th}<1$$

For example, if we allow 30% of magnitude ratio threshold, $r_{th}$ will be 0.3; Mr$_{Lth}$ will be 0.7; and Mr$_{Uth}$ will be 1.3, resulting in the following range:

$$0.7^2<|b|^2<1.3^2$$

For an angular difference between vector A and vector B not exceeding a threshold of $θ_{th}$ degrees, the second grouping decision criteria is $$|a-b|^2<Ma_{th}^2,$$

where $$Ma_{th}^2=SQRT(1+|b|^2-2*|b|*\cos θ_{th}); \text{ and}$$

$$|b|=SQRT\{(xb^2+yb^2)/(xa^2+ya^2)\}$$

The grouping method using decisions based on these two grouping decision criteria can perform optimal motion vector grouping even in the presence of rotational camera movement.

Figure 10:
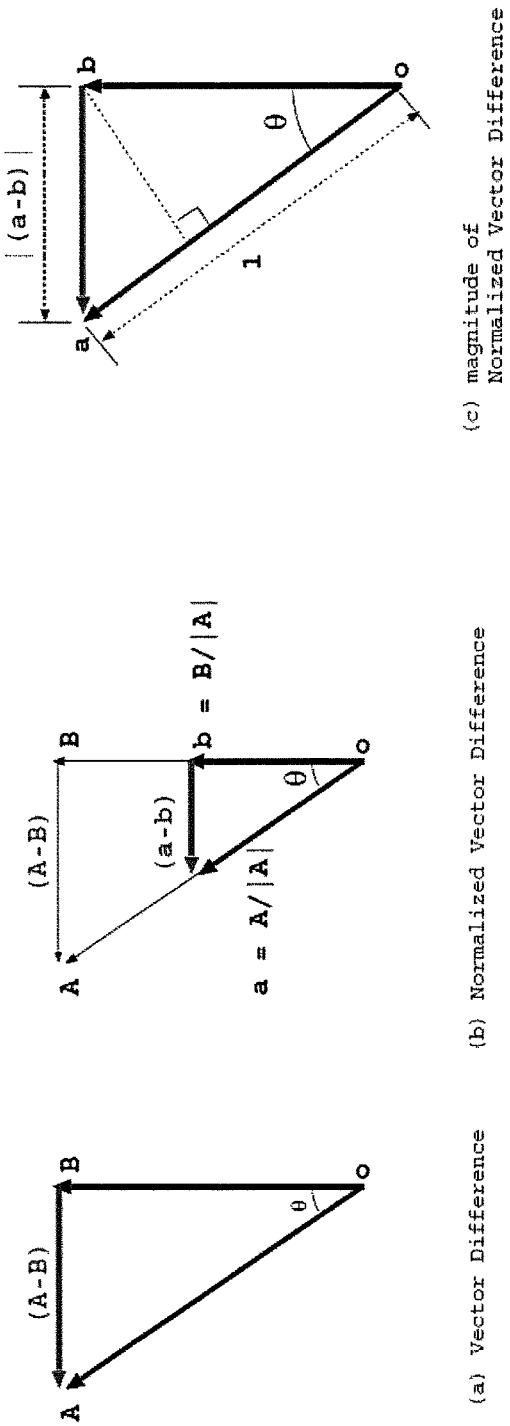
FIG. 10 shows three vector diagrams illustrating the calculation of normalized vector difference for the indirect measure of angle difference used for feature point grouping in the DIS method illustrated in FIGS. 1A through 1F.

FIG. 10 shows three vector diagrams illustrating the calculation of normalized vector difference for the indirect measure of angle difference used for feature point grouping in the DIS method illustrated in FIGS. 1A through 1F. Referring to diagram (a) in FIG. 10, difference vector (A−B) between vector A and vector B is drawn as the horizontal vector labeled (A−B). For ease of reading, diagram (c) is drawn to a larger scale than diagrams (a) and (b). The absolute magnitude ΔM(A−B) of the difference vector (A−B) would be calculated as follows:

$$ΔM(A-B)=SQRT((xa-xb)^2+(ya-yb)^2), \text{ where}$$

$$A=(xa,ya)$$

$$B=(xb,yb)$$

Referring to diagram (b) in FIG. 10, the normalized vector-a is defined as vector A divided by the absolute value of vector |A|, and thus the normalized vector-a has magnitude of ONE (see diagram (c) of FIG. 10). The normalized vector-b is defined as vector B divided by the absolute value of vector |A|. Magnitudes |A| and |B| are defined by these equations:

$$|A|^2 = (xa^2 + ya^2)$$

$$|B|^2 = (xb^2 + yb^2)$$

Note that b=B/|A|, thus the Magnitude ratio is absolute value |b|=|B|/|A|=|(B/|A|)|. Thus, |b| is the magnitude of normalized vector-b, which has been normalized by dividing vector B by magnitude |A| of vector A (i.e., b=B/|A|). Thus, Magnitude ratio |b|=SQRT{(xb^2+yb^2)/(xa^2+ya^2)}.

Because the magnitude |a| of normalized vector-a is ONE, the magnitude |b| is also equal to the magnitude ratio between: the magnitude |a| of normalized vector-A divided by magnitude |b| of normalized vector-b. Thus, magnitude |b| is referred to as the Magnitude Ratio |b|. The Magnitude Ratio |b| is not a function of the angle difference θ between vectors A and B.

As our first grouping decision criteria, we check if |b| (|b|=|A|/|B|) is within the lower and upper magnitude ratio thresholds of $Mr_{Lth}$ and $Mr_{Uth}$. If $|b|^2 < Mr_{Lth}^2$ or $|b|^2 > Mr_{Uth}^2$, then we decide that vector A and vector B cannot be in the same group. But, if $Mr_{Lth}^2 < |b|^2 < Mr_{Uth}^2$ then we make a second comparison based using the normalized vector difference |a−b| as the criteria.

The absolute magnitude |(a−b)| of the normalized vector difference (a−b) is computed according to this equation:

$$|a-b|^2 = [\{(xa-xb)^2 + (ya-yb)^2\}/(xa^2+ya^2)]$$

The normalized vector difference (a−b) has absolute magnitude |(a−b)| as shown in diagram (c) of FIG. 10, in which lengths |a|, |b| and |(a−b)| form a triangle with vector difference angle θ being opposite side |(a−b)|, which means that |(a−b)| can also be calculated using the cosine rule as a function of θ. The cosine rule defines the mathematical relation between the length of an unknown side of a triangle to the length of the other sides and the angle opposite to the unknown side. The magnitude |(a−b)| of normalized vector difference (a−b) may be obtained using the cosine rule equation, if the angle between two vectors is given:

$$|(a-b)| = SQRT(1 + |b|^2 - 2*|b|*\cos\theta).$$

Thus, an angle threshold expressed as a threshold of magnitude |(a−b)| of normalized vector difference (a−b) (the side of the triangle opposite the angle difference θ in diagram (c) of FIG. 10), can be calculated as a function of |b| and the angle difference θ, as indicated by the cosine rule. Thus, we may define threshold magnitude $Ma_{th}$ of the magnitude |(a−b)| as an angle difference threshold value $θ_{th}$, wherein $Ma_{th}$ is a function of a chosen threshold angle $θ_{th}$. Thus, we may compare the square of calculated magnitude |(a−b)| of normalized vector difference (a−b) with the square of $Ma_{th}$. Thus, $|a-b|^2$ is compared with $Ma_{th}^2$ to decide whether the angular difference between vector A and vector B is small enough that they should be grouped together.

We define $Ma_{th}^2 = (1 + |b|^2 - 2*|b|*\cos\theta_{th})$, where $θ_{th}$ is a predetermined angular threshold for grouping decision purposes (e.g., 30 degrees), and $$|b| = |(B/|A|)| = SQRT\{(xb^2+yb^2)/(xa^2+ya^2)\}$$

If $|a-b|^2$ is less than $Ma_{th}^2$, then we decide that vector A and vector B CAN be in the same group. Thus, if $|a-b|^2$ is less than $Ma_{th}^2$ the appropriate final grouping decision is that vector A and vector B are in the same group.

Thus, vector A and vector B are in the same group if $|a-b|^2$ is less than $Ma_{th}^2$ and only if $|b|^2$ $(=(|B|/|A|)^2)$ is bigger than $Mr_{Lth}^2$ and less than $Mr_{Uth}^2$. The exact calculation of $Ma_{th}^2$ requires one square root operation (i.e., for calculating |b|), and a square root operation can be computationally expensive, or requires substantial hardware implementation. Thus the elimination of a square root operation can significantly reduce computational expense, or hardware. We have devised an approximation for $Ma_{th}$ (i.e., $Ma_{th}$=0.5) that provides good grouping results for |b| equal to 1 plus or minus 30 percent (i.e., for 0.7≤|b|≤1.3) and within 30 degrees of vector error (vector difference) angle (i.e., for −30 degrees≤θ≤+30 degrees). Thus, the second grouping criteria becomes $|a-b|^2 < 0.5^2$.

Figure 12:
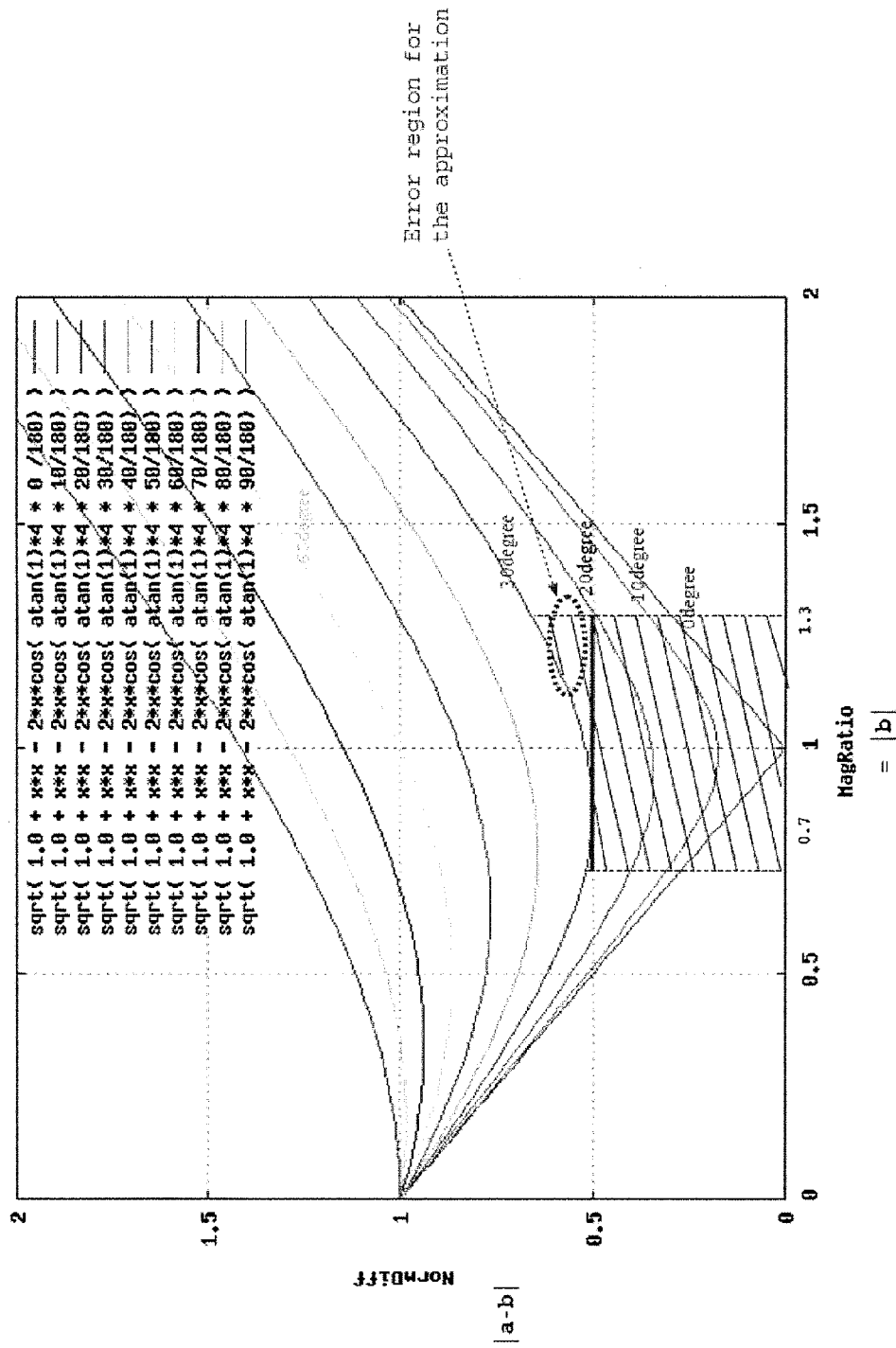
FIG. 12 is a graph of the magnitude |(a−b)| of normalized vector difference (a−b) versus the magnitude ratio |b| of normalized vector difference (a−b), as a function of angle difference θ, illustrating the availability of an approximation for use in a step of the grouping algorithm of FIG. 11.

If we plot the relation between angle difference θ, Magnitude ratio |b| and normalized difference |a−b|, we can obtain the graph of FIG. 12.

Figure 11:
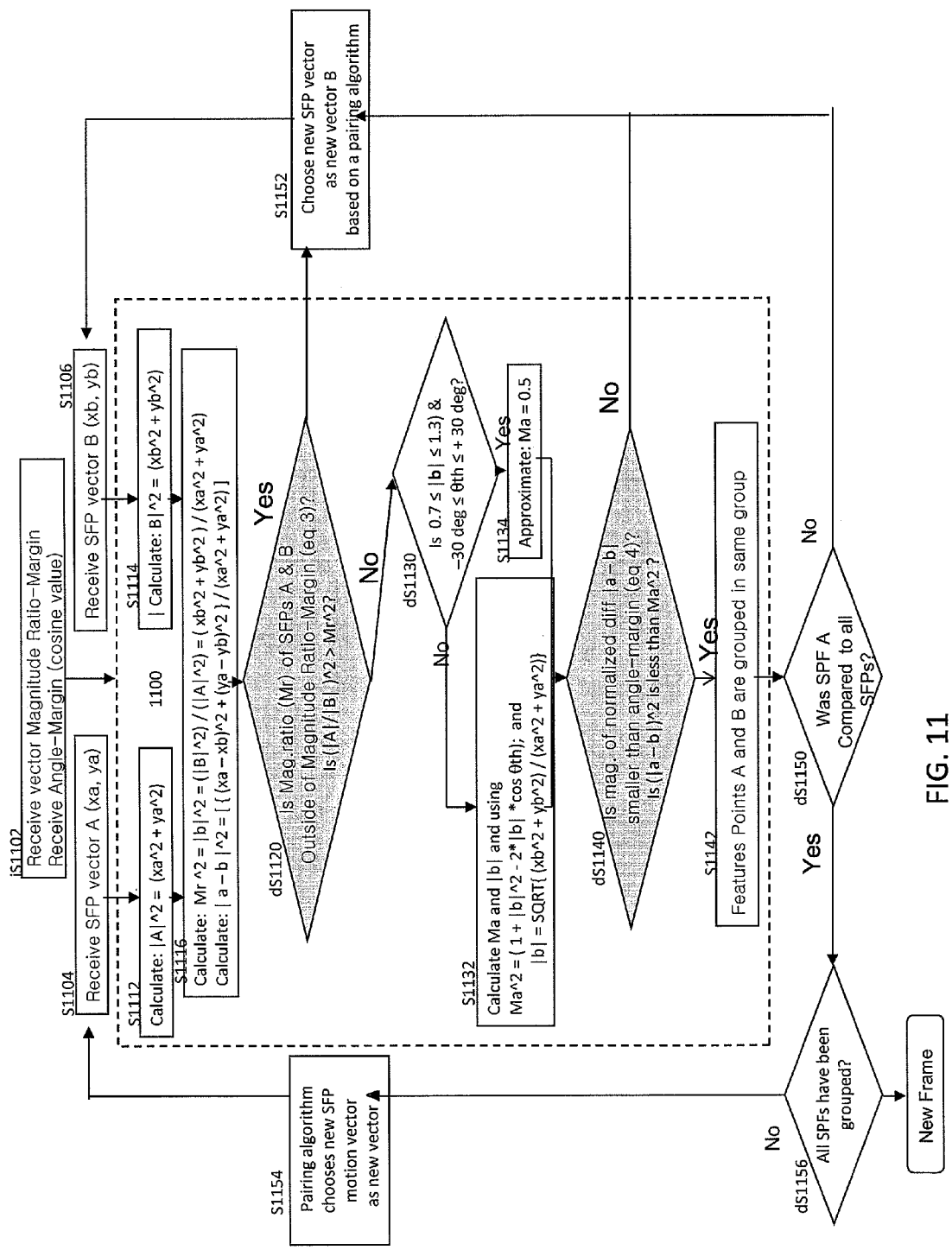
FIG. 11, is a flow chart of a grouping algorithm using normalized vector difference of FIGS. 10A, 10B, 10C for the indirect measure of angle difference between the motion vectors of the selected feature points in the image frame of FIGS. 1A and 2A, for performing vector grouping step of FIG. 1D in the DIS method illustrated in FIGS. 1A through 1F.

FIG. 12 is a graph of the magnitude |(a−b)| of normalized vector difference (a−b) versus the magnitude ratio |b| of normalized vector difference (a−b), as a function of various values of angle difference θ (between 0 degrees and 90 degrees), illustrating the availability of an approximation available for use in decision step dS1140 of the grouping algorithm of FIG. 11.

By experiment, the typical video gives good grouping result with a magnitude ratio greater than 1 plus or minus 30% and with difference angle θ greater up to 30 degrees, as indicated by the bounds of the square region in FIG. 12. This empirical range is effective for the approximation of normalized vector difference between zero and 0.5 as shown in the graph of FIG. 12.

Using the approximation, the $SQRT(1+|b|^2-2*|b|*\cos\theta)$ can be approximated as 0.5 regardless of |b|, to reduce the computational burden. Thus, using this approximation, the second grouping decision criteria becomes $|a-b|^2 < 0.5^2$.

FIG. 11, is a flow chart illustrating a grouping process according to an embodiment of the present inventive concept. Grouping process 1100 uses two criteria including normalized vector difference for the indirect measure of angle difference between the motion vectors of the selected feature points (see the image frame of FIGS. 1A and 2A), for performing vector grouping step of FIG. 1D in the DIS method illustrated in FIGS. 1A through 1F. The grouping algorithm 1100 includes the magnitude ratio grouping decision criteria (in decision step SD1120) and the normalized vector difference grouping decision criteria (in decision step SD1140). A paring algorithm (steps S1104, S1106, S1152, dS1150, and S1154) operating externally to the grouping algorithm 1100 keeps track of which feature points (motion vectors) have been already paired with which others, which remain unpaired, and which will be entirely excluded from the grouping algorithm 1100. The paring algorithm provides a pair of SPF motion vectors A & B as inputs to the grouping algorithm 1100. (S1104, S1106). In initialization step iS1102, Magnitude Ratio-Margin(s) (e.g., $Mr_{Lth}^2$ and $Mr_{Uth}^2$), and a Angle-Margin are received from an external circuit and provided to the grouping algorithm 1100.

The grouping algorithm 1100 calculates $|A|^2$ based on received vector A and $|B|^2$ based on received vector B (steps S1112 & S1114) for using these calculated values to make subsequent computations in at least subsequent steps S1116, dS1120, and dS1140. Thus, when the received vector B is excluded from grouping with received vector A, (by the Yes branch of decision step dS1120 or by the No branch of decision step dS1140), the paring algorithm assigns a new vector B (step S1152) and the grouping algorithm computes a new value of $|B|^2$ (step S114) based on the new vector B, but the calculated value of $|A|^2$ (step S112) of current vector A need not be updated at the same time because comparison of the same vector A will continue but with a new vector(s) B. Thus, hardware or software adapted to perform the grouping algorithm 1100 can be configured to separately store one or more instances of the values $|B|^2$ and $|A|^2$ so as to computationally efficiently make multiple comparisons using one of those values as long as only one among vectors A and B is changed at a time.

The grouping algorithm 1100 next calculates magnitude-ratio ($|b|^2$) and $|a-b|^2$ (S1116) using $|A|^2$ and $|B|^2$ (from steps S1112 and S1114). The first (magnitude ratio) grouping decision criteria is applied in decision step dS1120. In decision step dS1120 the square of the magnitude ratio $|b|^2$ is compared with a Magnitude Ratio-Margins (from step iS1102). If $(|A|/|B|)^2 < Mr_{Uth}^2$ or $(|A|/|B|)^2 > Mr_{Uth}^2$, (No branch of decision step dS1120) then current vector A is not grouped with current vector B and comparison with current vector B is ended and a new vector B is selected (step S1152). If $(|A|/|B|)^2$ is between $Mr_{Lth}^2$ and $Mr_{Uth}^2$, (Yes branch of decision step dS1120) then current vector A may become grouped with current vector B and the second grouping decision criteria are applied (in decision step dS1140). If |b| is within a predetermined range (e.g., based on the value of $|b|^2$) and if the angle difference θ is within a predetermined range (Yes branch of the decision step dS1130), then the magnitude $Ma_{th}$ of the normalized difference vector (a−b) is approximated (e.g., as $Ma_{th}^2 = 0.5^2$). Otherwise, (No branch of the decision step dS1130), the magnitude $Ma_{th}$ of the normalized difference vector (a−b) is calculated (S1132).

Next, the approximated or calculated magnitude $Ma_{th}$ of the normalized difference vector (a−b) is used in the second (normalized vector difference) grouping decision criteria in decision step dS1140. In decision step dS1140 the square of $Ma_{th}$ ($Ma_{th}^2$) is compared with $(|a-b|)^2$ and/or with the Angle-Margin (from step iS1102). If $(|a-b|)^2$ is less than $Ma_{th}^2$, (Yes branch of decision step dS1140) then current vector A can be grouped with current vector B (S1142). If $(|A|/|B|)^2$ is not less than $Ma_{th}^2$ (No branch of decision step dS1140) then current vector A is not grouped with current vector B and comparison with current vector B is ended and a new vector B is selected (step S1152).

Once the current vector A has been compared with all available grouping candidates vector Bs (Yes branch of decision step dS1150), then a new vector A is selected and comparisons continue for the remaining (ungrouped) grouping candidates vector Bs (S1154, S1112 etc) or if all vectors have been grouped, the grouping algorithm 1100 waits until a new frame needs to be processed.

Figure 13:
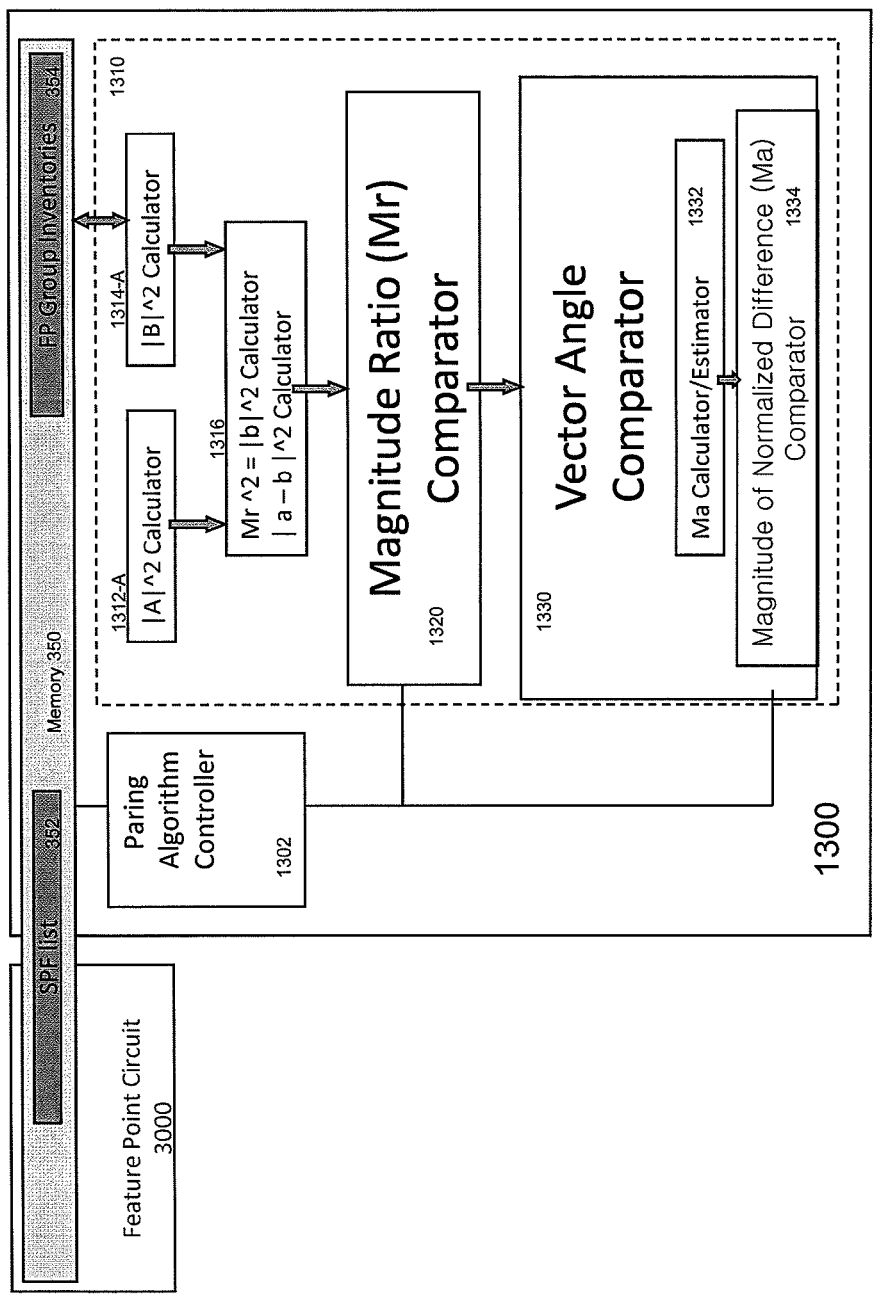
FIG. 13 is a block diagram of Feature Point Grouping Circuit comprising a Grouping Algorithm Circuit 1310 configured to perform the feature point grouping algorithm of FIG. 11.

FIG. 13 is a block diagram of Feature Point Grouping Circuit 1300 comprising a Grouping Algorithm Circuit 1310 configured to perform the feature point grouping algorithm of FIG. 11. The Feature Point Grouping Circuit 1300 comprises a Magnitude Ratio (|b|) Comparator 1320 configured to perform the first grouping decision (of decision step dS1120 of FIG. 11) based on the criteria of Magnitude ratio thresholds ($Mr_{Lth}$ & $Mr_{Uth}$) and a Vector Angle Comparator 1330 configured to perform the second grouping decision (of decision step dS1140 of FIG. 11) based on the criteria of normalized vector difference (used for the evaluation of angle difference). The Vector Angle Comparator 1330 in this exemplary embodiment of the inventive concept includes a Magnitude of Normalized Difference ($Ma_{th}$) Calculator/Estimator 1334 and a Magnitude of Normalized Difference ($Ma_{th}$) Comparator 1334. The Magnitude of Normalized Difference ($Ma_{th}$) Calculator/Estimator 1334 generates or calculates as described herein above with respect to steps dS1130, S1132, and S1134 of FIG. 11.

The Feature Point Grouping Circuit 1300 shares the RAM Memory 350 with the Feature Point Circuit 3000 of FIG. 3. The SPF list 352 portion of the memory 350 contains the list of selected feature points output by the Feature Point Candidate Sorter 340. The Paring Algorithm Controller 1302 in the Feature Point Grouping Circuit 1300 DMA accesses the SPF list 352 and selects vectors A and vectors B for comparison in the Grouping Algorithm Circuit 1310 as described herein above with respect to steps S1152, S1154, dS1156, and dS1150 of FIG. 11. When a comparison results in one or more groups of vectors (groups of selected feature points), the Paring Algorithm Controller 1302 writes the grouped vectors or a descriptive list thereof into the FP Group Inventories 354 portion of the memory 350. According to one embodiment, the Feature Point Grouping Circuit 1300 and memory 350 are embodied in a single integrated circuit chip, and data retrieved from memory 350 is output to circuitry external to the chip via I/O pins. According to another embodiment, the Feature Point Grouping Circuit 1300, the RAM Memory 350, and the Feature Point Circuit 3000 are embodied in a single integrated circuit chip. According to such embodiment, one ordinary skilled in the art can readily appreciate that if additional memory capacity is needed, another RAM memory can be added external to the integrated circuit chip.

Feature Point Grouping Circuit 1300 further comprises a $|A|^2$ Calculator 1312, a $|B|^2$ Calculator 1312 and a $|b|^2$ & $|a-b|^2$ Calculator 1316, configured to perform steps S1112, S1114, and S1116 of FIG. 11 respectively.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

According to an embodiment of the present inventive concept, each captured video frame is divided into a small number of non-overlapping tiles (typically 4×4 tiles for Standard Definition and 6×6 tiles for High Definition), for the purpose of algorithmically selecting feature points providing a good feature point distribution suitable for digital image stabilization. Different regions of the image may have a different density of suitable feature points. In extreme cases, a region of the frame may not have any suitable feature points, for example in the case of a blue sky without any clouds. In other regions, the potential feature points might be very dense.

The obtained feature point distribution is based on small regions of the video frame, (e.g. non-overlapping tiles), where the number of feature points in each tile increases linearly with the variance $σ^2$ of the luminance image data of the tile. Tiles with more interesting image data and therefore the need for more feature points are expected to have a higher variance $σ^2$. See co-pending application No. 8729-357), describing a process that sets a minimum distance (MIN_DIST) between feature points in each tile while at the same time requiring only little local state information, thereby reducing the hardware implementation cost. The disclosure of 8729-357 is incorporated-by-reference herein.

If the scene was captured at low light conditions, it will have relatively more noise, and the noise effect is greater to the feature points than the tiles, because the number of pixels of feature points is much smaller than the number of pixels in the tile. The larger number of pixels in the tile provides the noise cancellation effect, and the downsampled tile-based motion vector is more accurate in this case.

Even if the scene is not captured in the low light condition, if the scene is too flat, the tile-based motion vector can be more accurate. If the tile scene is very flat like a cloudy sky or blue sky, there can be some feature points and these feature points in the flat tile can find similar levels of matching points at many places in the next frame. But, the tile-based matching does not rely only on a small feature-point search area, and all the patterns in the tile can contribute to the tile matching process. As a result, the tile-based motion vectors are more reliable when the scene is flat.

When the best score of feature point motion vector groups is smaller than a given threshold, we decide to use tile-based motion vectors instead of feature-point based motion vectors, and this strategy works well for the scenes of high noise or flat scenes.

According to an embodiment of the inventive concept, we choose the estimated motion vectors representing the movement of the background and large objects, whereas smaller objects do not need to have an accurate motion vector associated with them. Any inaccurate vectors for smaller objects can be filtered at a later stage of the DIS algorithm.

It is expected that feature points of the large stationary objects of significance will move in a coherent way because of global movement or camera movement. We recognize that sufficiently large objects that move independently cover the majority of at least one tile, so that their motion can be estimated as the predominate motion of the tile itself, while the motion of small objects has little affect on the motion vector of the tile itself.

We derive one motion vector per tile, using block matching on the lowest resolution. The tile-based motion vectors can be used for the camera trajectory decisions in some special cases such as high noise or flat scene videos.

The motion vector for a given tile is the one that minimizes the sum of absolute differences (SAD). And, the process of calculating motion vectors of feature points in each tile may be modified to reduce computations, by using a hierarchical motion estimation algorithm and by preferring tile movement over local movement, using the motion vector of the tile as a start vector. Because a sufficiently large object that covers the majority of at least one tile may extend into adjacent tiles, it is probable that some feature points in each tile may be associated more strongly with the motion vector of an adjacent tile rather than the motion vector of the tile they are found within. Thus, it would be effective to use the motion vectors of all the adjacent tiles as multiple start vectors in the block matching search for the motion vector of the feature points of any given tile. Thus the start vectors used to obtain motion vectors of the selected feature points are those of the tile the feature point belongs to as well as those belonging to the four direct neighbors (Upper tile, Left tile, Right tile, Lower tile), provided it exists. For each start vector used, we only use a very small range for the local search for feature point motion vectors. The goal here is not so much to determine accurate vectors for each and every feature point (bad motion vectors will be sorted out later in the DIS processing chain). Rather, the feature points of interest are only those that belong to the background or large objects. For those feature points, one of the tile motion vectors should be good, or close to the motion vector of the feature points of interest, and therefore, a small local search about each selected tile motion vectors is sufficient. A small local block matching search is performed in a higher-resolution domain (this could be the original video resolution, or subsampled by a factor $f_{s3}$ of 2 or 4) around each of a set of start vectors for every selected feature point in the tile.

Figure 14:
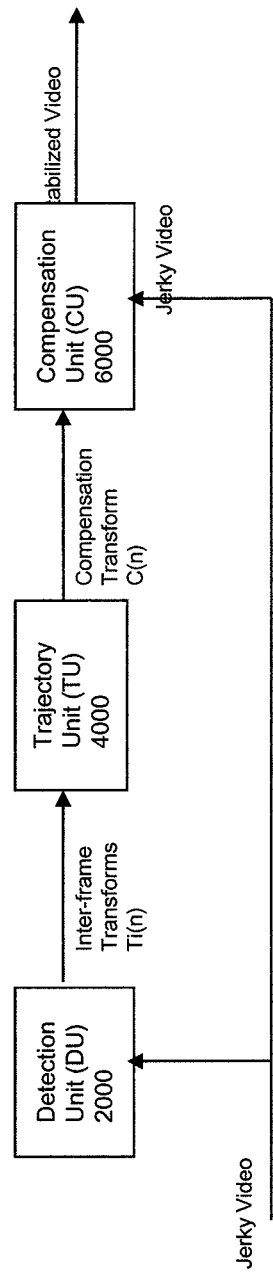
FIG. 14 is a block diagram of a Digital Image Stabilization (DIS) circuit performing a DIS method in accordance with an exemplary embodiment of the inventive concept.

FIG. 14 is a block diagram of Digital Image Stabilization (DIS) circuit performing a DIS method in accordance with an exemplary embodiment of the inventive concept. The DIS circuit comprises an Detection Unit (DU) that analyses received jerky video and outputs inter-frame transforms Ti(n), a Trajectory Unit (TU) that outputs a selected Principal/compensation transform P(n) selected from among the inter-frame transforms Ti(n), and a Compensation Unit (CU) that outputs stabilized video by modifying the jerky video using the selected Principal/compensation transform P(n).

The Detection Unit (DU) estimates inter-frame motion vectors of feature points (FP) and inter-frame motion vectors of non-overlapping tiles (Tile vectors) in a received frame of video data. The Detection Unit further outputs FP motion vector group transforms and tile vector group transforms Ti(n).

The Trajectory Unit (TU) selects one of the inter-frame transforms Ti(n), (or Unity Transform in a case where a large moving object covers the scene) as the Principal Transform P(n), thus excluding the inter-frame transforms of small moving objects and of a large moving object that may move into and cover the entire frame.

Figure 15:
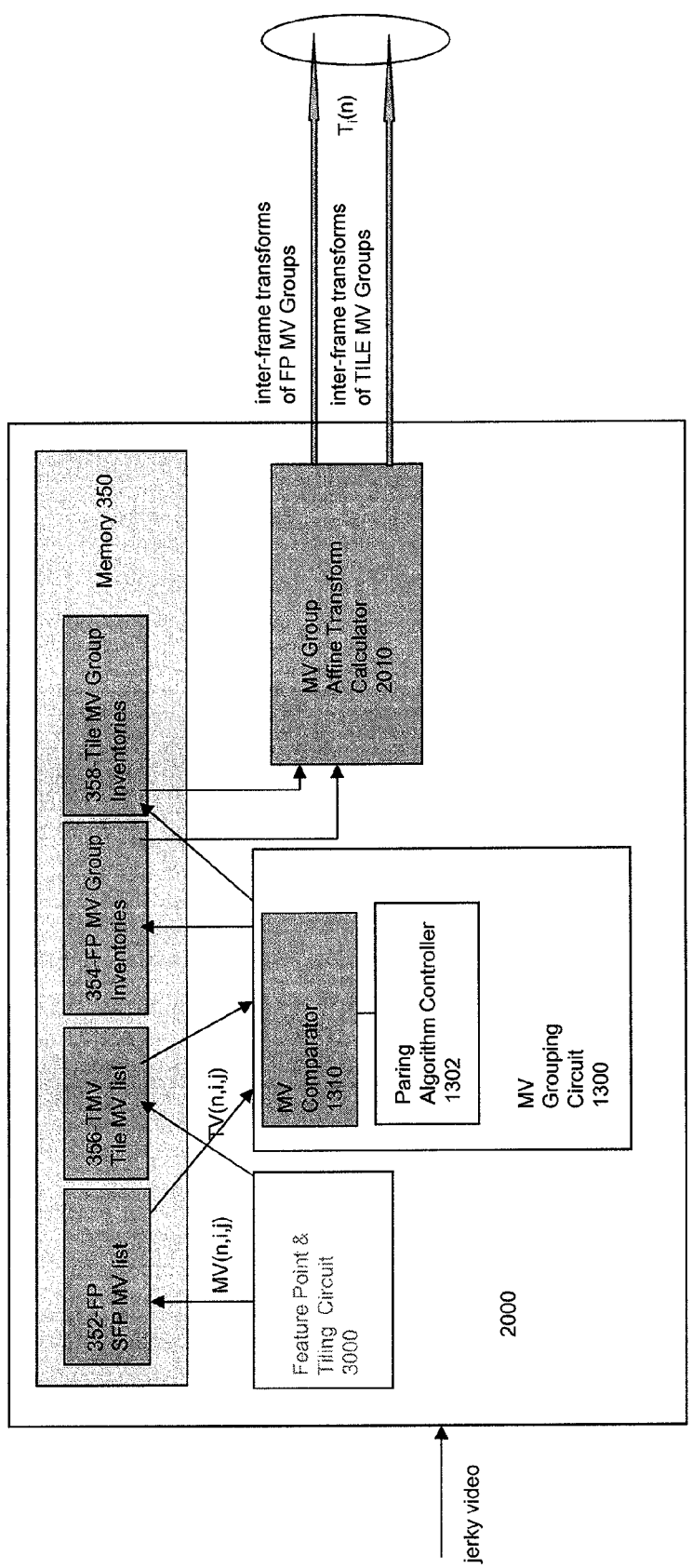
FIG. 15 is a block diagram of a Detection Unit in the DIS circuit of FIG. 14 adapted to calculate the affine transforms of tile vector groups.

FIG. 15 is a block diagram of the Detection Unit 2000 in the DIS circuit of FIG. 14 adapted to calculate the affine transforms of tile vector groups as steps of the DIS method of the DIS circuit of FIG. 14. The Detection Unit 2000 comprises a Feature Point Circuit 3000, an motion vector (MV) Grouping Circuit 1300, and a motion vector (MV) Group Affine Transform Calculator 2010.

The Feature Point Circuit 3000 receives each frame of video data and preferably divides each video frame into a small number j×k of non-overlapping tiles. The number j×k of tiles can range from 4×4 for SD video to 6×6 for HD video; other numbers in the range from (4 . . . 8)×(4 . . . 8) are also possible and may be beneficial. The tile size is chosen such that sufficiently large objects that move independently cover the majority of at least one tile, so that their motion can be captured for DIS purposes, while the motion of small objects may be ignored. Feature Point Circuit 3000 identifies and selects feature points (SFPs) in a received video frame, and outputs the motion vectors of feature points and of tiles (SFP MVs and Tile MVs).

The Feature Point Circuit 3000 comprises a Feature Point Selector and a Motion-Vector Calculator and a shared RAM Memory 350. The Feature Point Selector 300 may further comprise a Harris-Corner Feature Point Candidate Identifier, and a Feature Point Candidate Sorter. To save computational power and to reduce the number of required operations, the Feature Point Circuit 3000 operates only on luma data, and comprises one or more Downsamplers and a Hierarchical Block-Matching Search Unit.

The Feature Point Circuit 3000 estimates a motion vector for every tile. Tile motion vector (Tile MV) estimation is done on the basis of non-overlapping tiles that cover the center of the input image (e.g., the same tiles that may used in a feature point sorting algorithm). For each of the tiles, a full block-matching search is performed on a deeply downsampled image. A full-search block matching is done for every tile and the tile motion vector (Tile MV) is stored (356) for later use, e.g., as a start vector in the Hierarchical Block-Matching Search Unit for deriving the motion vectors of the feature points (SFP MV stored at 352) and for stationary-object detection.

The Feature Point Circuit 3000 preferably provides a list of feature points 352 having a distribution based on small regions (tiles) of the video frame, called tiles, where the maximum number of feature points per tile increases linearly with the variance $\sigma^2$ of the luminance image data of the tile. Good feature points for the DIS method are points that yield non-ambiguous motion vectors when a suitable motion estimation algorithm is applied. To identify feature points in an image, a Harris Corner Detection algorithm is applied to pixels of a video frame to measure how well suited this pixel is as a feature point. Different regions (tiles) of the image may have a different density of identified feature point candidates.

The Feature Point Circuit 3000 preferably includes a Motion-Vector Calculator that performs the function of a Tile-Vector Calculator for calculating each tile's motion vector, and a Hierarchical Block-Matching Search Unit to determine and output the motion vector of each Selected Feature Point (SFP). The Tile-Vector Calculator calculates the motion vector of each tile using deeply downsampled luma data of the current frame $F_t$. Hierarchical Block-Matching Search Unit determines the motion vector of each of the selected feature points using the full-resolution or downsampled luma data of two consecutive frames, and may use the Tile Vectors as start vectors.

All feature-point and tile related data is passed to the next DIS block, particularly the motion vector grouping circuit 1300.

The Motion Vector Grouping Circuit 1300 is configured to perform the grouping algorithm on the FP motion vectors and on the tile motion vectors. The Feature Point Grouping Circuit 1300 comprises a Motion Vector Comparator 1310 configured to perform grouping decisions by comparing each pair of vectors selected by the Paring Algorithm Controller 1302.

The Feature Point Grouping Circuit 1300 groups FP motion vectors to associate the motion vectors of selected feature points (SFPs) with objects in the scene based on the object's perceived relative movement between consecutive video frames. The Feature Point Grouping Circuit 1300 also groups Tile motion vectors to associate the Tile vectors with objects in the scene based on the object's perceived relative movement between consecutive video frames.

The Feature Point Grouping Circuit 1300 shares the RAM Memory 350 with the Feature Point Circuit 3000. The SPF MV list portion 352-FP of the memory 350 contains the list of locations and motion vectors of selected feature points (SFPs). The Tile MV list portion 352-TMV of the memory 350 contains the list of locations and motion vectors of the non-overlapping tiles.

The Paring Algorithm Controller 1302 keeps track of which feature points and tiles (motion vectors) have been already paired with which others, which remain unpaired, and which will be entirely excluded from grouping. The paring algorithm repeatedly provides pairs of motion vectors (vector A & vector B) as inputs to the MV Comparator 1310.

The Paring Algorithm Controller 1302 in the Feature Point Grouping Circuit 1300 accesses the SPF MV list (352-MV) and the Tile MV list (352-TMV) and selects vectors A and vectors B for comparison in the Motion Vector Comparator 1310. When series of vectorA-vectorB comparison results in one or more groups of vectors (e.g., groups of selected feature points and groups of tiles), the Paring Algorithm Controller 1302 writes the grouped motion vectors or a descriptive list thereof into the FP MV Group Inventories portion 354 and Tile MV Group Inventories portion 358 of the memory 350.

The motion vector (MV) Group Affine Transform Calculator 2010 calculates the inter-frame transform of each group of feature point motion vectors, and calculates the inter-frame transform of each group of tile motion vectors and outputs them all as Ti(n).

Figure 16:
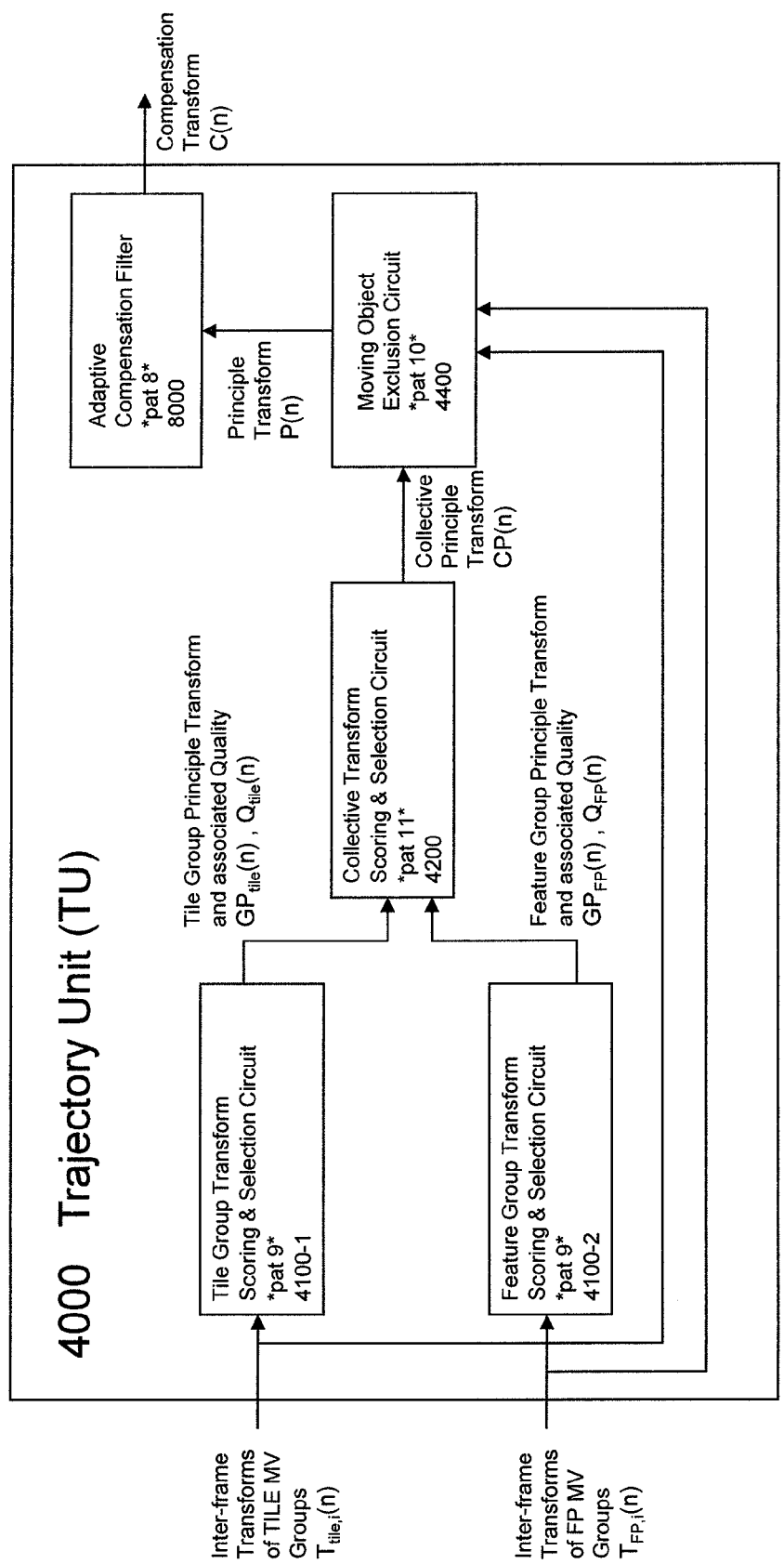
FIG. 16 is a block diagram of a Trajectory Unit (TU) of the DIS circuit of FIG. 14 adapted to select the principal (stationary/background) transform P(n) based on scoring tile group transforms and feature group transforms $T_i(n)$.

FIG. 16 is a block diagram of the Trajectory Unit (TU) 4000 of the DIS circuit of FIG. 14 adapted to select the principal (stationary/background) transform P(n) based on a method of scoring tile group transforms and feature group transforms $T_i(n)$, in accordance with steps of the DIS method of the DIS circuit of FIG. 14.

The Trajectory Unit (TU) 4000 (FIG. 16) comprises a Tile Group Transform Scoring and Selection Circuit 4100-1 (FIG. 17A), a Feature Group Transform Scoring and Selection Circuit 4100-2 (FIG. 17A), a Collective Group Selection Circuit 4200 (FIG. 18), a Moving Object Exclusion Circuit 4400 (FIG. 19), and an Adaptive Compensation Filter.

The Trajectory Unit (TU) 4000 identifies the principle motion P(n) caused by unsteady camera while ignoring moving objects in the scene, filters the selected Principal Transform P(n), and outputs the Compensation Transform C(n). The Trajectory Unit (TU) 4000 employs a plurality of continuous scoring functions to select the Principle Transform P(n) from among the received inter-frame transforms Ti(n).

Figure 17A:
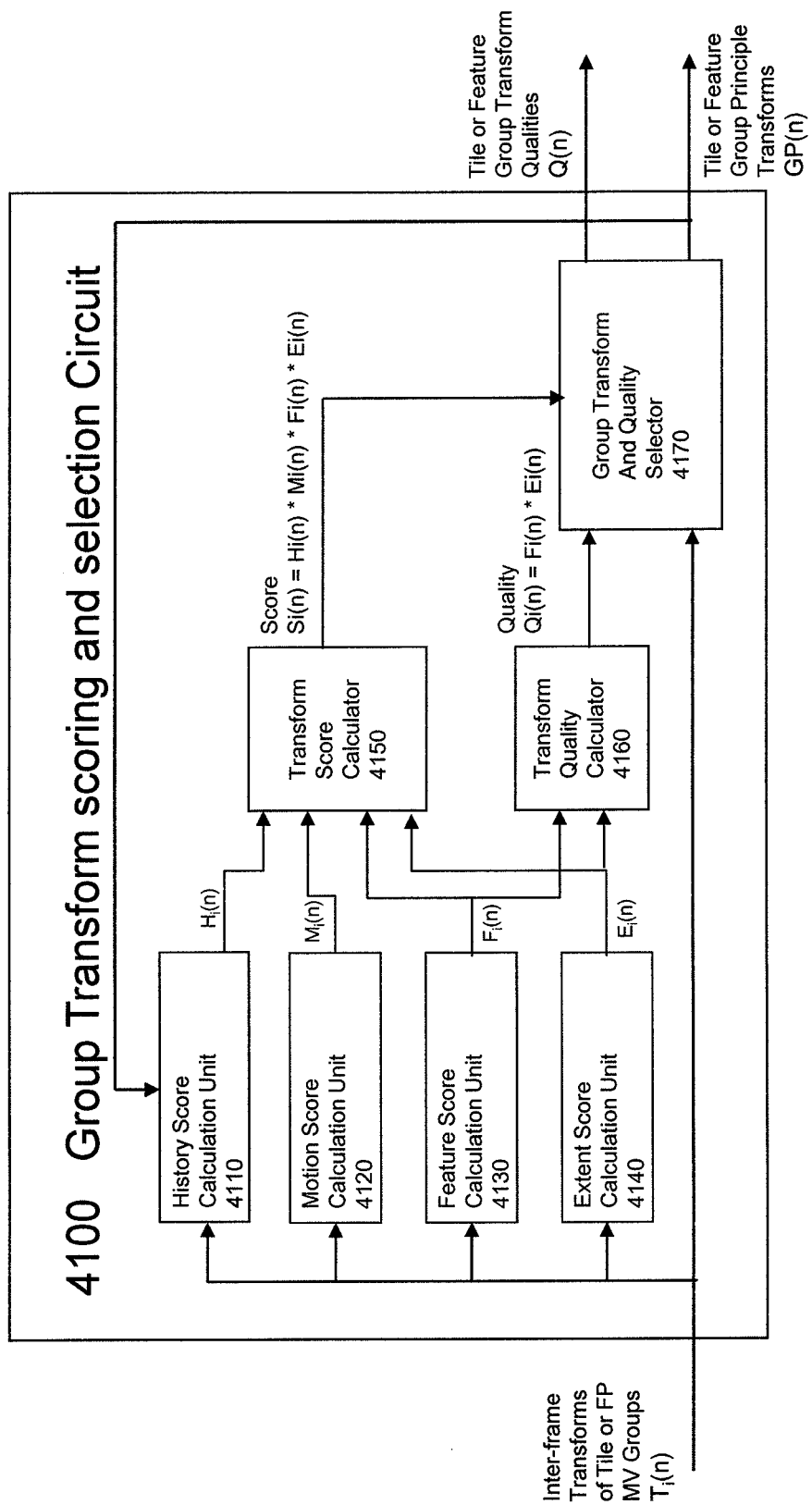
FIG. 17A is a block diagram of an exemplary implementation of a Group Transform Scoring And Selection Circuit configured to perform a step in the DIS method of the DIS circuit of FIG. 14.

FIG. 17A is a block diagram of the Group Transform Scoring and Selection Circuit 4100 of the Trajectory Unit (TU) 4000 of the DIS circuit of FIG. 14, comprising a Transform Score Calculator 4150, Transform Quality Calculator 4160, and a Group Transform and Quality Selector 4170 configured to perform a step in the DIS method of the DIS circuit of FIG. 14. The Group Transform Scoring and Selection Circuit 4100 is adapted to output the Tile Group Principle Transform $GP_{Tile}(n)$ from Tile Group Inter-frame Transforms $T_{Tile,i}(n)$ (4100-1), and adapted to output the Feature Group Principle Transform $GP_{FP}(n)$ from FP Inter-frame Transforms $T_{FP,i}(n)$ (4100-2).

Figure 17B:
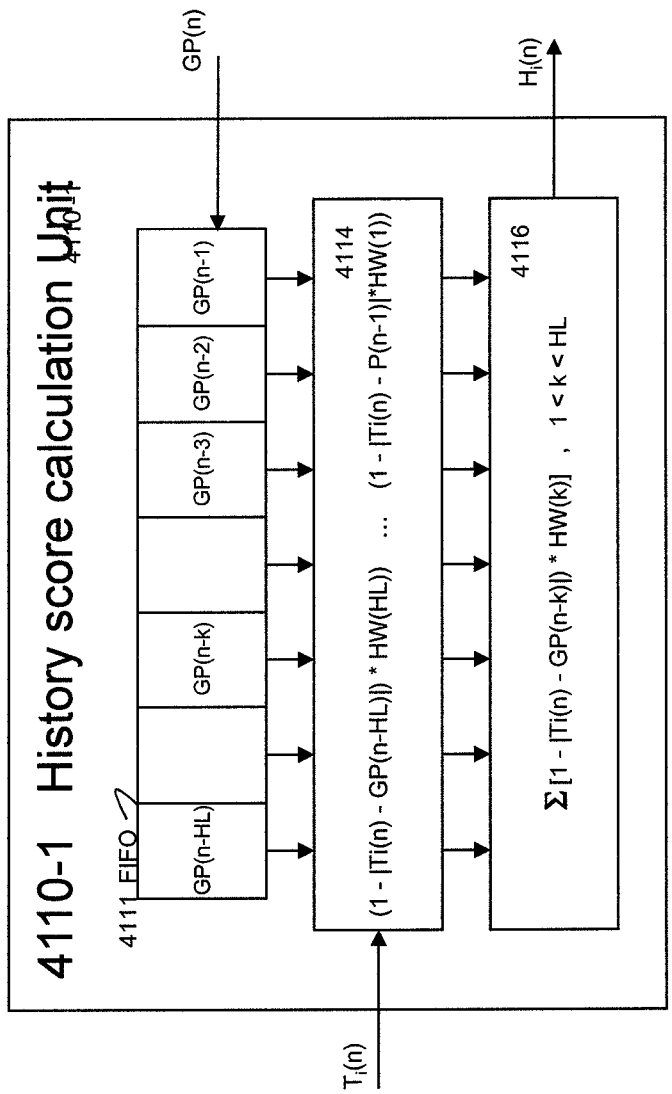
FIG. 17B is a block diagram of an exemplary implementation of a History Score calculation Unit.

FIG. 17B is a block diagram of an exemplary implementation of the History Score calculation Unit 4110-1 in the Group Transform Scoring And Selection Circuit 4100 of FIG. 17A shown in the implementation 4100-1 thereof of FIG. 4.

Referring to FIGS. 17A and 17B, the Group Transform Scoring And Selection Circuit 4100 comprises a History Score Calculation Unit 4110 (e.g., 4110-1), a Motion Score Calculation Unit 4120, a Feature Score Calculation Unit 4130, and an Extent Score Calculation Unit 4140, plus a total Transform Score $S_i(n)$ Calculator 4150, a Transform Quality $Q_i(n)$ Calculator 4160, and a Group Transform and Quality Selector 4170 (e.g., 4170-1).

The Group Transform and Quality Selector 4170 of the Group Transform Scoring and Selection Circuit 4100 of FIG. 17A selects one of the inter-frame transforms Ti(n) as the Group Principle Transform GP(n) (by rejecting the inter-frame transforms of small moving objects) based on the total Transform Score $S_i(n)$ (of each inter-frame transform $T_i(n)$) received from the total Transform Score Calculator 4150, and outputs the Group Principle Transform GP(n) and its associated Quality Q(n).

Let $T_i(n)$ be the $i^{th}$ transform out of all received Transform candidates received from the Detection Unit (DU) 2000, where n denotes a frame and the time sequence nature. Let GP(n) be the selected Group Principle Transform at frame time n, i.e., GP(n)=Ti(n) for a selected i.

For each $T_i(n)$, the total Transform Score $S_i(n)$ Calculator 4150 receives a History score $H_i(n)$ from the History Score calculation Unit 4110 (e.g., 4110-1), receives a Motion score $M_i(n)$ from the Motion Score calculation Unit 4120, receives a Feature score $F_i(n)$ from the Feature Score calculation Unit 4130, and receives an Extent score $E_i(n)$ from the Extent Score calculation Unit 4140, and calculates the total Transform Score $S_i(n)$ based on the following equation:

$$S_i(n)=H_i(n)*M_i(n)*F_i(n)*E_i(n).$$

For each $T_i(n)$, the Transform Quality $Q_i(n)$ Calculator 4160 receives a Feature score $F_i(n)$ from the Feature Score calculation Unit 4130, and receives an Extent score $E_i(n)$ from the Extent Score calculation Unit 4140, and calculates the Transform Quality $Q_i(n)$ based on the following equation:

$$Q_i(n)=F_i(n)*E_i(n).$$

The $T_i(n)$ having the largest value $S_i(n)$ shall be selected as the Group Principle Transform GP(n) by the Group Transform Selector 4170 of the Group Transform Scoring And Selection Circuit 4100 of FIG. 17A. Thus, in this exemplary embodiment, the inter-frame transform candidate $T_i(n)$ with the highest score $S_i(n)$ is selected as the Group Principle Transform GP(n) and then adaptively filtered to produce the Compensation Transform C(n) to compensate for jittery camera motion, in the DIS Compensation Unit (CU) 6000 of the DIS circuit of FIG. 14.

The History Score calculation Unit 4110 (e.g., 4110-1) stores the History of the Group Principle Transform GP(n) and calculates a History score $H_i(n)$ for each $T_i(n)$, e.g., seriatim when each $T_i(n)$ is received from the Detection Unit (DU) 2000, based on a predetermined length HL of the stored History of the Group Principle Transform GP(n), wherein HL is a integer indicating a predetermined number of prior frames. The incoming $T_i(n)$ is mathematically compared with each of the HL stored previously-selected Group Principle Transforms GP(n–1) . . . GP(n–k), wherein k is the integral frame-time index that ranges from one (denoting the immediately previous frame: n–1) to HK (the more timewise distant frame: n–HK). Transforms among $T_i(n)$ having a higher correlation with the HL stored previously-selected Group Principle Transforms GP(n–1) through GP(n–HL) have a higher History score $H_i(n)$.

The correlation Hi,k(n) between Ti(n) and each GP(n–k) is unity minus the normalized norm (1–|Ti(n)–GP(n–k)|) in the range [0,1] wherein a value of Hi,k(n)=1 indicates the highest correlation.

The contribution of each correlation Hi,k(n) (1–|Ti(n)–GP(n–k)|) is weighed by corresponding History-Weights HW(k).

The History score $H_i(n)$ is the total correlation and is the HW(n–k) weighted sum of Hi,k(n), for 1<k<HL, where HL is the length (number of past frames) of the history. Thus, $$H_i(n)=\Sigma[1-|T_i(n)-GP(n-k)|*HW(k)], \text{ for } 1<k<HL.$$

The weights HW(n–HL) through HW(n–1) are preferably selected so that their sum equals one and so that the History score $H_i(n)$ output is non-linearly normalized and has a continuous range [0,1].

The exemplary hardware implementation 4110-1 of History Score calculation Unit 4110, shown in FIG. 17B includes a FIFO (first-in-first-out) memory buffer for storing HL previous-selected Group Principle Transforms GP(n–1) through GP(n–HL) having HL taps (for n–1 through n–HL) for outputting their stored contents into a comparator 4114. The comparator 4114 compares the current $T_i(n)$ with each of the HL stored previous-selected Group Principle Transforms GP(n–1) through GP(n–HL), and outputs each comparison weighted by history weights HW(n–1) through HW(n–HL) to the total History Score calculator 4116 which outputs the total correlation as total History score $H_i(n)$ in the continuous range [0,1].

The Motion Score calculation Unit 4120 receives each $T_i(n)$ and calculates its Motion score $M_i(n)$ based only on $T_i(n)$. In alternative embodiments, the Motion Score calculation Unit 4120 can be configured to receive stored information from the Detection Unit 2000 for the purpose of calculating the Motion score $M_i(n)$. Transforms with small motion have a higher Motion score $M_i(n)$ and are more likely to be the Group Principle Transform GP(n). For each inter-frame transform among $T_i(n)$, the Motion Score calculation Unit 4120 calculates Motion score $M_i(n)$.

A Mi(n) having a large value corresponds to small motion, and vice versa. Motion $M_i(n)$ may be based on the horizontal, vertical, or total linear displacement of the transform. The Motion score Mi(n) is inversely related to the linear displacement, and is preferably non-linearly normalized to have a continuous range [0,1].

The Feature Score calculation Unit 4130 receives each $T_i(n)$ and calculates its Feature score $F_i(n)$ based only on $T_i(n)$. In alternative embodiments, the Feature Score calculation Unit 4130 can be configured to receive stored information from the Detection Unit 2000 for the purpose of calculating the Feature score $F_i(n)$. For each inter-frame transform among $T_i(n)$, the Feature Score calculation Unit 4130 calculates Feature score $F_i(n)$. Feature score $F_i(n)$ correlates with the number of feature points grouped together to make up the feature point group represented by each inter-frame transform among $T_i(n)$. Transforms among $T_i(n)$ having more feature points per group have a higher Feature score $F_i(n)$. Feature score Fi(n) is preferably non-linearly normalized having a continuous range [0,1].

The Extent Score calculation Unit 4140 receives each $T_i(n)$ and calculates its Extent score $E_i(n)$ based only on $T_i(n)$. In alternative embodiments, the Extent Score calculation Unit 4140 can be configured to receive stored information from the Detection Unit 2000 for the purpose of calculating the Extent score $E_i(n)$. For each inter-frame transform among $T_i(n)$, the Extent Score calculation Unit 4140 calculates Extent score $E_i(n)$. Transforms among $T_i(n)$ having feature points covering (spread over) larger area are scored higher. Extent score $E_i(n)$ having a larger value corresponds to a larger covered area, and vice versa. Extent score Ei(n) correlates to the height times width of the rectangular area containing all feature points of the group of the transform. The Extent score $E_i(n)$ is preferably non-linearly normalized to have a continuous range [0,1].

Various exemplary embodiments of the inventive concept uses scene history analysis to exclude large objects moving across the entire scene that would otherwise cause undesirable results in video stabilization. Without proper scene history analysis, a principle transform selector is most likely to select the transform candidate corresponding to the large moving object, especially when it covers the entire scene. We recognize that when a large object moves across and fills the entire scene, the transform candidates Ti(n) do not include a Principle Transform P(n) that corresponds to the unsteady camera.

Figure 18:
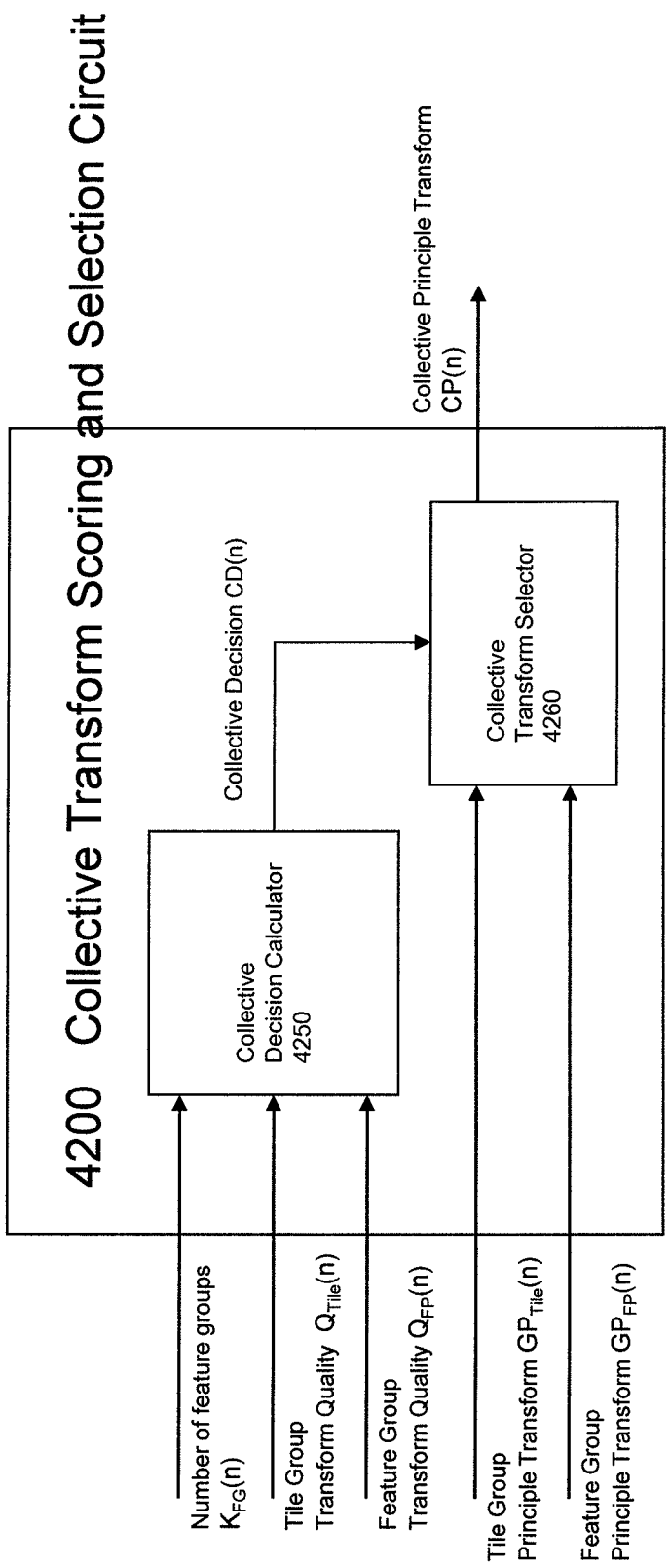
FIG. 18 is a block diagram of an exemplary implementation of Collective Transform Scoring and Selection Circuit.

FIG. 18 is a block diagram of an exemplary implementation of the Collective Transform Scoring and Selection Circuit 4200 of the Trajectory Unit (TU) 4000 of the DIS circuit of FIG. 14, comprising a Collective Decision Calculator 4250 configured to calculate a Collective Decision CD(n), and a Collective Transform Selector 4260 configured to output a Collective Principle Transform CP(n) as steps in the DIS method of the DIS circuit of FIG. 14.

The Collective Decision Calculator 4250 in FIG. 18 calculates a Collective Decision CD(n) from the Feature Group Transform Quality $Q_{FP}(n)$, the Tile Group Transform Quality $Q_{Tile}(n)$, and the number of feature group transform candidates $K_{FG}(n)$ received from the Detection Unit (DU) 2000.

An exemplary implementation of the Collective Decision Calculator 4250 includes calculating a non-linearly normalized Fragmentation Measure $\Theta_F(n)$ from the number of feature groups $K_{FG}(n)$, such that $\Theta_F(n)$ is 0 when $K_{FG}(n)$ is small, and $\Theta_F(n)$ is 1 when $K_{FG}(n)$ is large. Thus, a $\Theta_F(n)$ value close to 1 indicates that all the feature points in the video scene are fragmented to many feature groups, and vice versa.

The Collective Decision Calculator 4250 outputs a Collective Decision CD(n) by comparing $Q_F(n)$ and $\Theta_F(n)*Q_T(n)$, and if $Q_F(n)>\Theta_F(n)*Q_T(n)$, then the Collective Decision CD(n) is set to select Feature Group. And, if $Q_F(n)<=\Theta_F(n)*Q_T(n)$, then the Collective Decision CD(n) is set to select Tile Group. In this formulation, if the feature groups are not fragmented, then $\Theta_F(n)$ is close to 0, and the Feature Group is more likely to be selected. Otherwise, if the feature groups are fragmented, then $\Theta_F(n)$ is close to 1, and the Tile Group Transform Quality $Q_{Tile}(n)$ is compared on equal grounds with the Feature Group Transform Quality $Q_{FP}(n)$.

The Collective Transform Selector 4260 performs selection between the Feature Group Principle Transform $GP_{FP}(n)$ and the Tile Group Principle Transform $GP_{Tile}(n)$. The Collective Transform Selector 4260 is controlled by the Collective Decision CD(n) such that the output Collective Principle Transform CP(n) is set to Feature Group Principle Transform $GP_{FP}(n)$ when CD(n) is set to Feature Group, and to Tile Group Principle Transform $GP_{Tile}(n)$ otherwise.

In this embodiment, the Collective Transform Scoring and Selection Circuit 4200 performs selections based on Feature Group Transform Quality $Q_{FP}(n)$ and Tile Group Transform Quality $Q_{Tile}(n)$. These group transform qualities are calculated by the transform Quality calculator 4160 of FIG. 17A, which receives inputs from the Feature Score calculation Unit 4130 and the Extent Score calculation Unit 4140.

The Feature Score calculation Unit 4130 calculates its Feature score $F_i(n)$ of feature-based and tile-based transforms $T_i(n)$. In this embodiment, the Feature Score calculation Unit 4130 is configured to receive stored information from the Detection Unit 2000 for the purpose of calculating the Feature score $F_i(n)$. For each inter-frame transform among $T_i(n)$, the Feature Score calculation Unit 4130 calculates Feature score $F_i(n)$. Transforms $T_i(n)$ with more feature points in a group or more tiles in a group will have a higher Feature Score $F_i(n)$, and results in higher Feature Group Transform Quality $Q_{FP}(n)$ or Tile Group Transform Quality $Q_{Tile}(n)$, respectively. In some embodiments, the number of feature points per tile may govern the score Feature score $F_i(n)$ of feature-based transforms $T_i(n)$. In other embodiments, the number of tiles may govern the score Feature score $F_i(n)$ of tile-based transforms $T_i(n)$. The number of feature points per tile, and/or the number of tiles in each group of tile vectors can be obtained directly from the Detection Unit 2000.

The Extent Score calculation Unit 4140 calculates the Extent score $E_i(n)$ of feature-based and tile-based transforms $T_i(n)$. In this embodiment, the Feature Score calculation Unit 4130 is configured to receive stored information from the Detection Unit 2000 for the purpose of calculating the Feature score $F_i(n)$. Transforms with feature points or tiles covering larger area are scored higher. The number of feature number and dimensions of the tiles in each group of tile vectors can be obtained directly from the Detection Unit 2000. Similarly, the horizontal and vertical extent of each group of feature-based motion vectors can be obtained directly from the Detection Unit 2000. Feature groups covering a larger area or tile group covering a larger area will have a higher Extent Score $E_i(n)$, and results in higher Feature Group Transform Quality $Q_{FP}(n)$ or Tile Group Transform Quality $Q_{Tile}(n)$, respectively. In this embodiment, the Extent Score calculation Unit 4140 is configured to receive stored extent information from the Detection Unit 2000 for the purpose of calculating the Extent score $E_i(n)$.

After the Collective Principle Transform CP(n) has been selected by the Collective Transform Scoring and Selection Circuit 4200, the Large Object Exclusion Hardware decides whether the selected Collective Principle Transform CP(n) is or is not a large moving object moving into and covering the entire scene. When such exclusion is in effect, a Unity Transform (UT) is created to substitute and serve as the selected Principle Transform P(n) for the compensation circuit of the DIS system, so that the stabilized video will not incorrectly or unnecessarily follow the transform of the large moving object.

According to one embodiment of the present inventive concept, the moving object exclusion method is activated based on two observations: a pre-existed stationary background (indicated by the history of P(n)); and a time-period of co-existence of the stationary background and the large moving object.

The moving object exclusion method can be highly effective in dealing with the following scenario: The scene has a mostly stationary background with or without moving objects; A large moving object enters the scene, and progressively covers larger area; The large moving object covers the entire scene; The large moving object starts leaving the scene, and the background starts to reappear; The large moving object eventually moved away.

The moving object analyzer detects the exclusion scenario IF:

consecutive stationary MV Group existence indicates an existed scene with mostly stationary background;

increasing count of consecutive similar-speed MV Groups indicates an object is moving into the scene;

the trend continues, and at time n the consecutive similar-speed MV Groups cover the entire scene and the stationary MV Group ceased to exist, then the exclusion scenario is detected The Exclusion Decision ED(n) is sent to the Exclusion Transform Selector. The Exclusion Transform Selector selects the Collective Principle Transform CP(n) unless ED(n) indicates the exclusion scenario, in which event then the Principle Transform P(n) is set to Unity Transform. Thus, the stabilized video will not incorrectly follow a large moving object even when it covers the entire scene.

Figure 19:
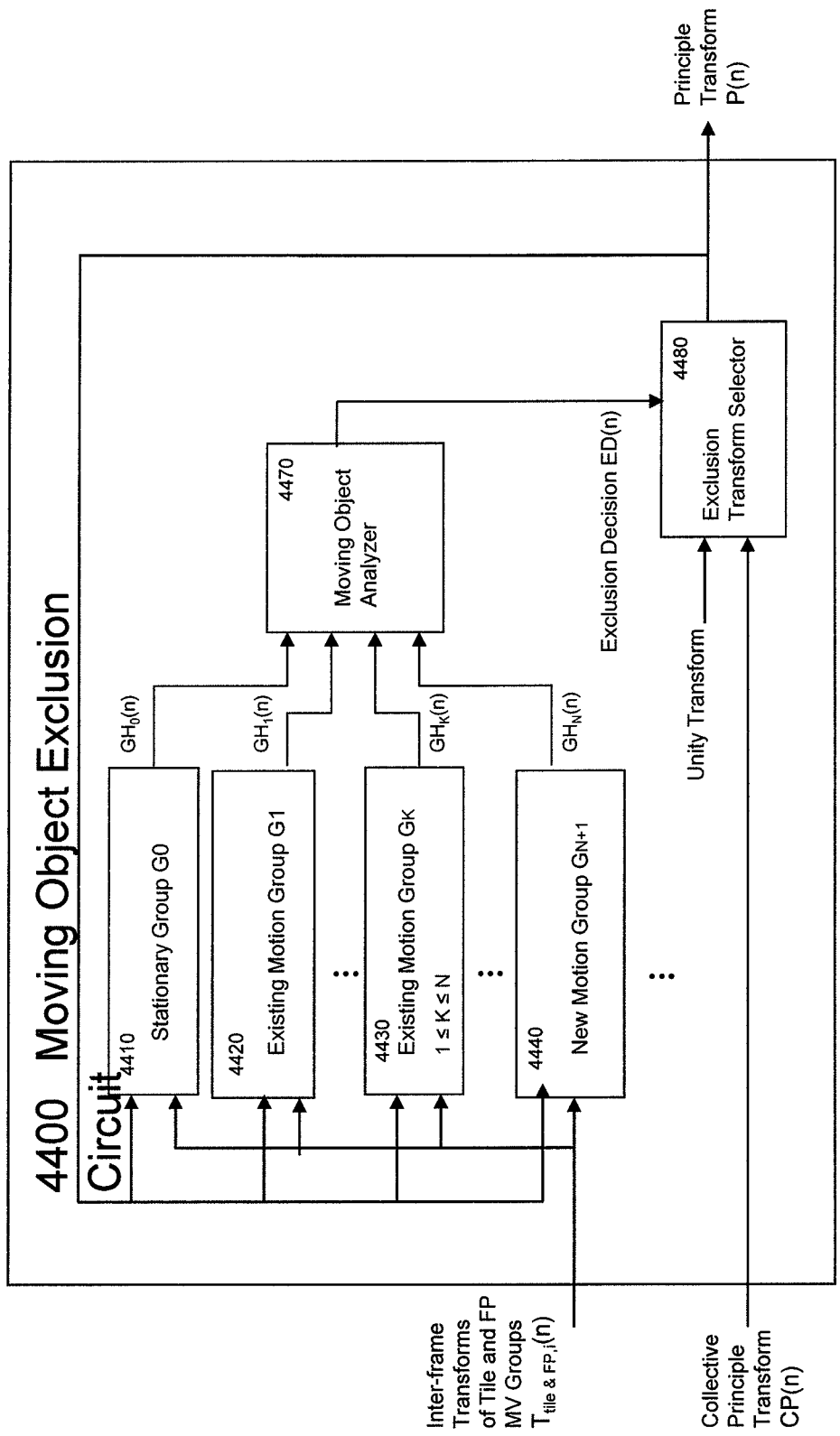
FIG. 19 is a block diagram illustrating an exemplary embodiment of the Moving Object exclusion Circuit.

FIG. 19 is a block diagram of an exemplary implementation of the Moving Object Exclusion Circuit 4400 of the Trajectory Unit (TU) 4000 of the DIS circuit of FIG. 14, comprising a Moving Object Analyzer 4470 and an Exclusion Transform Selector 4480 configured to perform a step in the DIS method of the DIS circuit of FIG. 14.

The Moving Object Exclusion Circuit 4400 comprises a plurality of Group History circuits 4410, 4420, 4430, 4440 for storing a scene's history, and a Moving Object Analyzer 4470. At any time, there is only one designated stationary group $G_0$, but there can be zero or more existing motion groups $G_k$, where k>0. There may also be a new motion group GN, which will during the next frame become one of the k (e.g., k(n+1)=k(n)+1) existing motion groups $G_k$.

The stationary group $G_0$ has an associated group history $GH_0$. Each of the k existing motion groups $G_k$ has an associated group history $GH_k$, as well as an associated motion vector $M_k$. Each existing motion group $G_K$ has a Motion Vector $M_K$, which is basically low-pass filtered $|T_i(n)|$ for each similar-speed $T_i(n)$ over time up to frame n.

Each new motion group $G_N$ has an associated group history $GH_N(n)$ which is initialized at the time of its creation. The Moving Object Analyzer 4470 receives the scene history comprised of the plurality of Group Histories $GH_0(n)$, $GH_1(n)$, ... $GH_j(n)$, and $GH_K(n)$ and $GH_N(n)$, and from them computes an Exclusion Decision ED(n).

The Exclusion Transform Selector 4480 performs selection between the Unity Transform (UT) and the Collective Principle Transform CP(n). The Exclusion Transform Selector 4480 is controlled by the Exclusion Decision ED(n) such that the output Principle Transform P(n) is set to Unity Transform (UT) when ED(n) is activated, and to the Collective Principle Transform CP(n) otherwise. A Unity Transform (UT) will cause the Compensation Unit to do nothing during compensation. Thus, when the Moving Object Analyzer 4470 detects the "large moving object" scenario and activates the Exclusion Decision ED(n), the large moving object's transform which might otherwise be selected as the Principal transform P(n) is excluded from being the selected Principle transform P(n). In effect, the transform of a large moving object, when detected, is excluded from the compensation performed by the Compensation Unit 6000.

Figure 20:
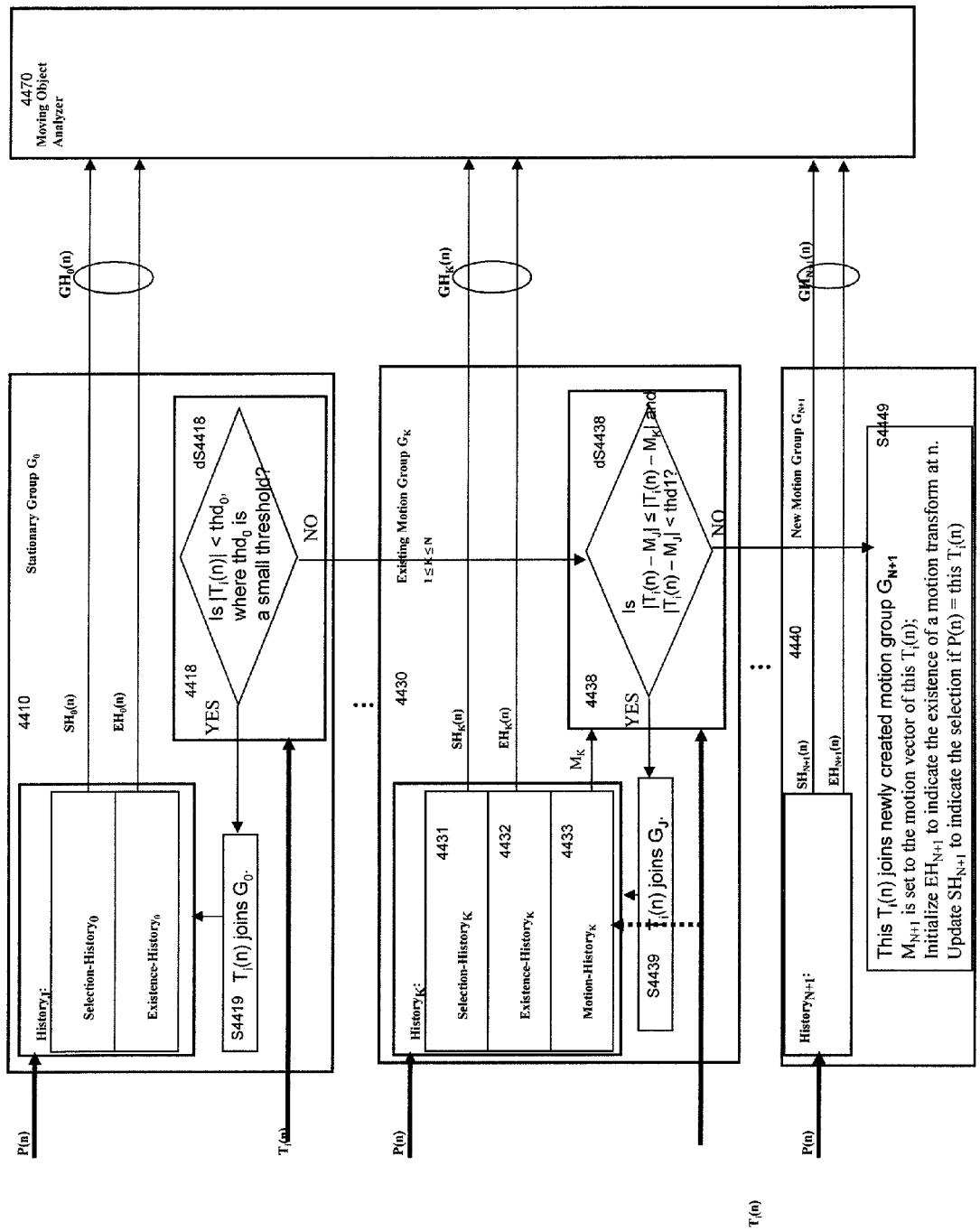
FIG. 20 is a flow chart illustrating process steps according to an embodiment of the present inventive concept.

FIG. 20 is a hybrid block diagram-flow chart illustrating details of the Moving Object Exclusion Circuit 4400 of FIG. 19, configured to perform steps in the DIS method of the DIS circuit of FIG. 14. FIG. 20 illustrates details of representative Group History circuits 4410, 4430, and 4440 corresponding to the stationary Group $G_0$, existing motion group $G_K$, and newly created motion group $G_{N+1}$ respectively.

Each of the Group Histories (e.g., $H_0(n)$) received from Group History circuits (e.g., 4410) by the Moving Object Analyzer 4470 of the Moving Object Exclusion Circuit 4400 of FIG. 19 includes two species of history data, Selection-History (e.g., $SH_0(n)$) and Existence-History (e.g., $EH_0(n)$) corresponding to each group.

Moving Object Analyzer 4470 detects the exclusion scenario as follows: Consecutive existence and selections indicated in group history GH0 of the stationary transform $G0(n)$ indicates that a scene with mostly stationary background has existed for a number of frames; A progressively increasing number of consecutive existences in the group history $GH_K$ of a particular motion group $G_K$ indicates that an object is moving into the scene; If this trend of existences and motion continues, and if at time (n) no stationary transform joins G0 but the selected transform P(n) joins $G_K$, then the large moving object scenario is detected, and the activated Exclusion Decision ED(n) is sent to the Principle Transform Selector 4160-2. If ED(n) indicates the large object exclusion scenario, then the Principle transform P(n) is set to Unity Transform, otherwise, the Principal transform P(n) is selected according to some scoring function of Ti(n).

Each of the Group History circuits 4410, 4420, 4430, 4440 performs storage and processing of three species of history information for each group associated with one of the received inter-frame Transforms $T_i(n)$. The three species of group history are Selection-History, and Existence-History, and Motion-History. The stationary group $G_0$ is created with an empty history at video stabilization startup. The Motion History of the stationary group $G_0$ may be omitted, and presumed null. The motion groups ($G_1, \ldots, G_K, \ldots, G_N$) are created or deleted dynamically during the course of DIS video processing.

Referring to FIG. 20 Group History circuits 4410, 4430, and 4440 corresponding to the stationary Group $G_0$, N existing motion group $G_K$, and newly created motion group $G_{N+1}$ respectively, provide group histories $GH_0$, $GH_K$ and $GH_{N+1}$.

Group History circuit 4410 of the motion group $G_0$ includes a History$_0$ memory for storage of Selection-History $SH_0$, and Existence-History $EH_0$. Existence-History $EH_0$, is a one-bit per past frame value that indicates whether or not an Inter-frame Transform $T_i(n)$ has joined the motion group $G_0$ in the previous frames. Selection-History $SH_0$ is a one-bit per past frame value that indicates whether or not the Inter-frame Transform $T_i(n)$ that joined the motion group $G_0$ was selected as the Principal transform P(n) in the previous frames.

The Group History circuit 4410 of the stationary group $G_o$ omits Motion-History $M_0$ because a decision (decision step dS4418) whether any $T_i(n)$ including the selected Principal transform P(n) joins the stationary group $G_0$ depends upon comparing $T_i(n)$ with a threshold value $thd_0$ rather than with a variable history-based Motion vector $M_0$, because group $G_0$ is deemed stationary. The stationary group $G_0$ is created with an empty history at video stabilization startup.

If during frame n a $T_i(n)$ satisfies $|T_i(n)|<thd_0$, (YES branch of decision step dS4418), then:
This Ti(n) joins $G_0$;
Existence-History $EH_0$ is updated to indicate the existence of a stationary transform at frame n; and,
if P(n)=this $T_i(n)$, then Selection-History $SH_0$ is updated to indicate the selection of this $T_i(n,)$.

Otherwise, (NO branch of decision step dS4418) during frame those $T_i(n)$ which do not satisfy $|T_i(n)|<thd_0$, are compared with Group History in each of the existing motion groups $G_1$ to $G_N$.

Group History circuit 4430 of the motion group $G_K$ includes a History$_K$ memory for storage of Selection-History $SH_K$, and Existence-History $EH_K$, and Motion-History $M_K$. Existence-History $EH_K$, is a one-bit per past frame value that indicates whether or not an Inter-frame Transform $T_i(n)$ has joined the motion group $G_K$ in the previous frames. Selection-History $SH_K$ is a one-bit per past frame value that indicates whether or not the Inter-frame Transform $T_i(n)$ that joined the motion group $G_K$ was selected as the Principal transform P(n) in the previous frames.

Motion-History $M_K$ stores information indicating the vector $M_K$ of the overall motion of the group $G_K$. Each $T_i(n)$ also maps to a motion vector M. Each motion group $G_K$ maps to a motion vector $M_K$. Let $|T_i(n)|$ be the size of the motion vector of $T_i(n)$, and $|T_i(n)-M_K|$ the deviation of $T_i(n)$ from the motion vector $M_K$ of the existing motion group $G_K$ for $1 \leq K \leq N$, where N is the number of currently existing motion groups. A motion group $G_J$ among the N existing motion groups having the minimum $|T_i(n)-M_J|$ indicates a best matching group $G_J$ for $T_i(n)$. This joining decision may be determined by comparing $|T_i(n)-M_J|$ with a predetermined threshold value $thd_1$. Thus, for example, in decision step dS4438, if $|T_i(n)-M_J| \leq |T_i(n)-M_K|$ for a particular J and all K between 1 and N, and $|T_i(n)-M_J|<thd_1$, (YES branch of decision step dS4438) then this $T_i(n)$ joins the existing motion group $G_J$.

If $|T_i(n)-M_J| \leq |T_i(n)-M_K|$ for all K and $|T_i(n)-M_J|<thd_1$, (YES branch of decision step dS4438) then:
$T_i(n)$ joins $G_J$;
Motion-History $M_J$ is adjusted to reflect the newly joined $T_i(n)$;
Existence-History $EH_J$ is updated to indicate the existence of the motion group $G_J$ at frame n;
if P(n)=this $T_i(n)$, then Selection-History $SH_J$ is updated to indicate the selection of this $T_i(n,)=P(n)$.

On the other hand, if after decision step dS4438 has been repeated for a $T_i(n)$ and for all existing motion groups ($G_1$ through $G_N$) and none of the $M_K$ satisfies $|T_i(n)-M_K|<thd_1$, (NO branch of decision step dS4438) then this Ti(n) joins newly created motion group $G_{N+1}$ (step S4449). If this Ti(n) joins newly created motion group $G_{N+1}$ (step S4449), then:
Ti(n) joins the newly created motion group $G_{N+1}$;
Motion-History $M_{N+1}$ is set to the motion vector of this Ti(n);
Existence-History $EH_{N+1}$ is initialized to indicate the existence of the new motion group $G_{N+1}$ at frame n; and if P(n)=this $T_i(n)$, then Selection-History $SH_{N+1}$ is updated to indicate the selection of this $T_i(n,)$=P(n).

Any motion group (among $G_0$ through $G_J$) without any $T_i(n)$ joining for an extended period of time (frames) will be deleted.

Figure 21:
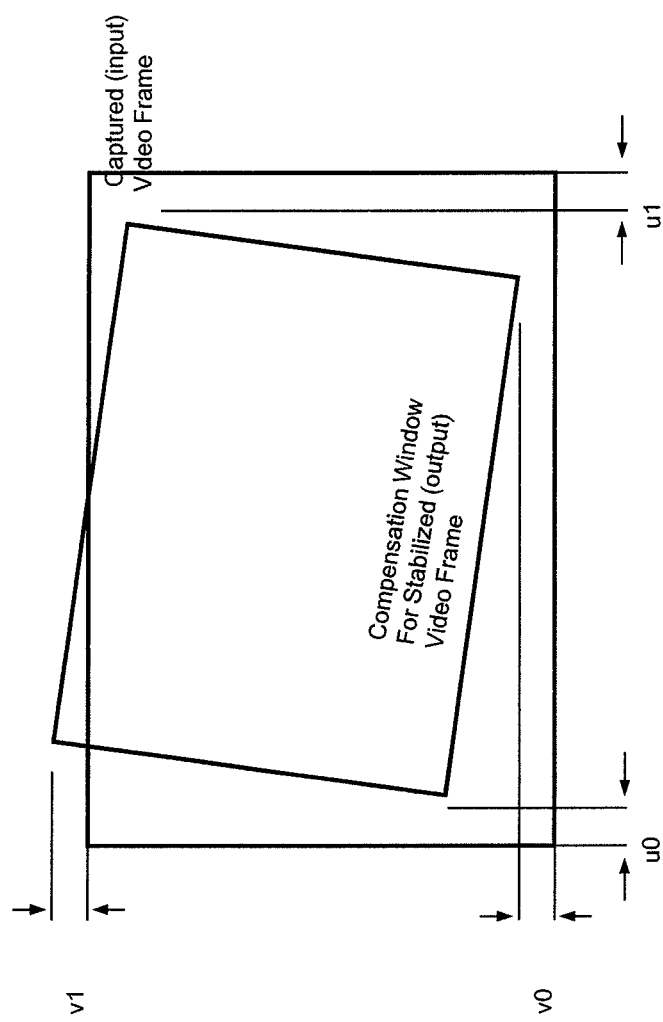
FIG. 21 is a view of a captured video frame and a compensation window computed therein in a step of a Digital Image Stabilization (DIS) method in accordance with an exemplary embodiment of the inventive concept.

FIG. 21 is a view of a captured video frame captured at time n and a compensation window corresponding to a Compensation Transform C(n) computed from the Principle Transform P(n), illustrating a vertical over-excursion v1 to be reduced. The vertical over-excursion of the compensation window is measured as v1 in a step of a Digital Image Stabilization (DIS) method in accordance with an exemplary embodiment of the inventive concept.

As shown in FIG. 21, the compensation window corresponding to a Compensation Transform C(n) of the captured video frame can have a vertical over-excursion (v0 or v1), a horizontal over-excursion (u0 or u1) or both vertical and horizontal over-excursions (v0 or v1) and (u0 or u1). Each of the potential over-excursions (v0 v1, u0, and u1) may be caused by a translational component of the Compensation Transform C(n), by a rotation component of the Compensation Transform C(n), or by a combination of translational and rotational components of the Compensation Transform C(n).

It is desirable to minimize the over-excursions (of v0, v1, u0, and u1) by adaptively filtering the Principle Transform P(n) to output a filtered Compensation Transform C(n) for each captured video frame based on the history of excursions.

Figure 22:
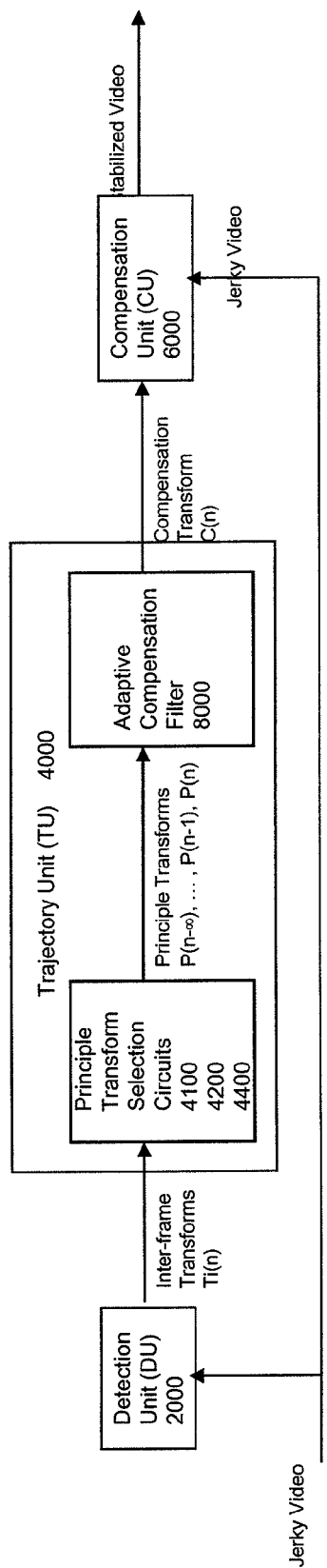
FIG. 22 is a block diagram of Digital Image Stabilization (DIS) modules performing a DIS.

FIG. 22 is a block diagram of Digital Image Stabilization (DIS) circuit performing a DIS method in accordance with another exemplary embodiment of the inventive concept. The DIS circuit comprises a Detection Unit (DU) 2000 that analyses received jerky video and outputs Inter-frame Transforms $T_i(n)$, a Trajectory Unit (TU) 4000 comprising Principle Transform Selection Circuits (4100, 4200, 4400) that identifies a Principal transform P(n) among $T_i(n)$ and an Adaptive Compensation Filter 8000 that filters P(n) to a Compensation Transform C(n), and a Compensation Unit (CU) 6000 that outputs stabilized video by modifying the jerky video frames using C(n).

The Principle Transform Selection Circuits (4100, 4200, 4400) selects one of the Inter-frame Transforms Ti(n) as the Principal Transform P(n) by identifying the Inter-frame Transform $T_i(n)$ of the global motion caused by unsteady camera while ignoring the Inter-frame Transforms $T_i(n)$ of moving objects in the scene, and outputs its selection as the calculated Principal Transform P(n). Thus the Principle Transform Selection Circuits (4100, 4200, 4400) of the DIS circuit selects and outputs one of the inter-frame transforms $T_i(n)$ as the calculated Principal Transform P(n). The Compensation Transform C(n) is obtained by adaptively filtering the Principle Transform P(n). The Compensation Transform C(n) is a description of the geometry of a stabilized video image (compensation window) in relation to the corresponding input video image. The description can contain position, angle, scale, etc. Some commonly used compensation transforms are the similarity transform and the affine transform, and while inventive concept is not restricted to these transforms, we will use the affine transform for illustration of exemplary methods according to the present inventive concept.

The Principle Transform Selection Circuits (4100, 4200, 4400) sequentially outputs the selected Principal Transforms P(n−∞), . . . , P(n−1), P(n) of a continuous sequence of frames to the Adaptive Compensation Filter 8000, where the Principal Transform P(n−∞) indicates the use of recursive (Infinite impulse response IIR) filters. The Adaptive Compensation Filter 8000 estimates the intended camera trajectory from the jittery motions represented by the sequence of Principle Transforms P(n−∞), . . . , P(n−1), P(n), and outputs the Compensation Transform C(n) according to the estimated camera trajectory.

The visual effect of the stabilized video is highly dependent on the quality of the Adaptive Compensation Filter 8000. Conventional trajectory estimation methods include Motion Vector integration and Kalman Filter, etc. However, these and other conventional trajectory estimation methods do not perform well in a wide range of jerky video characteristics. In exemplary embodiments of the inventive concept, an adaptive compensation filter is used to filter out the jerky motions, and produces stabilized video.

Figure 23:
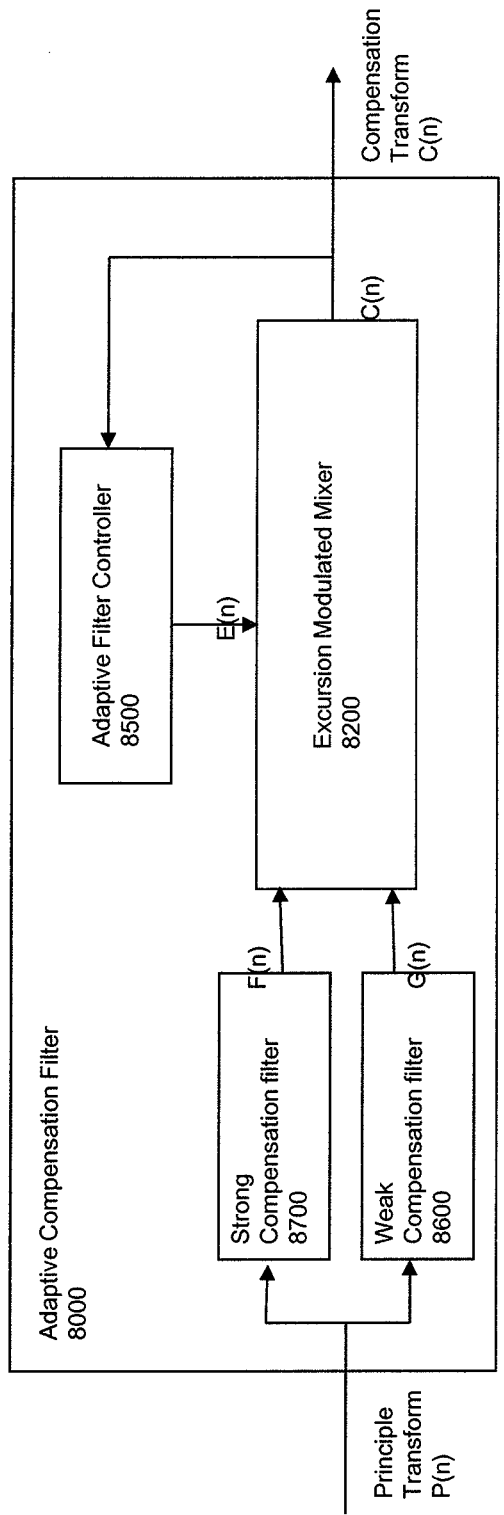
FIG. 23 is a block diagram of an Adaptive Compensation Filter module method in accordance with an exemplary embodiment of the inventive concept.

FIG. 23 is a block diagram of the Adaptive Compensation Filter 8000 in the Trajectory Unit (TU) 4000 of the DIS circuit of FIG. 22 configured to adaptively filter the Principle Transform P(n) based on the history of compensation window excursions. The Adaptive Compensation Filter 8000 filters the Principle Transform P(n) and outputs the adaptively filtered Compensation Transform C(n) based on the received Principal Transforms P(n−∞), . . . , P(n−1), P(n) of a continuous sequence of frames.

The Adaptive Compensation Filter 8000 includes a Strong Compensation Filter (SC) 8700, a Weak Compensation Filter (WC) 8600, an Adaptive Filter control circuit 8500 for outputting a control signal E(n), and an Excursion Modulated Mixer 8200. The SC filter is a highly frequency-selective high-order linear time-invariant digital filter, effective for filtering of very jerky input video. On the other hand, the weak compensation (WC) filter has lower frequency-selective characteristic that will produce less compensation window over-excursions at the expense of less stable output video.

The Adaptive Compensation Filter 8000 is effectively a combination of the SC filter and the WC filter. The Excursion Modulated Mixer 8200 performs the mixing of the SC filter and the WC filter outputs based on the control signal E(n) generated and output by the Adaptive Filter Controller 8500 based on the history of compensation window excursions.

Figure 24:
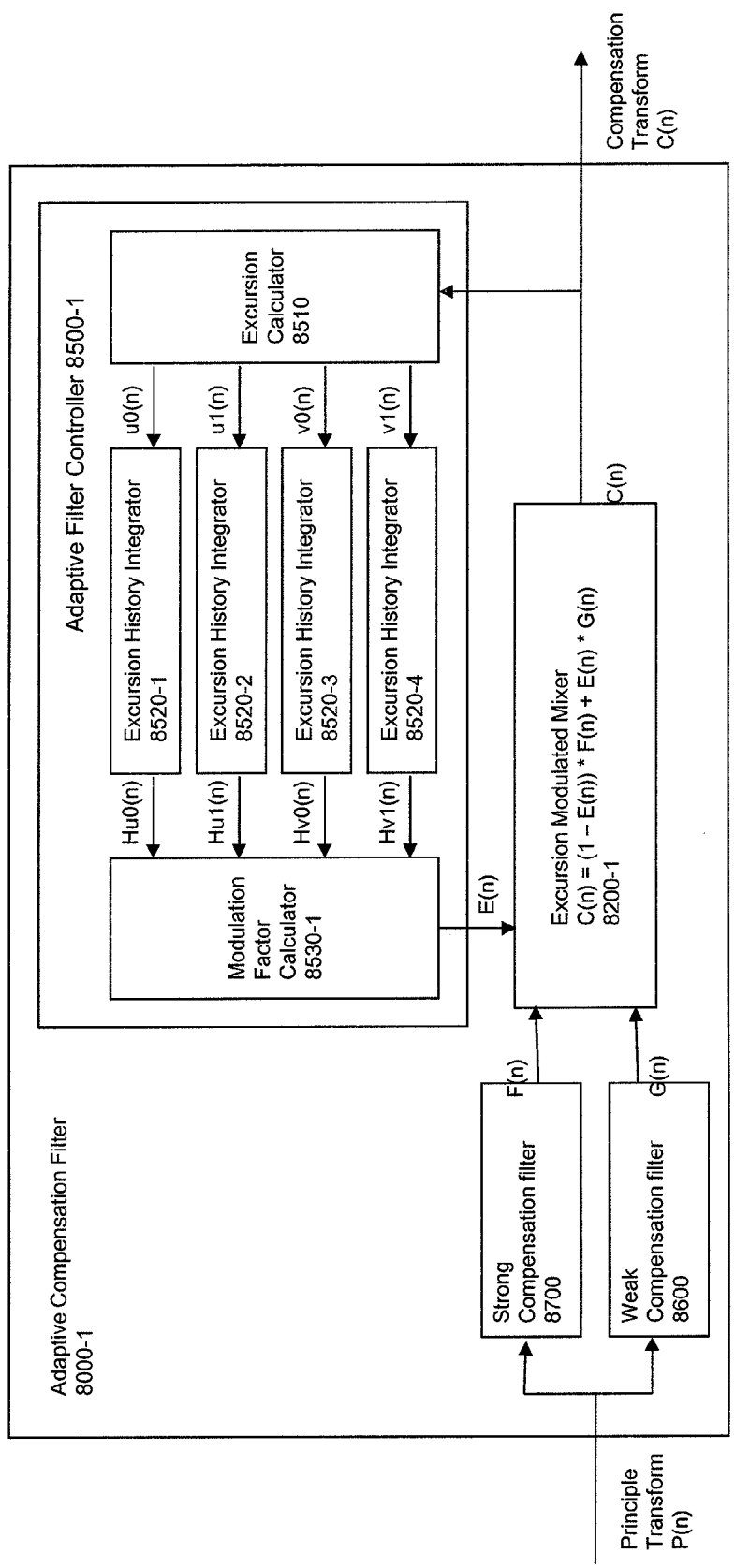
FIG. 24 is a schematic block diagram of an Adaptive Compensation Filter module in accordance with an exemplary embodiment of the inventive concept.

FIG. 24 is a block diagram of a first exemplary implementation 8000-1 of the Adaptive Compensation Filter 8000 of the Trajectory Unit (TU) 4000 of the DIS circuit of FIG. 22. The exemplary Adaptive Compensation Filter 8000-1 comprises a Strong Compensation Filter 8700 and a Weak Compensation Filter 8600, and a feedback loop into the Excursion Calculator 8510 of the Adaptive Filter Controller 8500-1.

Referring to FIG. 24 the Strong Compensation Filter (SC) 8700 is a high-order linear time-invariant recursive digital filter having a cutoff frequency at about 1.0 Hz and a sharp rolloff to attain visually good stabilized video and has a highly frequency-selective output F(n).

The Weak Compensation Filter (WC) 8600 is a high-order or lower-order linear time-invariant recursive digital filter. The WC 8600 has a lower frequency-selective output G(n) with a cutoff frequency slightly higher than 1 Hz (e.g., at 1.2 Hz) and a soft rolloff to reduce over-excursions.

The Excursion Modulated Mixer 8200-1 of the Adaptive Compensation Filter 8000-1 performs an excursion modulated adaptive filtering that combines F(n) and G(n) according to the scalar control signal E(n). The output of the SC filter F(n) and the output of the WC filter G(n) are both intermediate compensation transforms, and the output of the Excursion Modulated Mixer 8200-1 C(n) is also a compensation transform. The Excursion Modulated Mixer 8200-1 outputs C(n)=(1−E(n))*F(n)+E(n)*G(n), wherein E(n) is a non-linearly normalized scalar control signal in the range [0,1], "*" is a multiply operation between a scalar and a transform, mapping on to a transform, and "+" is an addition operation between two transforms, mapping on to a transform. Thus the Adaptive Compensation Filter 8000-1 in this exemplary embodiment is a linear combination of the SC filter and the WC filter. Thus, the Adaptive Compensation Filter 8000-1 is effectively a high-order linear time-variant recursive digital filter that possesses known stable characteristic by the principle of linear superposition.

The linear combined Compensation Transform C(n) is controlled by scalar control signal E(n) based on the history of compensation window excursions. Small excursions in the history produce a small E(n) and thus increase the influence of the SC filter for the current frame n, whereas large excursions in the history produce a E(n) close to 1 and thus increase the influence of the WC filter for the current frame n. Medium excursions in the store history assign proportional influences of the SC filter and the WC filter.

Thus, the SC filter provides the main contribution at small excursions, and it is very effective at filtering out high frequency jitters. And since the WC filter contributes more at larger excursions, the occurrence of over-excursion is greatly reduced. The Adaptive Compensation Filter 8000-1 prevents excessive over-excursion with large-movement input video while maintaining excellent video stabilization characteristics.

Referring to FIG. 24, the Adaptive Filter Controller 8500-1 comprises an Excursion Calculator 8510, four Excursion History Integrators 8520, and a Modulation Factor Calculator 8530-1. The Adaptive Filter Controller 8500-1 is part of a feedback loop. The Excursion Calculator 8510 output E(n) is derived from previous Adaptive Compensation Filter outputs C(n−∞), . . . , C(n−2), C(n−1) where n denotes its time sequence nature, so that E(n) and C(n) do not form a non-realizable delay-free loop. Thus, the exemplary embodiment is suitable for real time video stabilization, and includes a causal linear time-variant filter with predictable characteristics.

The Excursion Calculator 8510 receives a feedback of Compensation Transform C(n) output by the Excursion Modulated Mixer 8200-1. The Excursion Calculator 8510 comprises a u0 calculator, a u1 calculator, a v0 calculator, and a v1 calculator, to separately calculate left, right, bottom, and top side excursions per frame, based on the position of the four corners of the compensation window (see FIG. 21).

The Adaptive Compensation Filter 8500-1 retains excursion history through the use of recursive filters. The output of each side excursion calculator of Excursion Calculator 8510 is then individually time-integrated by the Excursion History Integrator, which is essentially a low-pass recursive filter. The output of each low-pass recursive filter (Hu0, Hu1, Hv0, Hv1) is then feed to the Modulation Factor Calculator 8530-1. The Modulation Factor Calculator 8530-1 selects the maximum among the four time-integrated excursion magnitudes (Hu0, Hu1, Hv0, Hv1) and generates a non-linearly normalized scalar control signal E(n) with a continuous range [0,1].

The Modulation Factor Calculator 8530-1 outputs the non-linearly normalized scalar control signal E(n) to modulate the mixing of F(n) and G(n). A small value of E(n) implies history of small excursions and large value of E(n) implies history of large excursions.

Thus, the mixing of F(n) and G(n) under the control of scalar control signal E(n) to generate and output Compensation Transform C(n) is based on the history of compensation window excursions. This exemplary embodiment provides good stabilization without frequent over-excursions and has a known frequency response and predictable stabilization characteristics, suitable for real time video stabilization.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of operating a video processor, comprising:
   receiving a first image data representing a first frame of a scene;
   dividing at least a central portion of the first frame into a plurality of j×k tiles, wherein each of j and k is an integer;
   identifying feature point candidates in the first image data;
   selecting a set of feature points within each specific tile based on the luminance variance $\sigma 2$ of the specific tile;
   receiving a second image data representing a second frame of the scene;
   deriving feature point motion vectors between the first frame and the second frame corresponding to the identified feature;
   grouping the motion vectors into motion vector groups, wherein each group of motion vectors of similar motion characteristics corresponds to at least part of an object within the scene; and
   calculating the affine transform of each group of motion vectors,
   wherein the grouping motion vectors into motion vector groups is based on vector magnitude ratios and angular differences.

2. The method of claim 1, further including deriving a tile motion vector corresponding to each of the tiles.

3. The method of claim 1, further including adaptively filtering the compensation transform to prevent excessive over-excursion of a compensation window, based on time-integrated excursions.

4. The method of claim 1, further including identifying a large moving object in the scene and excluding a compensation transform corresponding to the large moving object.

5. An image processing circuit, comprising:
   a receiver configured to receive first and second frames of image data of a scene captured by a camera;
   a memory configured to store a first group of motion vectors having a first motion characteristic and a second group of motion vectors having a second motion characteristics;
   a transform selector configured to identify from transforms of the first and second groups of motion vectors a compensation transform representing camera movement to be compensated;
   an adaptive filter configured to prevent excessive over-excursion of a compensation window, based on non-linearly normalized time-integrated excursions;
   a circuit configured to identify a set of feature point candidates in the first image frame by performing a corner detection method;
   a circuit configured to select, from among the set of identified feature point candidates, a set of locally-optimal feature points in the first image frame by performing a method, comprising receiving a first image data representing a first frame of a scene;
   dividing at least a central portion of the first frame into a plurality of j×k tiles, wherein each of j and k is an integer;

identifying feature point candidates in the first image data; and selecting a set of feature points within each specific tile based on the luminance variance σ2 of the specific tile.

6. A camera comprising:
an image sensor configured to capture an image;
an image data circuit configured to convert the captured image into frames of image data;
an image processing circuit, comprising:
a receiver configured to receive first and second frames of image data of a scene;
a circuit configured to identify a set of feature point candidates in a first image frame of the scene;
a circuit configured to select, from among the set of identified feature point candidates in the first image frame, a set of locally-optimal feature points by performing a method, comprising receiving a first image data representing a first frame of a scene;
dividing at least a central portion of the first frame into a plurality of j×k tiles, wherein each of j and k is an integer;
identifying feature point candidates in the first image data; and
selecting a set of feature points within each specific tile based on the luminance variance σ2 of the specific tile;
a motion vector detector configured to detect motions of objects and generate motion vectors based on the set of locally-optimal feature points;
a circuit configured to calculate the affine transform of each of a first group of motion vectors and a second group of motion vectors;
a transform selector configured to identify, from transforms of the first and second motion vector groups, a principal transform to be used for estimating a compensation transform representing camera movement to be compensated;
an adaptive filter configured to filter the identified principal transform to prevent excessive over-excursion of a compensation window; and
a compensation unit configured to adjust the captured image based on the compensation transform and the output of the adaptive filter.

7. The camera of claim 6, further including a grouping circuit configured to group the motion vectors into one of at least two groups including a feature point group and a tile group, the tile group comprising non-overlapping tiles divided from a video frame.

8. The camera of claim 6, wherein the transform selector is configured to identify the compensation transform based on a plurality of scoring functions selected from Transform-History, Transform-Motion, Transform-Feature Number, and Transform-Extent scores.

9. The camera of claim 6, wherein the adaptive filter is configured to prevent excessive over-excursion of the compensation window based on non-linearly normalized time-integrated excursions.

10. The camera of claim 6, Wherein the adaptive filter is configured to retain excursion history by use of recursive filters.

11. The image processing circuit of claim 5, further comprising:
a circuit configured to group the motion vectors into motion vector groups of similar motion characteristics, wherein each group of motion vectors corresponds to at least part of one object within the scene;
a memory configured to store a first group of motion vectors having a first motion characteristic and a second group of motion vectors having a second motion characteristics;
a circuit configured to calculate the affine transform of each of the first group and second group of motion vectors;
a transform selector configured to identify from transforms of the first and second groups of motion vectors a principal transform of the scene representing camera movement to be compensated, based upon which a compensation transform is calculated.

12. The image processing circuit, of claim 11, further comprising:
a circuit configured to calculate at least one score, among a transform featurepoint-number score and a transform-extent score, for each of the affine transforms; and
a circuit configured to identifying a compensation transform for compensation of camera motion, by selecting an affine transform corresponding to a stationary object within the scene by using at least one of the transform-featurepoint numbers scores and the transform-extent scores.

13. The image processing circuit of claim 5 further comprising:
a memory configured to store a first group of motion vectors having a first motion characteristic and a second group of motion vectors having a second motion characteristics;
a circuit configured to calculate the affine transform of each of the first group of motion vectors and the second group of motion vectors;
a transform selector configured to identify from transforms of the first and second groups of motion vectors a principal transform to be used for estimating a compensation transform representing camera movement to be compensated; and
an adaptive filter configured filter the identified principal transform to prevent excessive over-excursion of a compensation window, based on non-linearly normalized time-integrated excursions.

14. A camera comprising:
an image sensor configured to capture an image;
an image data circuit configured to convert the capture image into frames of image data;
an image processing circuit, comprising:
a receiver configured to receive first and second frames of image data of a scene;
a circuit configured to identify a set of feature point candidates in a first image frame of the scene;
a circuit configured to select, from among the set of identified feature point candidates in the first image frame, a set of locally-optimal features points by performing a method, comprising receiving a first image data representing a first frame of a scene;
dividing at least a central portion of the first frame into a plurality of j×k tiles, wherein each of j and k is an integer;
identifying feature points candidates in the first image data; and
selecting a set of feature points within each specific tile based on the luminance variance σ2 of the specific tile;
a motion vector detector configured to detect motion of objects and generate motion vectors based on the set of locally-optimal feature points;
a transform selector configured to identify from transforms of the motion vectors a compensation transform representing camera movement to be compensated;

an adaptive filter configured to the compensation transform to prevent excessive over-excursion of a compensation window, based on time-integrated excursions; and a compensation unit configured to adjust the captured image based on the compensation transform and the output of the adaptive filter.

* * * * *